(12) United States Patent
Marotta et al.

(10) Patent No.: US 12,518,871 B2
(45) Date of Patent: *Jan. 6, 2026

(54) SYSTEMS AND METHODS FOR HOME HEALTH EVALUATION AND REMEDIATION

(71) Applicant: State Farm Mutual Automobile Insurance Company, Bloomington, IL (US)

(72) Inventors: Nicholas Carmelo Marotta, Phoenix, AZ (US); Austin Rowley, Mesa, AZ (US); Michael Scott Harrison, Chandler, AZ (US); Jared Wheet, Mesa, AZ (US); Cathy Jo Roth, San Tan Valley, AZ (US); Matthew Megyese, Phoenix, AZ (US); J D Johnson Willingham, Bloomington, IL (US); Laura Anne Uphoff, Gilbert, AZ (US); Paul Bates, Mesa, AZ (US); Stacee Madsen, Mesa, AZ (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 686 days.

This patent is subject to a terminal disclaimer.

(21) Appl. No.: 17/370,808

(22) Filed: Jul. 8, 2021

(65) Prior Publication Data

US 2022/0013222 A1    Jan. 13, 2022

Related U.S. Application Data

(60) Provisional application No. 63/056,359, filed on Jul. 24, 2020, provisional application No. 63/049,942, filed on Jul. 9, 2020.

(51) Int. Cl.
*G16H 40/60* (2018.01)
*G01R 19/165* (2006.01)
(Continued)

(52) U.S. Cl.
CPC ......... *G16H 40/60* (2018.01); *G01R 19/1659* (2013.01); *G01R 22/068* (2013.01);
(Continued)

(58) Field of Classification Search
CPC .................................................. G16H 40/60
See application file for complete search history.

(56) References Cited

U.S. PATENT DOCUMENTS

| 1,446,000 A | 2/1923 | Cleland |
| 5,483,153 A | 1/1996 | Leeb et al. |

(Continued)

FOREIGN PATENT DOCUMENTS

| AU | 2015100551 A4 | 5/2015 |
| CA | 2781251 A1 | 12/2013 |

(Continued)

OTHER PUBLICATIONS

The Neural Network House: An Environment that Adapts to its Inhabitants. Mozer, Michael C. 1998. (Year: 1998).*

(Continued)

*Primary Examiner* — Joseph H Feild
*Assistant Examiner* — Pameshanand Mahase
(74) *Attorney, Agent, or Firm* — Armstrong Teasdale LLP

(57) ABSTRACT

A device for evaluating aspects of health of a residential property configured to: (i) receive a first element of internal home health data captured by one or more smart devices installed within a residential property, the first element of internal home health data reflecting an aspect of operational quality of one or more assets of the residential property; (ii) determine a safety score based upon the first element of internal home health data; (iii) receive a second element of internal home health data captured by the one or more smart devices; (iv) determine a home health score based upon the first or second elements of internal home health data, the (Continued)

home health score representing a measure of health of the residential property; and (v) cause to be displayed, to a homeowner via a graphical user interface, a home health evaluation that includes the safety score and the home health score.

20 Claims, 7 Drawing Sheets

(51) Int. Cl.
G01R 22/06 (2006.01)
G06Q 40/08 (2012.01)
G08B 21/18 (2006.01)
H02J 13/00 (2006.01)

(52) U.S. Cl.
CPC ........... *G06Q 40/08* (2013.01); *G08B 21/185* (2013.01); *H02J 13/00006* (2020.01)

(56) References Cited

U.S. PATENT DOCUMENTS

| | | |
|---|---|---|
| 5,553,609 A | 9/1996 | Chen et al. |
| 5,872,358 A | 2/1999 | Todokoro et al. |
| 5,900,629 A | 5/1999 | Todokoro et al. |
| 5,935,251 A | 8/1999 | Moore |
| 5,967,975 A | 10/1999 | Ridgeway |
| 6,069,356 A | 5/2000 | Todokoro et al. |
| 6,084,238 A | 7/2000 | Todokoro et al. |
| 6,428,475 B1 | 8/2002 | Shen |
| 6,611,206 B2 | 8/2003 | Eshelman et al. |
| 6,762,686 B1 | 7/2004 | Tabe |
| 6,847,892 B2 | 1/2005 | Zhou et al. |
| 6,853,894 B1 | 2/2005 | Kolls |
| 6,886,139 B2 | 4/2005 | Liu |
| 6,982,710 B2 | 1/2006 | Salomie |
| 6,988,026 B2 | 1/2006 | Breed et al. |
| 7,082,359 B2 | 7/2006 | Breed |
| 7,089,099 B2 | 8/2006 | Shostak et al. |
| 7,091,865 B2 | 8/2006 | Cuddihy et al. |
| 7,103,460 B1 | 9/2006 | Breed |
| 7,154,399 B2 | 12/2006 | Cuddihy et al. |
| 7,242,305 B2 | 7/2007 | Cuddihy et al. |
| 7,289,965 B1 | 10/2007 | Bradley et al. |
| 7,301,463 B1 | 11/2007 | Paterno |
| RE40,073 E | 2/2008 | Breed |
| 7,397,346 B2 | 7/2008 | Helal et al. |
| 7,411,510 B1 | 8/2008 | Nixon |
| 7,421,321 B2 | 9/2008 | Breed et al. |
| 7,498,985 B1 | 3/2009 | Woo et al. |
| 7,502,498 B2 | 3/2009 | Wen et al. |
| 7,562,121 B2 | 7/2009 | Berisford et al. |
| 7,586,418 B2 | 9/2009 | Cuddihy et al. |
| 7,733,224 B2 | 6/2010 | Tran |
| 7,801,612 B2 | 9/2010 | Johnson et al. |
| 7,831,235 B2 | 11/2010 | Mononen et al. |
| 7,835,919 B1 | 11/2010 | Bradley et al. |
| 7,835,926 B1 | 11/2010 | Naidoo et al. |
| 7,865,386 B2 | 1/2011 | Sarkar |
| 7,911,334 B2 | 3/2011 | Busey |
| 7,966,203 B1 | 6/2011 | Pietrzak |
| 7,966,378 B2 | 6/2011 | Berisford et al. |
| 7,974,854 B1 | 7/2011 | Bradley et al. |
| 8,010,377 B1 | 8/2011 | Bradley et al. |
| 8,019,622 B2 | 9/2011 | Kaboff et al. |
| 8,027,850 B1 | 9/2011 | Pietrzak |
| 8,050,665 B1 | 11/2011 | Orbach |
| 8,055,529 B1 | 11/2011 | Jackson et al. |
| 8,214,082 B2 | 7/2012 | Tsai et al. |
| 8,289,160 B1 | 10/2012 | Billman |
| 8,346,594 B2 | 1/2013 | Begeja et al. |
| 8,433,344 B1 | 4/2013 | Virga |
| 8,490,006 B1 | 7/2013 | Reeser et al. |
| 8,515,783 B1 | 8/2013 | Weeks |
| 8,527,306 B1 | 9/2013 | Reeser et al. |
| 8,529,456 B2 | 9/2013 | Cobain |
| 8,533,144 B1 | 9/2013 | Reeser et al. |
| 8,595,034 B2 | 11/2013 | Bauer et al. |
| 8,595,130 B2 | 11/2013 | Johnson et al. |
| 8,640,038 B1 | 1/2014 | Reeser et al. |
| 8,650,048 B1 | 2/2014 | Hopkins, III et al. |
| 8,655,595 B1 | 2/2014 | Green et al. |
| 8,665,084 B2 | 3/2014 | Shapiro et al. |
| 8,669,864 B1 | 3/2014 | Tedesco et al. |
| 8,670,998 B2 | 3/2014 | Bertha et al. |
| 8,674,544 B2 | 3/2014 | Rada et al. |
| 8,674,831 B1 | 3/2014 | Merrill et al. |
| 8,675,920 B2 | 3/2014 | Hanson et al. |
| 8,676,833 B2 | 3/2014 | Chunilal |
| 8,682,682 B1 | 3/2014 | Bradley et al. |
| 8,682,952 B2 | 3/2014 | Kutzik et al. |
| 8,712,805 B1 | 4/2014 | Ferries et al. |
| 8,744,901 B2 | 6/2014 | Begeja et al. |
| 8,760,285 B2 | 6/2014 | Billman et al. |
| 8,799,029 B2 | 8/2014 | Bodas |
| 8,803,690 B2 | 8/2014 | Junqua et al. |
| 8,856,383 B2 | 10/2014 | Beninato et al. |
| 8,868,616 B1 | 10/2014 | Otto et al. |
| 8,882,666 B1 | 11/2014 | Goldberg et al. |
| 8,890,680 B2 | 11/2014 | Reeser et al. |
| 8,892,451 B2 | 11/2014 | Everett et al. |
| 8,917,186 B1 | 12/2014 | Grant |
| 8,929,853 B2 | 1/2015 | Butler |
| 8,965,327 B2 | 2/2015 | Davis et al. |
| 8,976,937 B2 | 3/2015 | Shapiro et al. |
| 9,049,168 B2 | 6/2015 | Jacob et al. |
| 9,057,746 B1 | 6/2015 | Houlette et al. |
| 9,117,349 B2 | 8/2015 | Shapiro et al. |
| 9,142,119 B1 | 9/2015 | Grant |
| 9,152,737 B1 | 10/2015 | Micali et al. |
| 9,165,334 B2 | 10/2015 | Simon |
| 9,183,578 B1 | 11/2015 | Reeser et al. |
| 9,202,363 B1 | 12/2015 | Grant |
| 9,208,661 B2 | 12/2015 | Junqua et al. |
| 9,213,994 B2 | 12/2015 | Green et al. |
| 9,262,909 B1 | 2/2016 | Grant |
| 9,280,793 B2 | 3/2016 | English et al. |
| 9,286,772 B2 | 3/2016 | Shapiro et al. |
| 9,311,676 B2 | 4/2016 | Helitzer et al. |
| 9,344,330 B2 | 5/2016 | Jacob et al. |
| 9,349,300 B2 | 5/2016 | Harkness |
| 9,375,142 B2 | 6/2016 | Schultz et al. |
| 9,408,561 B2 | 8/2016 | Stone et al. |
| 9,424,737 B2 | 8/2016 | Bailey et al. |
| 9,443,195 B2 | 9/2016 | Micali et al. |
| 9,472,092 B1 | 10/2016 | Grant |
| 9,491,277 B2 | 11/2016 | Vincent |
| 9,536,052 B2 | 1/2017 | Amarasingham et al. |
| 9,536,148 B2 * | 1/2017 | Gross ................ G06Q 50/16 |
| 9,552,611 B2 | 1/2017 | Cook |
| 9,585,563 B2 | 3/2017 | Mensinger et al. |
| 9,589,441 B2 | 3/2017 | Shapiro et al. |
| 9,609,003 B1 | 3/2017 | Chmielewski et al. |
| 9,665,892 B1 | 5/2017 | Reeser et al. |
| 9,666,060 B2 | 5/2017 | Reeser et al. |
| 9,699,529 B1 | 7/2017 | Petri et al. |
| 9,712,576 B1 | 7/2017 | Gill |
| 9,739,813 B2 | 8/2017 | Houlette et al. |
| 9,754,477 B2 | 9/2017 | Poder et al. |
| 9,767,680 B1 | 9/2017 | Trundle |
| 9,786,158 B2 | 10/2017 | Beaver et al. |
| 9,798,979 B2 | 10/2017 | Fadell et al. |
| 9,798,993 B2 | 10/2017 | Payne et al. |
| 9,800,570 B1 | 10/2017 | Bleisch |
| 9,800,958 B1 | 10/2017 | Petri et al. |
| 9,801,541 B2 | 10/2017 | Mensinger et al. |
| 9,812,001 B1 | 11/2017 | Grant |
| 9,818,158 B1 | 11/2017 | Devereaux et al. |
| 9,824,398 B2 | 11/2017 | English et al. |
| 9,838,854 B2 | 12/2017 | Fretwell |
| 9,866,507 B2 | 1/2018 | Frenkel et al. |
| 9,888,371 B1 | 2/2018 | Jacob |
| 9,892,463 B1 | 2/2018 | Hakimi-Boushehri et al. |

(56) References Cited

U.S. PATENT DOCUMENTS

| | | |
|---|---|---|
| 9,898,168 B2 | 2/2018 | Shapiro et al. |
| 9,898,912 B1 | 2/2018 | Jordan, II et al. |
| 9,901,252 B2 | 2/2018 | Tran |
| 9,911,042 B1 | 3/2018 | Cardona et al. |
| 9,922,524 B2 | 3/2018 | Devdas et al. |
| 9,923,971 B2 | 3/2018 | Madey et al. |
| 9,942,630 B1 | 4/2018 | Petri et al. |
| 9,947,051 B1 | 4/2018 | Allen et al. |
| 9,947,202 B1 | 4/2018 | Moon et al. |
| 9,978,033 B1 | 5/2018 | Payne et al. |
| 9,996,882 B1 | 6/2018 | Manzella et al. |
| 9,997,056 B2 | 6/2018 | Bleisch |
| 10,002,295 B1 | 6/2018 | Cardona et al. |
| 10,022,084 B2 | 7/2018 | Nonaka et al. |
| 10,042,341 B1 | 8/2018 | Jacob |
| 10,043,369 B2 | 8/2018 | Hopkins et al. |
| 10,047,974 B1 | 8/2018 | Riblet et al. |
| 10,055,793 B1 | 8/2018 | Call et al. |
| 10,055,803 B2 | 8/2018 | Orduna et al. |
| 10,057,664 B1 | 8/2018 | Moon et al. |
| 10,062,118 B1 | 8/2018 | Bernstein et al. |
| 10,073,929 B2 | 9/2018 | Vaynriber et al. |
| 10,102,584 B1 | 10/2018 | Devereaux et al. |
| 10,102,585 B1 | 10/2018 | Bryant et al. |
| 10,102,589 B1 | 10/2018 | Tofte et al. |
| 10,107,708 B1 | 10/2018 | Schick et al. |
| 10,136,294 B2 | 11/2018 | Mehta et al. |
| 10,142,394 B2 | 11/2018 | Chmielewski et al. |
| 10,147,296 B2 | 12/2018 | Gregg |
| 10,152,150 B2 | 12/2018 | Sherman |
| 10,158,498 B2 | 12/2018 | Brandman et al. |
| 10,176,705 B1 | 1/2019 | Grant |
| 10,181,160 B1 | 1/2019 | Hakimi-Boushehri et al. |
| 10,181,246 B1 | 1/2019 | Jackson |
| 10,186,134 B1 | 1/2019 | Moon et al. |
| 10,198,771 B1 | 2/2019 | Madigan et al. |
| 10,204,500 B2 | 2/2019 | Cullin et al. |
| 10,206,630 B2 | 2/2019 | Stone et al. |
| 10,210,498 B1 | 2/2019 | Meyyappan et al. |
| 10,217,068 B1 | 2/2019 | Davis et al. |
| 10,223,750 B1 | 3/2019 | Loo et al. |
| 10,223,751 B1 | 3/2019 | Hutchinson et al. |
| 10,226,187 B2 | 3/2019 | Al-Ali et al. |
| 10,226,204 B2 | 3/2019 | Heaton et al. |
| 10,229,394 B1 | 3/2019 | Davis et al. |
| 10,244,294 B1 | 3/2019 | Moon et al. |
| 10,249,158 B1 | 4/2019 | Jordan et al. |
| 10,258,295 B2 | 4/2019 | Fountaine |
| 10,269,074 B1 | 4/2019 | Patel et al. |
| 10,282,787 B1 | 5/2019 | Hakimi-Boushehri et al. |
| 10,282,788 B1 | 5/2019 | Jordan et al. |
| 10,282,961 B1 | 5/2019 | Jordan, II et al. |
| 10,295,431 B1 | 5/2019 | Schick et al. |
| 10,296,978 B1 | 5/2019 | Corder et al. |
| 10,297,138 B2 | 5/2019 | Reeser et al. |
| 10,298,735 B2 | 5/2019 | Preston et al. |
| 10,304,311 B2 | 5/2019 | Clark et al. |
| 10,304,313 B1 | 5/2019 | Moon et al. |
| 10,311,521 B1 | 6/2019 | Capone et al. |
| 10,319,209 B2 | 6/2019 | Carlton-Foss |
| 10,323,860 B1 | 6/2019 | Riblet et al. |
| 10,325,471 B1 | 6/2019 | Victor |
| 10,325,473 B1 | 6/2019 | Moon et al. |
| 10,332,059 B2 | 6/2019 | Matsuoka et al. |
| 10,335,059 B2 | 7/2019 | Annegarn et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,360,345 B2 | 7/2019 | Ramsdell et al. |
| 10,373,257 B1 | 8/2019 | Iqbal et al. |
| 10,380,692 B1 | 8/2019 | Parker et al. |
| 10,387,966 B1 | 8/2019 | Shah et al. |
| 10,388,135 B1 | 8/2019 | Jordan, II et al. |
| 10,412,169 B1 | 9/2019 | Madey et al. |
| 10,446,000 B2 | 10/2019 | Friar et al. |
| 10,446,007 B2 | 10/2019 | Kawazu et al. |
| 10,453,146 B1 | 10/2019 | Stricker et al. |
| 10,453,149 B1 | 10/2019 | Gaudin et al. |
| 10,467,476 B1 | 11/2019 | Cardona et al. |
| 10,469,282 B1 | 11/2019 | Konrardy |
| 10,475,141 B2 | 11/2019 | McIntosh et al. |
| 10,480,825 B1 | 11/2019 | Riblet et al. |
| 10,482,746 B1 | 11/2019 | Moon et al. |
| 10,504,189 B1 | 12/2019 | Gaudin et al. |
| 10,506,411 B1 | 12/2019 | Jacob |
| 10,506,990 B2 | 12/2019 | Lee et al. |
| 10,510,120 B1 | 12/2019 | Roll |
| 10,514,669 B1 | 12/2019 | Call et al. |
| 10,515,372 B1 | 12/2019 | Jordan, II et al. |
| 10,522,009 B1 | 12/2019 | Jordan, II et al. |
| 10,522,021 B1 | 12/2019 | Victor |
| 10,546,478 B1 | 1/2020 | Moon et al. |
| 10,547,918 B1 | 1/2020 | Moon et al. |
| 10,548,512 B2 | 2/2020 | Hausdorff et al. |
| 10,565,541 B2 | 2/2020 | Payne et al. |
| 10,572,947 B1 | 2/2020 | Berends et al. |
| 10,573,146 B1 | 2/2020 | Jordan, II et al. |
| 10,573,149 B1 | 2/2020 | Jordan, II et al. |
| 10,579,028 B1 | 3/2020 | Jacob |
| 10,586,177 B1 | 3/2020 | Choueiter et al. |
| 10,607,295 B1 | 3/2020 | Hakimi-Boushehri et al. |
| 10,621,686 B2 | 4/2020 | Mazar et al. |
| 10,623,509 B2 | 4/2020 | Delinselle et al. |
| 10,623,790 B2 | 4/2020 | Maddalena |
| 10,634,576 B1 | 4/2020 | Schick et al. |
| 10,664,922 B1 | 5/2020 | Madigan et al. |
| 10,672,081 B1 | 6/2020 | Lyons et al. |
| 10,679,292 B1 | 6/2020 | Call et al. |
| 10,685,402 B1 | 6/2020 | Bryant et al. |
| 10,699,346 B1 | 6/2020 | Corder et al. |
| 10,699,348 B1 | 6/2020 | Devereaux |
| 10,713,726 B1 | 7/2020 | Allen et al. |
| 10,726,492 B2 | 7/2020 | Snyder et al. |
| 10,726,494 B1 | 7/2020 | Shah et al. |
| 10,726,500 B1 | 7/2020 | Shah et al. |
| 10,733,671 B1 | 8/2020 | Hakimi-Boushehri et al. |
| 10,733,868 B2 | 8/2020 | Moon et al. |
| 10,735,829 B2 | 8/2020 | Petri et al. |
| 10,740,691 B2 | 8/2020 | Choueiter et al. |
| 10,741,033 B1 | 8/2020 | Jordan, II et al. |
| 10,750,252 B2 | 8/2020 | Petri et al. |
| 10,795,329 B1 | 10/2020 | Jordan, II et al. |
| 10,796,557 B2 | 10/2020 | Sundermeyer et al. |
| 10,802,477 B1 | 10/2020 | Konrardy |
| 10,804,700 B2 | 10/2020 | Cohen |
| 10,818,105 B1 | 10/2020 | Konrardy |
| 10,823,458 B1 | 11/2020 | Riblet et al. |
| 10,824,971 B1 | 11/2020 | Davis et al. |
| 10,825,318 B1 | 11/2020 | Williams et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,861,115 B1 | 12/2020 | Stricker et al. |
| 10,907,844 B2 | 2/2021 | Ribbich |
| 10,922,756 B1 | 2/2021 | Call et al. |
| 10,922,948 B1 | 2/2021 | Moon et al. |
| 10,930,141 B2 | 2/2021 | De Paz Alberola et al. |
| 10,943,306 B1 | 3/2021 | Gaudin et al. |
| 10,943,447 B1 | 3/2021 | Jordan, II et al. |
| 10,949,928 B1 | 3/2021 | Roll |
| 10,970,990 B1 | 4/2021 | Jacob |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,024,142 B2 | 6/2021 | Tunnell et al. |
| 11,037,255 B1 | 6/2021 | Ganev et al. |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |

(56) References Cited

U.S. PATENT DOCUMENTS

| | | |
|---|---|---|
| 11,055,797 B1 | 7/2021 | Carone |
| 11,074,659 B1 | 7/2021 | Hakimi-Boushehri et al. |
| 11,087,347 B1 | 8/2021 | De Guia et al. |
| 11,087,420 B1 | 8/2021 | Trundle |
| 11,094,180 B1 | 8/2021 | Williams et al. |
| 11,100,594 B1 | 8/2021 | West et al. |
| 11,118,812 B1 | 9/2021 | Riblet et al. |
| 11,120,226 B1 | 9/2021 | Nudd et al. |
| 11,120,506 B1 | 9/2021 | Devereaux et al. |
| 11,126,708 B2 | 9/2021 | Reimer |
| 11,151,654 B2 | 10/2021 | Trainor et al. |
| 11,164,257 B1 | 11/2021 | Devereaux |
| 11,210,741 B1 | 12/2021 | Allen et al. |
| 11,232,873 B1 | 1/2022 | Aspro et al. |
| 11,277,465 B2 | 3/2022 | Chmielewski |
| 11,308,247 B2 | 4/2022 | McDade |
| 11,348,193 B1 | 5/2022 | Konrardy |
| 11,417,212 B1 | 8/2022 | Farooqui |
| 11,501,100 B1 | 11/2022 | Geng et al. |
| 11,556,995 B1 | 1/2023 | Little et al. |
| 11,587,555 B1 | 2/2023 | Pathak |
| 11,633,103 B1 | 4/2023 | Nudd et al. |
| 11,656,097 B2 | 5/2023 | Vega et al. |
| 11,715,074 B2 | 8/2023 | Aspro et al. |
| 11,748,817 B2 | 9/2023 | Szott |
| 11,783,423 B1 | 10/2023 | Yager et al. |
| 11,941,712 B2 | 3/2024 | Trundle |
| 2002/0046047 A1 | 4/2002 | Budd |
| 2002/0194048 A1 | 12/2002 | Levinson |
| 2003/0001742 A1 | 1/2003 | Eshelman et al. |
| 2003/0023459 A1 | 1/2003 | Shipon |
| 2003/0120588 A1 | 6/2003 | Dodd et al. |
| 2003/0144793 A1 | 7/2003 | Melaku et al. |
| 2004/0030531 A1 | 2/2004 | Miller et al. |
| 2004/0078220 A1 | 4/2004 | Jackson |
| 2004/0220538 A1 | 11/2004 | Panopoulos |
| 2004/0249250 A1 | 12/2004 | McGee et al. |
| 2005/0055249 A1 | 3/2005 | Helitzer et al. |
| 2005/0065678 A1 | 3/2005 | Smith et al. |
| 2005/0137465 A1 | 6/2005 | Cuddihy et al. |
| 2005/0142524 A1 | 6/2005 | Simon et al. |
| 2005/0171645 A1 | 8/2005 | Oswald et al. |
| 2005/0174242 A1 | 8/2005 | Cohen |
| 2005/0228245 A1 | 10/2005 | Quy |
| 2005/0276401 A1 | 12/2005 | Madill et al. |
| 2006/0136273 A1 | 6/2006 | Zizzamia et al. |
| 2006/0143060 A1 | 6/2006 | Conry et al. |
| 2006/0205564 A1 | 9/2006 | Peterson |
| 2007/0088507 A1 | 4/2007 | Haberlen et al. |
| 2007/0185391 A1 | 8/2007 | Morgan |
| 2007/0186165 A1 | 8/2007 | Maislos et al. |
| 2007/0214002 A1 | 9/2007 | Smith et al. |
| 2007/0260401 A1 | 11/2007 | Sydor et al. |
| 2007/0274464 A1 | 11/2007 | Cameron et al. |
| 2007/0282476 A1 | 12/2007 | Song et al. |
| 2008/0084296 A1 | 4/2008 | Kutzik et al. |
| 2008/0154099 A1 | 6/2008 | Aspel et al. |
| 2008/0201174 A1 | 8/2008 | Ramasubramanian et al. |
| 2008/0235629 A1 | 9/2008 | Porter et al. |
| 2008/0240379 A1 | 10/2008 | Maislos et al. |
| 2008/0255862 A1 | 10/2008 | Bailey et al. |
| 2008/0292151 A1 | 11/2008 | Kurtz et al. |
| 2008/0294462 A1 | 11/2008 | Nuhaan et al. |
| 2008/0294490 A1 | 11/2008 | Nuhaan et al. |
| 2009/0010106 A1 | 1/2009 | Levy |
| 2009/0012373 A1 | 1/2009 | Raij et al. |
| 2009/0048865 A1 | 2/2009 | Breazeale, Jr. |
| 2009/0177500 A1 | 7/2009 | Swahn |
| 2009/0206059 A1 | 8/2009 | Kiko |
| 2009/0212959 A1 | 8/2009 | Suber |
| 2009/0259492 A1 | 10/2009 | Cossman |
| 2009/0261943 A1 | 10/2009 | Jana et al. |
| 2009/0265185 A1 | 10/2009 | Finn et al. |
| 2009/0265193 A1 | 10/2009 | Collins et al. |
| 2009/0281393 A1 | 11/2009 | Smith |
| 2009/0315735 A1 | 12/2009 | Bhavani et al. |
| 2009/0326981 A1 | 12/2009 | Karkanias et al. |
| 2010/0050264 A1 | 2/2010 | Aebig et al. |
| 2010/0125911 A1 | 5/2010 | Bhaskaran |
| 2010/0145164 A1 | 6/2010 | Howell |
| 2010/0191824 A1 | 7/2010 | Lindsay |
| 2010/0198608 A1 | 8/2010 | Kaboff et al. |
| 2010/0217702 A1 | 8/2010 | Tu |
| 2010/0222649 A1 | 9/2010 | Schoenberg |
| 2010/0286490 A1 | 11/2010 | Koverzin |
| 2010/0293130 A1 | 11/2010 | Stephan et al. |
| 2011/0021140 A1 | 1/2011 | Binier |
| 2011/0047086 A1 | 2/2011 | Heisterkamp et al. |
| 2011/0125844 A1 | 5/2011 | Collier et al. |
| 2011/0181422 A1 | 7/2011 | Tran |
| 2011/0201901 A1 | 8/2011 | Khanuja |
| 2011/0224501 A1 | 9/2011 | Hudsmith |
| 2011/0246123 A1 | 10/2011 | DelloStritto et al. |
| 2011/0270773 A1 | 11/2011 | Siekman et al. |
| 2011/0295624 A1 | 12/2011 | Chapin et al. |
| 2012/0016528 A1 | 1/2012 | Raman et al. |
| 2012/0035777 A1 | 2/2012 | Park |
| 2012/0072239 A1 | 3/2012 | Gibbard et al. |
| 2012/0095846 A1 | 4/2012 | Leverant |
| 2012/0116820 A1 | 5/2012 | English et al. |
| 2012/0143619 A1 | 6/2012 | Routt |
| 2012/0158618 A1 | 6/2012 | Roskos |
| 2012/0191788 A1 | 7/2012 | Mellen |
| 2012/0280811 A1 | 11/2012 | McKalip et al. |
| 2012/0284040 A1 | 11/2012 | Dupin |
| 2012/0290104 A1 | 11/2012 | Holt et al. |
| 2012/0290230 A1 | 11/2012 | Berges et al. |
| 2013/0006674 A1 | 1/2013 | Bowne et al. |
| 2013/0041841 A1 | 2/2013 | Lyons |
| 2013/0065569 A1 | 3/2013 | Leipzig et al. |
| 2013/0066479 A1 | 3/2013 | Shetty et al. |
| 2013/0073299 A1 | 3/2013 | Warman et al. |
| 2013/0073306 A1 | 3/2013 | Shlain et al. |
| 2013/0080209 A1 | 3/2013 | Begeja et al. |
| 2013/0082842 A1 | 4/2013 | Balazs et al. |
| 2013/0095459 A1 | 4/2013 | Tran |
| 2013/0100268 A1 | 4/2013 | Mihailidis et al. |
| 2013/0147899 A1 | 6/2013 | Labhard |
| 2013/0160072 A1 | 6/2013 | Reus et al. |
| 2013/0197807 A1 | 8/2013 | Du et al. |
| 2013/0262155 A1 | 10/2013 | Hinkamp |
| 2013/0262473 A1 | 10/2013 | Scanlon et al. |
| 2013/0267795 A1 | 10/2013 | Cosentino et al. |
| 2013/0275263 A1 | 10/2013 | Carlin, Jr. et al. |
| 2013/0307694 A1 | 11/2013 | Amar |
| 2013/0338948 A1 | 12/2013 | Zeifman |
| 2014/0032433 A1 | 1/2014 | Eick et al. |
| 2014/0052474 A1 | 2/2014 | Madan et al. |
| 2014/0074454 A1 | 3/2014 | Brown et al. |
| 2014/0108031 A1 | 4/2014 | Ferrara |
| 2014/0129160 A1 | 5/2014 | Tran |
| 2014/0136242 A1 | 5/2014 | Weekes et al. |
| 2014/0136264 A1 | 5/2014 | Kinsey, II |
| 2014/0148733 A1 | 5/2014 | Stone et al. |
| 2014/0200929 A1 | 7/2014 | Fitzgerald et al. |
| 2014/0207486 A1 | 7/2014 | Carty et al. |
| 2014/0214750 A1 | 7/2014 | Healy et al. |
| 2014/0257851 A1 | 9/2014 | Walker et al. |
| 2014/0266669 A1 | 9/2014 | Fadell et al. |
| 2014/0266682 A1 | 9/2014 | Gettings et al. |
| 2014/0266791 A1 | 9/2014 | Lloyd et al. |
| 2014/0270176 A1 | 9/2014 | Gettings et al. |
| 2014/0284348 A1 | 9/2014 | Cheng |
| 2014/0306833 A1 | 10/2014 | Ricci |
| 2014/0358592 A1 | 12/2014 | Wedig et al. |
| 2014/0362213 A1 | 12/2014 | Tseng |
| 2015/0002293 A1 | 1/2015 | Nepo |
| 2015/0006200 A1 | 1/2015 | Chaput et al. |
| 2015/0019262 A1 | 1/2015 | Du et al. |
| 2015/0025917 A1 | 1/2015 | Stempora |
| 2015/0061859 A1 | 3/2015 | Matsuoka et al. |
| 2015/0077237 A1 | 3/2015 | Chou et al. |
| 2015/0094830 A1 | 4/2015 | Lipoma et al. |
| 2015/0109104 A1 | 4/2015 | Fadell et al. |

(56) References Cited

U.S. PATENT DOCUMENTS

| | | |
|---|---|---|
| 2015/0134343 A1 | 5/2015 | Kluger et al. |
| 2015/0154712 A1 | 6/2015 | Cook |
| 2015/0154847 A1 | 6/2015 | Oliver et al. |
| 2015/0154880 A1 | 6/2015 | Petito et al. |
| 2015/0179040 A1 | 6/2015 | Nishihara et al. |
| 2015/0194032 A1 | 7/2015 | Wright |
| 2015/0213224 A1 | 7/2015 | Amarasingham et al. |
| 2015/0223705 A1 | 8/2015 | Sadhu |
| 2015/0227864 A1 | 8/2015 | Payne |
| 2015/0248643 A1 | 9/2015 | Nathanson |
| 2015/0268281 A1 | 9/2015 | Haghighat-Kashani |
| 2015/0269329 A1 | 9/2015 | Fearon et al. |
| 2015/0288797 A1 | 10/2015 | Vincent |
| 2015/0302529 A1 | 10/2015 | Jagannathan |
| 2015/0302538 A1 | 10/2015 | Mazar et al. |
| 2015/0312740 A1 | 10/2015 | Li et al. |
| 2015/0339911 A1* | 11/2015 | Coyne .................. G08B 27/005 340/517 |
| 2015/0347910 A1 | 12/2015 | Fadell et al. |
| 2015/0356701 A1 | 12/2015 | Gandy et al. |
| 2015/0357153 A1 | 12/2015 | Makino et al. |
| 2015/0357155 A1 | 12/2015 | Dohi et al. |
| 2015/0370988 A1 | 12/2015 | Hayward |
| 2016/0026354 A1 | 1/2016 | McIntosh et al. |
| 2016/0027278 A1 | 1/2016 | McIntosh et al. |
| 2016/0035150 A1 | 2/2016 | Barfield, Jr. et al. |
| 2016/0048934 A1* | 2/2016 | Gross .................. G06V 10/40 705/313 |
| 2016/0055593 A1 | 2/2016 | Groeneveld |
| 2016/0055594 A1 | 2/2016 | Emison et al. |
| 2016/0055595 A1 | 2/2016 | Green et al. |
| 2016/0066066 A1 | 3/2016 | Dharmadhikari et al. |
| 2016/0086255 A1 | 3/2016 | Sainfort et al. |
| 2016/0098530 A1 | 4/2016 | Dill et al. |
| 2016/0110509 A1 | 4/2016 | Girardeau et al. |
| 2016/0110818 A1 | 4/2016 | Shemesh et al. |
| 2016/0117646 A1 | 4/2016 | Lerick et al. |
| 2016/0127144 A1 | 5/2016 | Takahashi et al. |
| 2016/0140320 A1 | 5/2016 | Moturu et al. |
| 2016/0155163 A1 | 6/2016 | White et al. |
| 2016/0163186 A1 | 6/2016 | Davidson et al. |
| 2016/0171864 A1 | 6/2016 | Ciaramelletti et al. |
| 2016/0174913 A1 | 6/2016 | Somanath et al. |
| 2016/0210427 A1 | 7/2016 | Mynhier et al. |
| 2016/0212506 A1 | 7/2016 | Norwood et al. |
| 2016/0214571 A1 | 7/2016 | Othmer et al. |
| 2016/0225240 A1 | 8/2016 | Voddhi et al. |
| 2016/0246936 A1 | 8/2016 | Kahn |
| 2016/0259902 A1 | 9/2016 | Feldman et al. |
| 2016/0275633 A1 | 9/2016 | Gitt et al. |
| 2016/0283958 A1 | 9/2016 | Devereaux et al. |
| 2016/0284029 A1 | 9/2016 | Rhodes et al. |
| 2016/0314514 A1 | 10/2016 | High et al. |
| 2016/0321582 A1 | 11/2016 | Broudou et al. |
| 2016/0321587 A1 | 11/2016 | Gitt et al. |
| 2016/0342767 A1 | 11/2016 | Narasimhan et al. |
| 2016/0350721 A1 | 12/2016 | Comerford et al. |
| 2016/0371620 A1 | 12/2016 | Nascenzi et al. |
| 2017/0004273 A1 | 1/2017 | Mbanefo et al. |
| 2017/0004695 A1 | 1/2017 | Brasch et al. |
| 2017/0005958 A1 | 1/2017 | Frenkel et al. |
| 2017/0006135 A1 | 1/2017 | Siebel et al. |
| 2017/0011188 A1 | 1/2017 | Arshad et al. |
| 2017/0011195 A1 | 1/2017 | Arshad et al. |
| 2017/0032466 A1 | 2/2017 | Feldman et al. |
| 2017/0039286 A1 | 2/2017 | Walke et al. |
| 2017/0046501 A1 | 2/2017 | Coleman et al. |
| 2017/0061351 A1 | 3/2017 | Lee et al. |
| 2017/0076408 A1 | 3/2017 | D'Souza et al. |
| 2017/0094057 A1 | 3/2017 | Naiga et al. |
| 2017/0103465 A1 | 4/2017 | Zentler |
| 2017/0116384 A1 | 4/2017 | Ghani |
| 2017/0124276 A1 | 5/2017 | Tee |
| 2017/0124277 A1 | 5/2017 | Shlagman |
| 2017/0124526 A1 | 5/2017 | Sanderford et al. |
| 2017/0154382 A1 | 6/2017 | Mclaughlin et al. |
| 2017/0161614 A1 | 6/2017 | Mehta et al. |
| 2017/0193164 A1 | 7/2017 | Simon et al. |
| 2017/0214758 A1 | 7/2017 | Engel |
| 2017/0221149 A1 | 8/2017 | Hsu-Hoffman et al. |
| 2017/0228109 A1 | 8/2017 | Zhang et al. |
| 2017/0262604 A1 | 9/2017 | Francois |
| 2017/0270260 A1 | 9/2017 | Shetty et al. |
| 2017/0277834 A1 | 9/2017 | Zipnick et al. |
| 2017/0293878 A1 | 10/2017 | Donnelly et al. |
| 2017/0322705 A1 | 11/2017 | Conway et al. |
| 2018/0006899 A1 | 1/2018 | Ogrinz |
| 2018/0007131 A1 | 1/2018 | Cohn et al. |
| 2018/0025430 A1 | 1/2018 | Perl et al. |
| 2018/0032696 A1 | 2/2018 | Rome |
| 2018/0033087 A1 | 2/2018 | Delinselle et al. |
| 2018/0034657 A1 | 2/2018 | Brown et al. |
| 2018/0047107 A1 | 2/2018 | Perl et al. |
| 2018/0068081 A1 | 3/2018 | Salem |
| 2018/0075204 A1 | 3/2018 | Lee et al. |
| 2018/0082184 A1 | 3/2018 | Guo et al. |
| 2018/0153477 A1 | 6/2018 | Nagale et al. |
| 2018/0158548 A1 | 6/2018 | Taheri et al. |
| 2018/0177436 A1 | 6/2018 | Chang et al. |
| 2018/0182055 A1 | 6/2018 | Jepson et al. |
| 2018/0191867 A1 | 7/2018 | Siebel et al. |
| 2018/0194919 A1 | 7/2018 | Wu et al. |
| 2018/0196919 A1 | 7/2018 | Abou Mahmoud et al. |
| 2018/0211509 A1 | 7/2018 | Ramaci |
| 2018/0211724 A1 | 7/2018 | Wang |
| 2018/0218297 A1 | 8/2018 | Payne |
| 2018/0276710 A1 | 9/2018 | Tietzen et al. |
| 2018/0280245 A1 | 10/2018 | Khalid |
| 2018/0308569 A1 | 10/2018 | Luellen |
| 2018/0315499 A1 | 11/2018 | Appelbaum et al. |
| 2018/0322469 A1 | 11/2018 | Logtenberg |
| 2018/0322947 A1 | 11/2018 | Potts et al. |
| 2018/0325470 A1 | 11/2018 | Fountaine |
| 2018/0342329 A1 | 11/2018 | Rufo et al. |
| 2018/0344215 A1 | 12/2018 | Ohnemus et al. |
| 2018/0357386 A1 | 12/2018 | Sanjay-Gopal |
| 2018/0365957 A1 | 12/2018 | Wright et al. |
| 2018/0375680 A1 | 12/2018 | Wright et al. |
| 2019/0011283 A1 | 1/2019 | Soutar et al. |
| 2019/0035028 A1 | 1/2019 | Jones et al. |
| 2019/0046039 A1 | 2/2019 | Ramesh et al. |
| 2019/0057466 A1 | 2/2019 | Udell |
| 2019/0069154 A1 | 2/2019 | Booth et al. |
| 2019/0080056 A1 | 3/2019 | Das et al. |
| 2019/0083003 A1 | 3/2019 | Lee et al. |
| 2019/0102840 A1 | 4/2019 | Perl et al. |
| 2019/0108841 A1 | 4/2019 | Vergyri et al. |
| 2019/0121337 A1 | 4/2019 | Cohen et al. |
| 2019/0122522 A1 | 4/2019 | Stefanski et al. |
| 2019/0122760 A1 | 4/2019 | Wang |
| 2019/0133445 A1 | 5/2019 | Eteminan et al. |
| 2019/0156944 A1 | 5/2019 | Eriksson et al. |
| 2019/0180868 A1 | 6/2019 | Makram et al. |
| 2019/0182299 A1 | 6/2019 | O'Brien |
| 2019/0198169 A1 | 6/2019 | T et al. |
| 2019/0205675 A1 | 7/2019 | McGill |
| 2019/0206533 A1 | 7/2019 | Singh et al. |
| 2019/0251520 A1 | 8/2019 | Bentley, III et al. |
| 2019/0279647 A1 | 9/2019 | Jones et al. |
| 2019/0287376 A1 | 9/2019 | Netscher et al. |
| 2019/0287676 A1 | 9/2019 | Kaplan et al. |
| 2019/0318283 A1 | 10/2019 | Kelly et al. |
| 2019/0320900 A1 | 10/2019 | Majmudar |
| 2019/0325502 A1 | 10/2019 | Tovey et al. |
| 2019/0334907 A1 | 10/2019 | Rodden et al. |
| 2019/0362319 A1 | 11/2019 | Yen |
| 2019/0388017 A1 | 12/2019 | Keating |
| 2019/0392489 A1 | 12/2019 | Tietzen et al. |
| 2020/0005928 A1 | 1/2020 | Daniel |
| 2020/0019852 A1 | 1/2020 | Yoon et al. |
| 2020/0020165 A1 | 1/2020 | Tran et al. |
| 2020/0020454 A1 | 1/2020 | McGarvey et al. |
| 2020/0043077 A1 | 2/2020 | Turner et al. |
| 2020/0058381 A1 | 2/2020 | Patel |

(56) References Cited

U.S. PATENT DOCUMENTS

| | | | |
|---|---|---|---|
| 2020/0074382 A1 | 3/2020 | Olsen et al. |
| 2020/0121544 A1 | 4/2020 | George et al. |
| 2020/0126670 A1 | 4/2020 | Bender et al. |
| 2020/0143655 A1 | 5/2020 | Gray et al. |
| 2020/0160428 A1 | 5/2020 | Calvo et al. |
| 2020/0302549 A1 | 9/2020 | Jordan et al. |
| 2020/0311825 A1 | 10/2020 | Shah |
| 2020/0312113 A1 | 10/2020 | Victor |
| 2020/0320639 A1 | 10/2020 | Shah |
| 2020/0327791 A1 | 10/2020 | Moon et al. |
| 2020/0349632 A1 | 11/2020 | Xu et al. |
| 2021/0011448 A1 | 1/2021 | Coleman et al. |
| 2021/0018335 A1 | 1/2021 | Hood |
| 2021/0019694 A1 | 1/2021 | Dhesi et al. |
| 2021/0019847 A1 | 1/2021 | Sneed |
| 2021/0035432 A1 | 2/2021 | Moon et al. |
| 2021/0042843 A1 | 2/2021 | Bryant et al. |
| 2021/0043058 A1 | 2/2021 | Williams et al. |
| 2021/0090188 A1 | 3/2021 | Lai et al. |
| 2021/0090300 A1 | 3/2021 | Leppänen et al. |
| 2021/0150651 A1 | 5/2021 | Shoup |
| 2021/0158671 A1 | 5/2021 | Jordan et al. |
| 2021/0182986 A1 | 6/2021 | Butler et al. |
| 2021/0279791 A1 | 9/2021 | Jacoby |
| 2021/0279811 A1 | 9/2021 | Waltman |
| 2021/0312789 A1* | 10/2021 | Linn | G08B 25/007 |
| 2021/0335115 A1 | 10/2021 | Williams et al. |
| 2021/0350471 A1 | 11/2021 | Hakimi-Boushehri et al. |
| 2022/0012999 A1 | 1/2022 | Marotta et al. |
| 2022/0013222 A1 | 1/2022 | Marotta et al. |
| 2022/0031239 A1 | 2/2022 | Curtis |
| 2022/0101275 A1 | 3/2022 | Aspro |
| 2022/0343443 A1 | 10/2022 | Graham et al. |
| 2022/0355802 A1 | 11/2022 | Chaves et al. |
| 2022/0391794 A1 | 12/2022 | Singh et al. |
| 2022/0405856 A1 | 12/2022 | Hedges et al. |
| 2023/0023808 A1 | 1/2023 | Wall et al. |
| 2023/0035517 A1 | 2/2023 | Bentley, III et al. |
| 2023/0153916 A1 | 5/2023 | Little et al. |
| 2023/0160941 A1 | 5/2023 | Sloop et al. |
| 2023/0342732 A1 | 10/2023 | Aspro et al. |
| 2023/0342857 A1 | 10/2023 | Gibson et al. |
| 2023/0342858 A1 | 10/2023 | Gibson et al. |
| 2023/0342859 A1 | 10/2023 | Gibson et al. |
| 2023/0342862 A1 | 10/2023 | Gibson et al. |
| 2023/0342867 A1 | 10/2023 | Gibson et al. |
| 2023/0342868 A1 | 10/2023 | Gibson et al. |
| 2023/0342869 A1 | 10/2023 | Gibson et al. |
| 2023/0377070 A1 | 11/2023 | Gibson et al. |
| 2024/0037680 A1 | 2/2024 | Gibson et al. |
| 2024/0046366 A1 | 2/2024 | Yager et al. |
| 2024/0087290 A1 | 3/2024 | Hedges et al. |

FOREIGN PATENT DOCUMENTS

| | | |
|---|---|---|
| CN | 110260927 A | 9/2019 |
| CN | 111402086 A | 7/2020 |
| CN | 111626536 A | 9/2020 |
| CN | 113138558 A | 7/2021 |
| EP | 0769799 A2 | 4/1997 |
| IN | 201811043670 A | 12/2018 |
| JP | 53-131755 A | 11/1978 |
| JP | 09-17191 A | 6/1997 |
| JP | 2002092767 A | 3/2002 |
| JP | 2003157357 A | 5/2003 |
| JP | 2006048554 A | 2/2006 |
| JP | 2009061936 A1 | 2/2009 |
| JP | 2009-272232 A | 11/2009 |
| JP | 2013179381 A | 9/2013 |
| JP | 2014-010928 A | 1/2014 |
| JP | 2014056423 A | 3/2014 |
| JP | 2014-143096 A | 8/2014 |
| JP | 2014142889 A | 8/2014 |
| JP | 2017116994 A | 6/2017 |
| JP | 2017215971 A | 12/2017 |
| KR | 20150129845 A | 11/2015 |
| WO | 2011133628 A1 | 10/2011 |
| WO | 2014106294 A1 | 7/2014 |
| WO | 2014159131 A2 | 10/2014 |
| WO | 2016081511 A2 | 5/2016 |
| WO | 2018052595 A1 | 3/2018 |
| WO | 2019086849 A1 | 5/2019 |
| WO | 2020010217 A1 | 1/2020 |
| WO | 2021087185 A1 | 5/2021 |

OTHER PUBLICATIONS

"Automated Clinical Assessment from Smart home-based Behavior Data". Dawadi, Prafulla Nath. Cook, Diane Joyce. Schmitter-Edgecombe, Maureen. Jul. 2016 (Year: 2016).*

Anomaly Detection: A Survey Varun Chandola, Arindam Banerjee, and Vipin Kumar (Year: 2009).

Chen et al, "Non-Intrusive Occupancy Monitoring using Smart Meters" BuildSys'13: Proceedings of the 5th ACM Workshop on Embedded Systems For Energy-Efficient Buildings, Nov. 2013 pp. 1-8 https://doi.org/10.1145/2528282.2528294 (Year: 2013).

Chen et al, Preventing Occupancy Detection From Smart Meters, IEEE Transactions on Smart Grid vol. 6, No. 5, Sep. 2015 ( Year: 2015).

Current Clamp, downloaded from en.wikipedia.org/wiki/Current_clamp on Feb. 6, 2020 (Year: 2020).

Delany, John, Eyedro EBWEM1 Business Electricity Monitor Review, 2014, downloaded from www.pcmag.com/reviews/eyedro-ebweml-business-electricity-monitor. Feb. 7, 2020 (Year: 2014).

Maestro, Sense Home Energy Monitor Week #1 Update, Sep. 24, 2016. Screen captures dated Feb. 7, 2020 from www.youtube.com/watch?v=KqjJT6YcBZQ&list=PLbzeOtpXZbGjc8E4fyvQZUNHnhM-PC2J2 (Year: 2016).

Pearson correlation coefficient, downloaded from https://en.wikipedia.org/wiki/Pearson_correlation_coefficient, Dec. 1, 2020 (Year:2020).

Sense Home Energy Monitor Unboxing and Installation, Sep. 19, 2016, Screen captures dated Feb. 7, 2020 from www.youtube.com/watch?v=orkcsNw4sDg (Year: 2016).

Patel et al., Internet of Things—IOT: Definition, Characteristics, Architecture, Enabling Technologies, Application & Future Challenges, International Journal of Engineering Science and Computing, pp. 6122-6131 (Year: 2016).

Desjardins/Roost, Smart Water Leak and Freeze Detector, Retrieved from the Internet on May 24, 2019, <https://canadianunderwriter.ca/wp-content/uploads/2017/08/desjardins-370x247.jpg>, 1 page.

EOSventurePartners.com, "Neos—a home insurance solution leveraging smart home technology," 2019, Retrieved from the Internet on May 24, 219: <http://www.eosventurepartners.com/casestudy/neos-case-study/>, 3 pages.

International Preliminary Report on Patentability received for PCT Patent Application No. PCT/JP2017/008755, mailed on Dec. 13, 2017, 11 pages (4 pages of English Translation and 7 pages of Original Document).

International Search Report and Written Opinion received for PCT Patent Application No. PCT/JP2017/008755, mailed on Jun. 6, 2017, 9 pages (2 pages of English Translation and 7 pages of Original Document).

Facts + Statistics: Homeowners and renters insurance by homeowners (Year: 2020).

"Types of Homeowners Insurance Claims," by Pocketsense—pocketsense.com/types-homeowners-insurance-claims-5385090.html (Year: 2017).

"Smart Homes Create New Risk: How Technology Impacts Insurance Coverage" by HUB (Year: 2016).

Francis, Next-Generation Insurance: Tapping into the Intelligence of Smart Homes, Cognizant (Year: 2015).

Curb, https://energycurb.com/, Sep. 24, 2017 (Year: 2017).

Liu et al., "Design and Implementation of Smart-Home Monitoring System with the Internet of Things Technology,"p. 5, Jan. 2016. Retrieved from: https://www.researchgate.net/publication/300330870_Design_and_Implementation_of_Smart-Home_Monitoring_System_with_the_Internet_of_Things_Technology.

(56) References Cited

OTHER PUBLICATIONS

Michaelis et al., "Quality Evaluation of Residential Houses: The Development of a Real-Time Quality Assessment Tool, ". p. 11-12, Jan. 2013. Retrieved from: https://www.researchgate.net/publication/233841366_Quality_Evaluation_of_Residential_Houses_The_Development_of_a_RealTime_Quality_Assessment_Tool.

Moore et al., "An intelligent maintenance system for continuous cost-based prioritisation of maintenance activities," Aug. 2006. Retrieved from: https://www.researchgate.net/publication/222428855_An_intelligent_maintenance_system_for_continuous_costbased_prioritisation_of_maintenance_activities.

Spoor et al., "How can data generated by smart home devices help identify consumer needs?," p. 7, Jul. 2016. Retrieved from: https://essay.utwente.nl/69990/1/Spoor_BA_BMS.pdf.

"How to use Alexa Care Hub to help monitor and contact older relatives or friends", Dave Johnson, Business Insider, Jan. 14, 2021, https://www.businessinsider.com/how-to-use-alexa-care-hub.

"Smart Homes Create New Risk: How Technology Impacts Insurance Coverage"0 by HUB (Year: 2016).

"Alexa: 1001 Tips and Tricks How To Use Your Amazon Alexa devices (Amazon Echo, Second Generation Echo, Echo Show, Amazon Echo Look, Echo Plus, Echo Spot, Echo Dot, Echo Tap, Echo Connect)"0 sales page retrieved from https://www.amazon.com/alexa-tricks-devices-generation-connect/dp/1981989463 on Jul. 6, 2023, 7 p.

"Amazon Echo Show: 2018 Updated Advanced User Guide to Amazon Echo Show with Step-by-Step Instructions (alexa, dot, echo user guide, echo amazon, amazon dot, echo show, user manual)" sales page retrived from https://www.amazon.com/amazon-echo-show-step-step/dp/1986412385 on Jun. 28, 2023, 6 p.

"Amazon.com: Echo Show—1st Generation White: Amazon Devices Accessories" sales page retrieved from https://www.amazon.com/Amazon-Echo-Show-Alexa-Enabled-White/dp/BO10CEHQTG/ref=cm_cr_arp_d_product_topie=UTF8 th=1 on Jun. 20, 2023, 10 p.

"Amazon Echo Quick Start Guide" retrieved from https://d1ergij2b6wmg5.cloudfront.net/Amazon_Echo_Quick_Start_Guide.pdf, retreived Aug. 16, 2023, 1 p.

Goodfellow, Ian et al. Deep Learning captured on Mar. 6, 2017 available at https://web.archive.org/web/20170306055648/http:/www.deeplearningbook.org/, 2 p.

"Amazon Echo (Second Generation) Quick Start Guide" retrieved from https://d1ergij2b6wmg5.cloudfrontnet/Alexa+Devices/Echo_(2nd+Generation)_QSG_US.pdf, retrieved Aug. 16, 2023, 1 p.

"Quick Start Guides for Alexa-Enabled Devices" customer service page retrieved from https://www.amazon.com/gp/help/customer/display.htmlnodeld+202016340 on Jul. 2, 2023, 5 p.

eWall for Active Long Living, Technical evaluation report, Deliverable D6.3 version Final retrieved from https://cordis.europa.eu/docs/projectsicnect/8/610658/080/deliverables/001-eWALLD63v10.pdf , Apr. 30, 2015, 35 p.

eWall for Active Long Living, Smale scale studies report, Deliverable D6.4 version 1.0 retrieved from https://cordis.europa.eu/docs/projects/cnect/8/610658/080/deliverables/001-eWALLD64v10.pdf, Oct. 31, 2015, 115 p.

eWALL Twitter page retrieved from https://twitter.com/eWALLproject on May 31, 2023, 10 p.

eWall for Active Long Living, Standardization contributions, Deliverable D7.5.1 version 0.3 retrieved from https://cordis.europa.eu/docs/projects/cnect/8/610658/080/deliverables/001-eWALLD751v03.pdf, Oct. 31, 2015, 25 p.

"Introducing Echo Show—Black" sales page retrieved from the Wayback Machine at https://web.archive.org/web/20170623020018/https://vvww.amazon.com/Amazon-MW46WB-Introducing-Echo-Show/dp/B01J24COTI on Jun. 23, 2023, 15 p.

"Echo Show I Alexa-enabled Bluetooth Speaker with 7" Screen—Black" sales page retrieved from https://web.archive.org/web/20180905034124/https://vvvvvv.amazon.com/Amazon-Echo-Show-Alexa-Enabled-Black/dp/B01J24COTI on Jun. 27, 2023, 22 p.

eWall for Active Long Living, Technical evaluation report, Deliverable D6.3 version 1.1 retrieved from https://cordis.europa.eu/docs/projectsicnect/8/610658/080/deliverables/001-eWALLD63v11.pdf, Oct. 30, 2015, 68 p.

Ichkov, Aleksandar Atanasovski, Vladimir Gavrilovska, Liljana. (2015). Hybrid access control with modified SINR association for future heterogeneous networks. 5 p.

eWall for Active Long Living, Preliminary User and System Requirements, Deliverable D2.1 version 1 retrieved from https://cordis.europa.eu/docs/projectsicnect/8/610658/080/deliverables/001-eWALLD21v10.pdf, Feb. 26, 2014, 56 p.

eWall for Active Long Living, eWALL configurable metadata streams, Deliverable D3.3.1 version 1.0 retrieved from https://cordis.europa.eu/docs/projectsicnect/8/610658/080/deliverables/001-eWALLD331v10.pdf, Oct. 31, 2014, 27 p.

eWALL OSS—CloudCare2U page retrieved from https://web.archive.org/web/20181129004010/http://cloudcare2u.com/ewall/ on May 31, 2023, 2 p.

Kyriazakos S, Valentini V, Cesario A, Zachariae R. FORECAST—A cloud-based personalized intelligent virtual coaching platform for the well-being of cancer patients. Clin Transl Radiat Oncol. 2017 Nov 21;8:50-59. doi: 10.1016/j.ctro.2017.11.006. PMID: 29594242; PMCID: PMC5862678.

Goodfellow, Ian et al. Deep Learning—Table of Contents—available at https://web.archive.org/web/20170429223627/http://vvvvvv.deeplearningbook.org/contents/TOC.html, 2016, 8 p.

Fratu, Octavia, Martian, Alexandru, Lazaridis, Pavlos, Zaharis, Zaharias D. and Kasampalis, Stylianos (2015) Comparative study of Radio Mobile and ICS Telecom propagation prediction models for DVB-T. In: IEEE BMSB 2015 International Conference, Jun. 17-19, 2015, Ghent, Belgium. 7 p.

eWall for Active Long Living, Education material training of professionals, Deliverable D7.7 version 1.0 retrieved from https://cordis.europa.eu/docs/projects/cnect/8/610658/080/deliverables/001-eWALLD77v10.pdf, Oct. 26, 2016, 70 P.

eWall for Active Long Living, Website, Deliverable D7.1 version 1.0 retrieved from https://cordis.europa.eu/docs/projects/cnect/8/610658/080/deliverables/001-eWALLD71v10.pdf, Nov. 11, 2013, 9 p.

eWall for Active Long Living, Basic disemination material, Deliverable D7.2 version 1.0 retrieved from https://cordis.europa.eu/docs/projects/cnect/8/610658/080/deliverables/001-eWALLD72v10.pdf, Dec. 16, 2013, 14 p.

eWall for Active Long Living, Evaluation and validation methodology, Deliverable D2.6 version 1.2 retrieved from https://cordis.europa.cu/docs/projectsicnect/8/610658/080/deliverables/001-cWALLD26v121.pdf, Oct. 31, 2014, 30 p.

eWALL Project—Github page retrieved from https://github.com/ewallprojecteu on May 31, 2023, 2 p.

Schaarup, Clara Hangaard, Stine Hejlesen, Ole. (2016). Cognitive Walkthrough: An Element in System Development and Evaluation—Experiences From The eWALL Telehealth System. Procedia Computer Science. 100. 539-546. 10.1016/j.procs.2016.09.193.

Bouwer, Julia. Evaluating eWALL: Assessing and enhancing older adults acceptance of a protoype smart home technology, Jan. 2015, retrieved from https://essay.utwente.nl/69042/1/Bouwer_BA_BMS.pdf, 59 p.

Kyriazakos, S., Prasad, R., Mihovska, A. et al. eWALL: An Open-Source Cloud-Based eHealth Platform for Creating Home Caring Environments for Older Adults Living with Chronic Diseases or Frailty. Wireless Pers Commun 97, 1835-1875 (2017). 65 p.

Woyke, Elizabeth, "The Octogenarians Who Love Amazons Alexa", MIT Technology Review, Jun. 9, 2017, 8 p.

eWall for Active Long Living, Ethics, Clinical Workflows and Pathways, Deliverable D2.5 version 1 retrieved from https://cordis.europa.eu/docs/projectsicnect/8/610658/080/deliverables/001-eWALLD25v10.pdf , Jul. 30, 2014, 59 p.

eWall for Active Long Living, Initial Scenarios and Use-Cases, Deliverable D2.2 version 1 retrieved from https://cordis.europa.eu/docs/projectsicnect/8/610658/080/deliverables/001-eWALLD22v10.pdf, Feb. 28, 2014, 74 p.

(56) References Cited

OTHER PUBLICATIONS eWall for Active Long Living, Report on demonstration trial, Deliverable D8.3 version 2.3 retrieved from https://cordis.europa.eu/docs/projects/cnect/8/610658/080/deliverables/001-eWALLD83v23.pdf, Dec. 4, 2016, 104 p.

Choi, Edward, et al. "Doctor AI: Predicting Clinical Events via Recurrent Neural Networks," Proceedings of Machine Learning for Healthcare 2016, JMLR Workshop Conf Proc. Aug. 2016; 56: 301-318.

eWall for Active Long Living, eWALL configurable metadata streams, Deliverable D3.3.2 version 1.0 retrieved from https://cordis.europa.eu/docs/projectsicnect/8/610658/080/deliverables/001-eWALLD332v10.pdf, Apr. 29, 2015, 45 p.

eWall for Active Long Living, Disemination material, Deliverable D7.3 version 1.0 retrieved from https://cordis.europa. eu/docs/projects/cnect/8/610658/080/deliverables/001-eWALLD73v10.pdf, Jan. 31, 2014, 19 p.

eWall for Active Long Living, Socio-economic study, Deliverable D7.10 version 1.0 retrieved from https://cordis.europa.eu/docs/projects/cnect/8/610658/080/deliverables/001-eWALLD710v10.pdf , Oct.r 31, 2016, 44 p.

2nd AHA Summit retrieved from https://web.archive.org/web/20181129003943/http://cloudcare2u.com/2nd-aha-summit/ on May 31, 2023, 5 p.

Lumini, Maria Jose, Fatima Araujo, and Teresa Martins. 2018. "The Role of Educational Technology in Caregiving". Caregiving and Home Care. InTech. doi: 10.5772/intechopen.72887 25 p.

Infarinato, F.; Jansen-Kosterink, S.; Romano, P.; van Velsen, L.; op den Akker, H.; Rizza, F.; Ottaviani, M.; Kyriazakos, S.; Wais-Zechmann, B.; Garschall, M.; et al. Acceptance and Potential Impact of the eWALL Platform for Health Monitoring and Promotion in Persons with a Chronic Disease or Age-Related Impairment. Int. J. Environ. Res. Public Health 2020, 17, 7893. 17 p.

eWall for Active Long Living, Standardization contributions, Deliverable D7.5.2 version 1.0 retrieved from https://cordis.europa.eu/docs/projects/cnect/8/610658/080/deliverables/001-eWALLD751v03.pdf, Oct. 31, 2016, 15 p.

eWall for Active Long Living, 1st Project Workshop, Deliverable D7.6.1 version 1.0 retrieved from https://cordis.europa.eu/docs/projects/cnect/8/610658/080/deliverables/001-eWALLD761v10.pdf, Oct. 31, 2014, 9 p.

Goodfellow, Ian et al. Deep Learning—Chapter 6 Deep Feedforward Networks—available at https://web.archive.org/web/20170429225111/http://www.deeplearningbook.org/contents/mlp.html, 2016, 60 p.

Goodfellow, Ian et al. Deep Learning—Chapter 5 Machine Learning Basics—available at https://web.archive.org/web/20170430011053/http://www.deeplearningbook.org/contents/ml.html, 2016, 68 p.

Hangaard, Stine et al., "Participatory Heuristic Evaluation of the Second Iteration of the eWALL Interface Application", Stud Health Technol Inform. 2016;228:599-603, 5 p.

Daume III, Hal—A Course in Machine Learning captured on Jun. 23, 2023 available at http://ciml.info/, 1 p.

Daume III, Hal—A Course in Machine Learning captured on Jan. 12, 2013 available at https://web.archive.org/web/20130105034530/http://ciml.info/, 1 p.

Daume III, Hal—A Course in Machine Learning captured on Jan. 30, 2017 available at https://web.archive.org/web/20170130021503/http://vvvvvv.ciml.info/, 1 p.

"Exciting Update: Unveiling Our Latest Video Overview of OnGuardian for Communities!"; available at https://www.onguardian.io/exciting-update-unveiling-our-latest-video-overview-of-onguardian-for-communities/; 6 pp.

Parde, Natalie; Reading with Robots: A Platform to Promote Cognitive Exercise Through Identification and Discussion of Creative Metaphor in Books; : University of North Texas. ProQuest Dissertations Publishing, 2018. 11005488. (Year: 2018).

Robben et al. (2016). Delta Features From Ambient Sensor Data are Good Predictors of Change in Functional Health. IEEE Journal of Biomedical and Health Informatics. 21. 1-1. 10.1109/JBHI.2016.2593980. 8 p.

Robben et al. (2012). How Is Grandma Doing? Predicting Functional Health Status from Binary Ambient Sensor Data. AAAI Fall Symposium: Artificial Intelligence for Gerontechnology. 6 p.

Robben et al. (2014). Expert knowledge for modeling the relation between functional health and data from ambient assisted living sensor systems. Poster session presented at 10th Congress of the European Union of Geriatric Medicine Society (EUGMS) 2014, Rotterdam. https://www.thieme-connect.com/products/ejournals/abstract/10.3414/ME15-01-0072, 1 p.

Sprint et al. (2016). Using Smart Homes to Detect and Analyze Health Events. Computer. 49. 29-37. 10.1109/ MC.2016.338. 12 p.

Rantz et al., "Randomized Trial of Intelligent Sensor System for Early Illness Alerts in Senior Housing", J Am Med Dir Assoc. Oct. 1, 2017;18(10):860-870. doi: 10.1016/j.jamda.2017.05.012. Epub Jul. 12, 2017. PMID: 28711423; PMCID: PMC5679074. 28 p.

Petersen et al., "Time Out-of-Home and Cognitive, Physical, and Emotional Wellbeing of Older Adults: A Longitudinal Mixed Effects Model", PLOS One. 2015 Oct 5;10(10): e0139643. doi: 10.1371/journal.pone.0139643. PMID: 26437228; PMCID: PMC4593630. 16 p.

Aicha, A.N. et al., "Continuous measuring of the indoor walking speed of older adults living alone", J Ambient Intell Human Comput, 2018, 9:589-599, 11 p.

Canary Care How It Helps page retrieved from https://web.archive.org/web/20190322142707/canarycare.co.uk/how-it- helps/, Mar. 22, 2019, 10 p.

Canary Care How it works page retrieved from https://web.archive.org/web/20190322142414/https://www.canarycare.co.uk/how-it-works/, Mar. 22, 2019, 9 p.

Hellmers et al., "Towards a minimized unsupervised technical assessment of physical performance in domestic environments", In Proceedings of the 11th EAI International Conference on Pervasive Computing Technologies for Healthcare (PervasiveHealth 2017), Association for Computing Machinery, New York, NY, USA, 207-216. 10 p.

Banerjee et al., "Exploratory analysis of older adults' sedentary behavior in the primary living area using kinect depth data", Journal of Ambient Intelligence and Smart Environments, 9, 163-179, 10.3233/AIS-170428, 2017, 18 p.

Newland et al., "Continuous In-Home Symptom and Mobility Measures for Individuals With Multiple Sclerosis: A Case Presentation", Journal of Neuroscience Nurses, 2017 Aug; 49(4):241-246. doi: 10.1097/JNN.0000000000000299. PMID: 28661948. 6 p.

Seelye et al., "Passive Assessment of Routine Driving with Unobtrusive Sensors: A New Approach for Identifying and Monitoring Functional Level in Normal Aging and Mild Cognitive Impairment", Journal of Alzheimer's Disease, 59, 10.3233/JAD-170116., 2017, 19 p.

Mozer, Michael C . . . "The Neural Network House: An Environment that Adapts to its Inhabitants." Proceedings of the American Association for Artificial Intelligence Spring Symposium on Intelligent Environments, (1998), 5 p.

Mengxuan, Ma et al., "VicoVR-Based Wireless Daily Activity Recognition and Assessment System for Stroke Rehabilitation," 2018 IEEE International Conference on Bioinformatics and Biomedicine (BIBM), Madrid, Spain, 2018, pp. 1117-1121, doi: 10.1109/BIBM.2018.8621151, 5 p.

Mengxuan et al., "Assistive Adjustable Smart Shower System," 2017 IEEE/ACM International Conference on Connected Health: Applications, Systems and Engineering Technologies (CHASE), Philadelphia, PA, USA, 2017, pp. 253-254, doi: 10.1109/CHASE.2017.89, 2 p.

eWall for Active Long Living, Initial Scenarios and Use-Cases, Deliverable D2.2 version 1 retrieved from <https://cordis.europa.eu/docs/projects/cnect/8/610658/080/deliverables/001-eWALLD22v10.pdf>, Feb. 28, 2014, 74 p.

Nashville Post, "Seniors have increasingly become more tech savvy", Aug. 28, 2017, available at https://www.nashvillepost.com/business/people/seniors-have-increasingly-become-more-tech-savvy/article_2e047f87-8872-5d1e- b2cb-5be6392f9efd.html, 4 p.

D. J. Cook et al., "MavHome: an agent-based smart home," Proceedings of the First IEEE International Conference on Pervasive

(56) References Cited

OTHER PUBLICATIONS

Computing and Communications, 2003 (PerCom 2003), Fort Worth, TX, pp. 521-524, doi: 10.1109/ PERCOM.2003.1192783, 15 p.
Austin, Daniel et al., "Unobtrusive monitoring of the longitudinal evolution of in-home gait velocity data with applications to elder care", Conf Proc IEEE Eng Med Biol Soc., 2011; 2011:6495-8. doi: 10.1109/IEMBS.2011.6091603. PMID: 22255826; PMCID: PMC3402166. 9 p.
Kaye JA et al., "Intelligent Systems For Assessing Aging Changes: home-based, unobtrusive, and continuous assessment of aging", The Journals of Gerontology, Series B: Psychological Sciences and Social Sciences, 2011 i180-90, doi: 10.1093/geronb/gbq095, PMID: 21743050; PMCID: PMC3132763, 11 p.
ORCATECH Research Studies available at https://www.ohsu.edu/oregon-center-for-aging-and-technology/orcatech-research-studies, retrieved on Jul. 2, 2023, 4 p.
PubNub, "4 Game Changers from the TechCrunch Disrupt Hackathon", May 5, 2017, 15 p.
Marscarenhas, Natasha, "BostonInno Approved: The Week's Top Tech & Startup Events in Boston", Mar. 17, 2017, 5 p.
"Elderly-Alexa", TechCrunch video retrieved from https://techcrunch.com/unified-video/elderly-alexa/, May 14, 2017, 12 p.
"Facilitating Elders Aging in Place: The 2017 Enterprise Management Hackathon", retrieved from https://mitsloan.mit.edu/sites/default/files/inline-files/2017_EMTrack_Hackathon_article.pdf
"Elderly Alexa' helps families care for their remote loved ones via voice", reposted by Northeastern Global News, May 14, 2017, 3 p.
"Eldery-Alexa" TechCrunch article retrieved from https://techcrunch.com/unified-video/elderly-alexa/, May 14, 2017, 7 p.
C. R. Costa, L. E. Anido-RifOn and M. J. Fernandez-Iglesias, "An Open Architecture to Support Social and Health Services in a Smart TV Environment," in IEEE Journal of Biomedical and Health Informatics, vol. 21, No. 2, pp. 549-560, March 2017, doi: 10.1109/JBHI.2016.2525725 (Year: 2017).
H. Wang, Q. Zhang, M. Ip and J. T. Fai Lau, "Social Media-based Conversational Agents for Health Management and Interventions," in Computer, vol. 51, No. 8, pp. 26-33, Aug. 2018, doi: 10.1109/MC.2018.3191249 (Year: 2018).
The Accuracy Of Self-Reported Data Of An Aging Population Using A Telehealth System In A Retirement Community Setting Based On The User's Age, Gender, Employment Status And Computer Experience, Gurley, Kelley Anne. University of Maryland, Baltimore.
J. Anish Dev, "Bitcoin mining acceleration and performance quantification," 2014 IEEE 27th Canadian Conference on Electrical and Computer Engineering (CCECE), 2014, pp. 1-6 (Year: 2014).
Jeff Johnson, "Designing User Interfaces for an Aging Population"Feb. 2017 | Talks at Google. Retrieved from Youtube: https://www.youtube.com/watch?v=czjksAESHAo, Abstract only.
Kelly, Neural NILM: Deep Neural Networks Applied to Energy Disaggregation, BuildSys '15: Proceedings of the 2nd ACM International Conference on Embedded Systems for Energy-Efficient Built Environments; Nov. 2015 pp. 55-64 (Year: 2015).
The SmartShop, Lightwave RF—How to set up the home energy monitor. Dated Oct. 31, 2012. Screen caps at 1:01,2:10, and 3:06. https://www.youtube.com/watch?v=COqTgsZpMKU (Year: 2012).
Neurio Home Electricity Monitor Review, Jul. 10, 2016, screen capture dated Feb. 7, 2020 from www.youtube.com/ watch?v= xhEefU FdPWo. Feb. 7, 2020 (Year: 2016).
Nunez-Marcos et al., Vision-based fall detection with convolutional neural networks, Wireless and Communications and Mobile Computing, vol. 2017, Article ID 9474806, 16 pgs.
P. Kuryloski, S. Pai, S. Wicker, Y. Xue, "MedSN System for In-Home Patient Monitoring: Architecture, Privacy and Security" Proceedings of the Joint Conference on High Confidence Medical Devices, Software, and Systems (HCMDSS07) and Medical Device Plug-and-Play Interoperability (MD PnP07), Jun. 25-27, 2007, Boston, MA.
Tesla. (Dec. 6, 2018). Discover Software Version 9.0. Retrieved from Tesla Corporation Website: https://www.tesla.com/support/software-v9.
Yildirim et al., Fall detection using smartphone-based application, International Journal of Applied Mathmatics Electronics and Computers 4, No. 4, 2016.
Apple. (Dec. 17, 2018). SilverSneakers GO. Retrieved from Itunes App Store: https://itunes.apple.com/us/app/silversneakers-go/id1410437380?mt=8.
S. A. Becker and F. Webbe, "Use of Handheld Technology by Older Adult Caregivers as Part of a Virtual Support Network," 2006 Pervasive Health Conference and Workshops, 2006, pp. 1-10, doi: 10.1109/PCTHEALTH.2006.361697.
S. Jiang, Y. Cao, S. Iyengar, P. Kuryloski, R. Jafari, Y. Xue, R. Bajcsy, S. Wicker. "CareNet: An Integrated Wireless Sensor Networking Environment for Remote Healthcare," Proceedings of the 3rd International Conference on Body Area Networks (BODYNETS 2008), Mar. 13-15, 2008.
ORCATECH: Publications available at https://www.ohsu.edu/oregon-center-for-aging-and-technology/publications, retrieved on Jul. 3, 2023, 34 p.
ORCATECH Oregon Center for Aging and Technology available at https://www.ohsu.edu/oregon-center-for-aging-and-technology, retrieved on Jul. 3, 3023, 2 p.
About ORCATECH available at https://vvvvvv.ohsu.edu/oregon-center-for-aging-and-technology/about-orcatech, retrieved Jul. 3, 2023, 2 p.
ORCATECH: Publications available at https://www.ohsu.edu/oregon-center-for-aging-and-technology/publications, retrieved Jul. 3, 2023, 21 p.
ORCATECH Research Studies available at https://www.ohsu.edu/oregon-center-for-aging-and-technology/orcatech-research-studies, retrieved Jul. 3, 2023, 3 p.
MavHome:: Contacts available at https://ailab.wsu.edu/mavhome/contacts.html, retrieved on Jul. 3, 2023.
MavHome:: Information available at https://ailab.wsu.edu/mavhome/information.html, retrieved on Jul. 3, 2023.
MavHome:: Index available at https://ailab.wsu.edu/mavhome/index.html, retrieved on Jul. 3, 2023.
MavHome:Press available at https://ailab.wsu.edu/mavhome/press.html, retrieved on Jul. 3, 2023.
"Introducing Echo Show—Black" sales page retrieved from https://web.archive.org/web/20170623020018/https://www.amazon.com/Amazon-MW46WB-Introducing-Echo-Show/dp/B01J24COTI 1 p.
MavHome:: People available at https://ailab.wsu.edu/mavhome/people.html, retrieved on Jul. 3, 2023.
MavHome:Publications available at https://ailab.wsu.edu/mavhome/publications.html, retrieved on Jul. 3, 2023.
MavHome:: Research available at https://ailab.wsu.edu/mavhome/research.html, retreived on Jul. 3, 2023.
Lifepod Main page retrieved from https://web.archive.org/web/20180826082654/https://lifepod.com/, Aug. 26, 2018, 6 p.
Oregon Center for Aging and Technology available at https://www.ohsu.edu/oregon-center-for-aging-and-technology, retrieved on Jul. 2, 2023, 3 p.
HoneyCo webpage retrieved from The Wayback Machine at https://web.archive.org/web/20170930035447/https://honeyco.com/, September 30, 2017, 5 p.
eWall for Active Long Living, 2nd Project Workshop, Deliverable D7.6.2 version 1.0 retrieved fom https://cordis.europa.eu/docs/projects/cnect/8/610658/080/deliverables/001-eWALLD77v10.pdf, Oct. 30, 2015, 12 p.
eWall for Active Long Living, 3rd Project Workshop, Deliverable D7.6.3 version 1.0 retrieved from https://cordis.europa.eu/docs/projects/cnect/8/610658/080/deliverables/001-eWALLD763v10.pdf, Oct. 31, 2016, 10 p.
"HoneyCo Homes: Using Smart Technology to Help Seniors Age in Place" Nashville Medical News, Nov. 9, 2017, retrieved from https://www.nashvillemedicalnews.com/article/1779/honeyco-homes-using-smart-technology-to- help-seniors-age-in-place, 4 p.

(56) References Cited

OTHER PUBLICATIONS

Fadia, Shrey, IoT for the Aging: Youre Never Too Old to Innovate, IoT Evolution, Feb. 22, 2018, retrieved from https://www.iotevolutionworld.com/iot/articles/437130-iot-the-aging-youre-never-too-old-innovate.htm, 4 p.

HoneyCo Homes Facebook page retrieved from https://www.facebook.com/honeycohomes/ on Jul. 3, 2023, 21 p.

Jarvis, Jan—"An open door to technology available", Star-Telegram at https://ailab.wsu.edu/mavhome/files/fst. 12.1.02.2.jpg, Dec. 1, 2002, 3 p.

Kennedy, Eleanor, "Why this entrepreneur moved from New York to launch his startup in Nashville", Nashville Business Journal, Jun. 13, 2016, 7 p.

Bennison, Theres no place like (this home)—UTA awarded $1.16 million to develop Home of the Future, Fort Worth Business Press, available at https://ailab.wsu.edu/mavhome/files/a11.16.01.jpg, Nov. 16, 2001, 1p.

Jarvis, Jan—UTA research seeks to create smart house StarTelegraph; Nov. 20, 2001, available at https://ailab.wsu.edu/mavhome/files/a11.20.01.jpg, 1p.

Times, "Smart House being created by researchers at the University of Texas at Arlington", Dec. 29, 2001 available at https://ailab.wsu.edu/mavhome/files/a12.29.01.01.jpg, 1 p.

Jarvis, Jan, Home of the Future available at https://ailab.wsu.edu/mavhome/files/a12.29.01.02.jpg, Dec. 29, 2001, 1p.

Trimble, Jane Ramos, "UT-Arlington project envisions smarter homes", available at https://ailab.wsu.edu/mavhome/files/a2.16.02.01.jpg, Feb. 16, 2002, 1 p.

"Home" available at https://ailab.wsu.edu/mavhome/files/a2.16.02.02.jpg, Feb. 16, 2002, 1 p.

"Smart Homes" available at https://ailab.wsu.edu/mavhome/files/a8.15.02.txt, Aug. 15, 2002, 1 p.

Borisov et al., "Measuring Changes in Gait and Vehicle Transfer Ability During Inpatient Rehabilitation with Wearable Inertial Sensors" Proc IEEE Int Conf Pervasive Comput Commun Workshops, Mar. 2017; 2017:10.1109/PERCOMW.2017.7917600. doi: 10.1109/PERCOMW.2017.7917600. PMID: 28691124; PMCID: PMC5497512, 25 p.

Zanthion Smart Motion sales page retrieved from https://web.archive.org/web/20190128004506/https://zanthion.com/product/smart-motion/, retrieved 2018, 1 p.

Ralevic, Uros. How to build a custom Amazon Alexa skill, step-by-step: My favorite chess player. Crowdbiotics. Jul. 24 2018. 28 p.

Su et al., "Radar placement for fall detection: Signature and performance", Journal of Ambient Intelligentce and Smart Environments, 2018, 10.3233/AIS-170469, 14 p.

Aicha et al., "Continuous Gait Velocity Analysis Using Ambient Sensors in a Smart Home", 219-235. 10.1007/978-3-319-26005-1_15, 2015, 17 p.

Robben et al. (2014). Expert knowledge for modeling the relation between functional health and data from ambient assisted living sensor systems. Poster session presented at 10th Congress of the European Union of Geriatric Medicine Society (EUGMS) 2014, Rotterdam. https://wvvvv.thieme-connect.com/products/ejournals/abstract/10.3414/ME15-01-0072, 1 p.

Amazon Echo Show Teardown available at https://web.archive.org/web/20180130021123/ifixit.comiteardown/amazon+echo+show+teardown/94625 10 p.

Chung et al., "Feasibility testing of a home-based sensor system to monitor mobility and daily activities in Korean American older adults", Int J Older People Nurs. Mar. 2017; 12(1). doi: 10.1111/opn. 12127. PMID: 27431567. 31 p.

Wang et al. Performance-based physical function and future dementia in older people. Arch Intern Med. 2006 May 22; 166(10):1115-20. doi: 10.1001/archinte.166.10.1115. PMID: 16717174.6 p.

Prospero, Mike. How to Create an Alexa Smart Home Routine. Toms Guide. Mar. 1, 2019. 19 p.

Fritz et al., "Identifying Varying Health States in Smart Home Sensor Data : An Expert-Guided Approach", 2017, 6 p.

Newman, Jared. How to use Alexa Routines to make your Amazon Echo event smarter, TechHive. Dec. 17, 2018. 9 p.

Care@Home Administrator User Guide retrieved from https://web.archive.org/web/20161109082617/essence-grp.com:80/data/upl/care_home_administrator_userguide.pdf, Jun. 2016, 117 p.

Essence Smart Care—Care@Home retrieved from https://web.archive.org/web/20161021001627/http://www.essence-grp.com/data/upl/resources/Essence%20Smart%20Care.pdf, retrieved Oct. 21, 2016, 6 p.

Care@Home PERS Control Panel User Guide retrieved from https://web.archive.org/web/20180413032733/http://wwwvv.essence-grp.com/data/upl/Care_Home_PERS_CP_UG.pdf, Sep. 2014, 38 p.

Riboni et al., "Fine-grained recognition of abnormal behaviors for early detection of mild cognitive impairment,"2015 IEEE International Conference on Pervasive Computing and Communications (PerCom), St. Louis, MO, USA, 2015, pp. 149-154, doi: 10.1109/PERCOM.2015.7146521. 10 p.

"16 Factors that affect Homeowners Insurance premiums" by Insurance.com (Year: 2013).

Amazons Care Hub will see success due to swelling interest in aging at home and boosted smart speaker adoption, Zoe LaRock, Nov. 13, 2020, https://www.businessinsider.com/amazon-care-hub-will-succeed-amid-growing-smart-speaker-adoption-2020-11.

"Alexa and Alexa Device FAQs" retrieved from https://web.archive.org/web/20171207040009/https://www.amazon.com/gp/help/customer/display.htmi/ref=p_left_v4_sibie=UTF8 nodeid=20 1602230 on Dec. 7, 2017, 8 p.

"Introducing Echo Show—Black" sales page retrieved from the Wayback Machine at https://web.archive.org/web/20230327065229/https://www.amazon.com/Amazon-MW46WB-Introducing-Echo-Show/dp/B01J24COTI on Jun. 23, 2017, 1 p.

"Echo Show" sales page retrieved from the Wayback Machine at https://web.archive.org/web/20170703150634/https://vvwvv.amazon.com/Amazon-Echo-Show-ALexa-Enabled-Black/dp/B01J24COTI on Sep. 5 2018, 1 p.

eWALL: An Open-Source Cloud-Based eHealth Platform for Creating Home Caring Environments for Older Adults Living with Chronic Diseases or Frailty—coversheet at https://link.springer.com/article/10.1007/s11277-017-4656-7, 2017, 2 p.

"Elderly-Alexa" TechCrunch article retrieved from https://techcrunch.com/unified-video/elderly-alexa/, May 14, 2017, 7 p.

"Facilitating Elders Aging in Place: The 2017 Enterprise Management Hackathon", retrieved from https://mitsloan.mit.adu/sites/defaultitiles/inline-files/2017_EMTrack_Hackathon_article.pdf.

Perez, Sarah, 'Elderly Alexa' helps families care for their remote loved ones via voice, TechCrunch, May 14, 2017, 8 p.

C. R. Costa, L. E. Anido-Rifon and M. J. Fernandez-Iglesias, "An Open Architecture to Support Social and Health Services in a Smart TV Environment," in IEEE Journal of Biomedical and Health Informatics, vol. 21, No. 2, pp. 549-560, Mar. 2017, doi: 10.1109/JBHI.2016.2525725 (Year: 2017).

S. Jiang, Y. Cao, S. Iyengar, P. Kuryloski, R. Jafari, Y. Xue, R. Bajcsy, S. Wicker. "CareNet: An Integrated Wireless Sensor Networking Environment for Remote Healthcare," Proceedings of the 3rd International Conference on Body okrea Networks (BODYNETS 2008), Mar. 13-15, 2008.

Apple. (Dec. 6, 2018). App Store. Retrieved from Apple Web Site: https://www.apple.com/ios/app-store/.

EOSVenturePartners.com, "Neos—a home insurance solution leveraging smart home technology," 2019, Retrieved tom the Internet on May 24, 219: http://www.eosventurepartners.com/casestudy/neos-case-study/, 3 pages.

E. Leinonen, A. Firouzian, C. Partanen and P. Pulli, "Visual validation services with time coordination for senior citizens social events—OldBirds digital twin platform," 2019 IEEE International Conference on Engineering, Technology and Innovation (ICE/ITMC), 2019, pp. 1-7, doi: 10.1109/ICE.2019.8792663.

Tesla. (Dec. 6, 2018). Discover Software Version 9.0. Retrieved from Tesla Corporation Website: https://www.esla.com/support/software-v9.

Nunez-Marcos et al., Vision-based fall detection with convolutional neural networks, Wireless Communications and Mobile Computing, vol. 2017, Article ID 9474806, 17 pgs.

(56) References Cited

OTHER PUBLICATIONS

Pirzada et al, Sensors in Smart Homes for Independent Living of the Elderly, 2018, 2018 5th International Multi-Topic CT Conference (IMTIC) (Year: 2018).
Apple. (Dec. 17, 2018). SilverSneakers GO. Retrieved from Dunes App Store: https://itunes.apple.com/us/app/silversneakers-go/id1410437380mt=8.
Apple. (2018, December 6). DVD Netflix. Retrieved from iTunes App Store Preview: https://itunes.apple.com/us/app/dvd-netflix/id1169772776?mt=.
Yildirim et al., Fall detection using smartphone-based application, International Journal of Applied Mathematics Electronics and Computers 4, No. 4, 2016.
Desjardins/Roost, Smart Water Leak and Freeze Detector, Retrieved from the Internet on May 24, 2019, https://lanadianunderwriter.ca/wp-content/uploads/2017/08/desjardins-370x247.jpg, 1 page.
"Types of Homeowners Insurance Claims," by Pocketsense—pocketsense.com/types-homeowners-insurance-alaims-5385090.html (Year: 2017).
Apple. (Dec. 6, 2018). DVD Netflix. Retrieved from iTunes App Store Preview: https://itunes.apple.com/us/app/dvd-netflix/id1169772776mt=8.
"Does Homeowners Insurance Cover Spoiled Food After A Power Outage," by Allstate—Mar. 2018 (Year: 2018).
J. Kuryloski, S. Pai, S. Wicker, Y. Xue, "MedSN System for In-Home Patient Monitoring: Architecture, Privacy and Security" Proceedings of the Joint Conference on High Confidence Medical Devices, Software, and Systems (HCMDSS07) and Medical Device Plug-and-Play Interoperability (MD PnP07), Jun. 25-27, 2007, Boston, MA.
"Are Appliances Covered Under Homeowners Insurance Policies" by Robert Alley (Year: 2014).
Yu et al. A posture recognition-based fall detection system for monitoring an elderly person in a smart home environment, IEEE transactions on Information Technology in Biomedicine 16, No. 6: 1274-1286.
S. A. Becker and F. Webbe, "Use of Handheld Technology by Older Adult Caregivers as Part of a Virtual Support getwork," 2006 Pervasive Health Conference and Workshops, 2006, pp. 1-10, doi: 10.1109/JCTHEALTH.2006.361697.
What is a CLUE Report by Roy et al. (Year: 2020).
Austin et al., "Variability in medication taking is associated with cognitive performance in nondemented older adults", Alzheimers and Dementia: Diagnosis, Assessment and Disease Monitoring, 2017, doi: 10.1016/j.dadm.2017.02.003. PMID: 28349120; PMCID: PMC5358531, 4 p.
Pullen, John Patrick. This Amazon Echo Tip Is Great for Families and Roommates. TIME, Feb. 13, 2017. retrieved from https://fortune.com/2017/02/13/amazon-echo-alexa-tips/ 6 p.
Amazon Echo Show Teardown available at https://web.archive.org/web/20180130021123/ifixit.com/teardown/amazon+echo+show+teardown/94625, Jan. 28, 2017, 11 p.
Jarvis, Jan, "The house that tech built—Buttons Push Themselves in Smart Texas Protoype and the Livin is easy" available at https://ailab.wsu.edu/mavhometfiles/a1.5.02.jpg, Jan. 11, 2002, 2 p.
Austin et al., "A Smart-Home System to Unobtrusively and Continuously Assess Loneliness in Older Adults", IEEE Journal of Translational Engineering in Health and Medicine, 2016, doi: 10.1109/JTEHM.2016.2579638. PMID: 27574577; PMCID: PMC4993148, 11 p.
Dawadi et al., "Automated Clinical Assessment From Smart Home-Based Behavior Data", IEEE J Biomed Health Inform. 2016 Jul;20(4):1188-94. doi: 10.1109/JBHI.2015.2445754, PMID: 26292348; PMCID: PMC4814350, 38 P.
Rantz et al., "Randomized Clinical Trial of Technology to Automatically Detect Early Signs of Illness in Senior Housing", J Am Med Dir Assoc. Oct. 1, 2018;18(10):860-870. doi: 10.1016/j.jamda.2017.05.012. Epub Jul. 12, 2017 PMID: 28711423; PMCID: PMC5679074. 28 p.

Gonfalonieri, Alexandre. How Amazon Alexa works Your guide to Natural Language Processing (AI) Towards Data Science, Nov. 21, 2018 17 p.
Edison et al. (2017). Challenges and Opportunities in Automated Detection of Eating Activity. In: Rehg, J., Murphy, S., Kumar, S. (eds) Mobile Health. Springer, Cham. 24 p.
TruSense main page retrieved from https://web.archive.org/web/20180422211851/https://mytrusense.com/, 2018, 12 P.
Akl et al. Unobtrusive Detection of Mild Cognitive Impairment in Older Adults Through Home Monitoring. IEEE J Biomed Health Inform. 2017 Mar;21(2):339-348. doi: 10.1109/JBHI.2015.2512273. Epub Dec. 24, 2015. PMID: 26841424; PMCID: PMC4919247. 22 p.
Canary Care How it works page retrieved from https://web.archive.org/web/20190322142414/https://vvvvvv.canarycare.co.uk/how-it-works/, Mar. 22, 2019, 9 p.
Zanthion Environmental Sensors page retrieved from https://web.archive.org/web/20180711114243/http://www.zanthion.com/environment-sensors-notification/, retrieved 2018, 4 p.
Zechmann et al., "Challenges in communicating user requirements: Lessons learned from a multi-national AAL project", International Reports on Socio-Informatics (IRSI), Proceedings of the COOP 2016—Symposium on challenges and experiences in designing for an ageing society, (vol. 13, Iss. 3, pp. 43-50), 8 p.
Newland et al., "Continuous In-Home Symptom and Mobility Measures for Individuals With Multiple Sclerosis: A Case Presentation", Journal of Neuroscience Nurses, Aug. 2017; 49(4):241-246. doi: 10.1097/JNN.0000000000000299. PMID: 28661948. 6 p.
Care Predict How it Works page retrieved from https://web.archive.org/web/20230627100828/https://vvvvvv.carepredict.com/how-it-works!, Jan. 12, 2018, 6 p.
Curci et al., "Toward Naturalistic Self-Monitoring of Medicine Intake", In Proceedings of the 12th Biannual Conference on Italian SIGCHI Chapter (CHItaly 17), Association for Computing Machinery, New York, NY, USA, Article 3, 1-6. https://doi.org/10.1145/3125571.3125582, 6 p.
Su et al., "Monitoring the Relative Blood Pressure Using a Hydraulic Bed Sensor System", IEEE Transactions on Biomedical Engineering, vol. 66, No. 3, Mar. 2019, 740-748, doi: 10.1109/TBME.2018.2855639, PMID: 30010544, 9 P.
TruSense description page retrieved from https://web.archive.org/web/20170919160359/https://mytrusense.com/how-it-works, 2017, 9 p.
"Amazon Echo Silver—Saturday Night Live" video available at https://www.youtube.com/watchv=YvT_gqs5ETk, posted May 13, 2017.
"HoneyCo Connect" video available at https://fabricofdigitallife.com/Detail/objects/3488, posted Jul. 5, 2017.
HoneyCo Homes, "Caregiver Platform" video available at https://vimco.com/240045919, posted 2017.
HoneyCo Homes, "Office Basic" video available at https://vimeo.com/250049021, posted 2018.
HoneyCo Homes, "Office Advanced" video available at https://vimeo.com/250049062, posted 2018.
HoneyCo Homes, "Office Basic" video available at https://vimeo.com/250126734, posted 2018.
HoneyCo Homes, "HoneyCo Advanced" video available at https://vimeo.com/250139424, posted 2018
NBC 5, Dallas-Fort Worth, February 23, 2004, video available at https://ailab.wsu.edu/mavhome/movies/MavPad_NBC5_2_23_2004.mov.
Amazon Echo Show Teardown video available at https://web.archive.org/web/20180130021123/ifixit.comiteardown/amazon+echo+show+teardown/94625, Jan. 30, 2018.
Meet Alexa:Reminders video available at https://www.youtube.com/shorts/v7ZmznZgxSY.
FreeCodeCamp.org, Amazon Alexa Development 101 (full tutorial course—Jun. 2018 version) video available at https://www.youtube.com/watchv=QkbXjknPoXc.
Toms Guide, So Easy: How to Delete Alexas History video available at https://www.youtube.com/watchv=VvS9JOtv5e0, 2017.
HoneyCo Homes, "HoneyCo Connect" available at https://vimeo.com/224366987, posted 2017.

(56) References Cited

OTHER PUBLICATIONS

Sprint et al. Analyzing Sensor-Based Time Series Data to Track Changes in Physical Activity during Inpatient Rehabilitation. Sensors (Bascl). 2017 Sep 27;17(10):2219. doi: 10.3390/s17102219. PMID: 28953257; PMCID: PMC5677114. 20 p.

Dawadi et al., "Automated Cognitive Health Assessment From Smart Home-Based Behavior Data", IEEE J Biomed Health Inform. Jul. 2016;20(4): 1188-94. doi: 10.1109/JBHI.2015.2445754, PMID: 26292348; PMCID: PMC4814350, 38 p.

Alpaydin, Ethem "Introduction to Machine Learning" (3d ed. 2014) 640 p.

"Amazon Introduces the Alexa Skills Kit—A Free SDK for Developers," available at https://press.aboutamazon.com/2015/6/amazon-introduces-the-alexa-skills-kit-a-free-sdk-for-developers; Jun. 25, 2015; 7 pp.

"Announcing New Alexa Skills Kit (ASK) Features: Account Linking and Service Simulator," available at https://developer.amazon.com/en-US/blogs/alexa/post/Tx7MF6PV44SOXU/announcing-new-alexa-skills-kit-ask-features-account-linking-and-service-simulato.html; Sep. 4, 2015; 3 pp.

"2015 Year in Review: More than 130 Skills On Alexa [Infographic]," available at https://developer.amazon.com/en-US/blogs/alexa/post/Tx2V9VQZDG9IXX/2015-year-in-review-more-than-130-skills-on-alexa-infographi.html; Jan. 7, 2016; 2 pp.

"Amazon Announces HIPAA-Compliant Alexa Skills, Opening Possibilities for Senior Living," available at https://seniorhousingnews.com/2019/04/04/amazon-announces-hipaa-compliant-alexa-skills-opening-possibilities-for-senior-living/; Apr. 4, 2019; 4 pp.

"Ask My Buddy," available at https://www.amazon.com/Beach-Dev-Ask-My-Buddy/dp/B017YAF22Y; 2 pp.

"OnGuardian Wins Top Prize," available at https://www.onguardian.io/test-post/; 1 p.

"OnGuardian Selected as Finalist at Aging2.0 Global Startup Search," available at https://www.onguardian.io/new-post/; 2 pp.

"Exciting Update: Unveiling Our Latest Video Overview of OnGuardian for Communities!"; available at https://www.onguardian.io/category/news/; 1 p.

OnGuardian by OnGuardian Apps LLC; https://www.amazon.com/OnGuardian-Apps-LLC/dp/B06XGTJ549; 3 pp.

User Guide-Registration and Setup; https://www.onguardian.io/new-post-2/; 2 pp.

* cited by examiner

SYSTEMS AND METHODS FOR HOME HEALTH EVALUATION AND REMEDIATION

CROSS-REFERENCE TO RELATED APPLICATIONS

This application claims priority to and the benefit of the filing date of U.S. Provisional Application No. 63/049,942 filed on Jul. 9, 2020, entitled "SYSTEMS AND METHODS FOR HOME HEALTH EVALUATION AND REMEDIATION," and U.S. Provisional Patent Application Ser. No. 63/056,359 filed Jul. 24, 2020, entitled "SYSTEMS AND METHODS FOR HOME HEALTH EVALUATION AND REMEDIATION," the entire contents and disclosures of which are hereby incorporated herein by reference in their entireties.

FIELD OF THE DISCLOSURE

The present disclosure relates to housing and, more particularly, to systems and methods for evaluating home health and risk of hazards for protection and remediation.

BACKGROUND

Numerous risks exist for the residential homeowner, from acts of nature such as flooding, lightning, tornados, or hurricanes, to electrical fires caused by failing appliances or electrical connections, to home security risks such as theft or vandalism. Many of these risks are present due to inherent factors not easily controlled or mitigated by the homeowner, but some risks may be addressed by the homeowner. Homeowners may be able to reduce risk by performing certain mitigating actions, but homeowners are often unaware of many risks and what corrective actions they could take. For example, fire can be caused in the home due to a failing electrical connection causing electricity to arc across a small air gap, thereby leading to extra resistance and heat generated at the point of the failure. However, such problems may be difficult for the homeowner to detect and avoid.

To protect their home and other assets on their property, homeowners typically carry homeowners insurance. Insurance carriers typically consider various factors when pricing such policies, but many factors are left unconsidered due to various issues, such as access to risk data. As such, many risks may go unnoticed until a loss occurs. What is needed is a system for detecting risks to home health and providing various protections and remediation for such risks.

BRIEF SUMMARY

The present embodiments may relate to systems and methods for evaluating aspects of health of a residential property. The system may include a remote system server, an internal home health controller, and one or more smart devices installed within the residential property. The internal home health controller may be installed within the residential property, and may be configured to receive internal home health data from the one or more smart devices via a home network. The internal home health data may reflect an aspect of operational quality of one or more assets of the residential property.

In one aspect, the remote system server may be configured to communicate with the internal home health controller and one or more external data sources outside the residential property via an external network. The remote system server may include one or more processors and/or associated transceivers programmed to: (i) receive a first element of internal home health data from the internal home health controller; (ii) determine a safety score for the residential property based at least in part on the first element of internal home health data, the safety score representing a measure of safety of the residential property; (iii) receive a first element of external data from the one or more external data sources, the first element of external data relating to a geographical region of the residential property; (iv) determine a home health score for the residential property based at least in part on one or more of the first element of internal home health data provided by the one or more smart devices and the first element of external data from the one or more external data sources, the home health score representing a measure of health of the residential property; and/or (v) cause to be displayed, to a homeowner of the residential property via a graphical user interface, a home health evaluation that includes the safety score and the home health score for the residential property. The remote system server may have additional, less, or alternate functionality, including that discussed elsewhere herein.

In another aspect, a computing device for evaluating aspects of health of a residential property is provided. The computing device may include at least one processor and/or associated transceiver programmed to: (i) receive a first element of internal home health data captured by one or more smart devices installed within the residential property, the first element of internal home health data reflecting an aspect of operational quality of one or more assets of the residential property; (ii) determine a safety score for the residential property based at least in part on the first element of internal home health data, the safety score representing a measure of safety of the residential property; (iii) receive a second element of internal home health data captured by the one or more smart devices; (iv) determine a home health score for the residential property based at least in part on one or more of the first element of internal home health data and the second element of internal home health data, the home health score representing a measure of health of the residential property; and/or (v) cause to be displayed, to a homeowner of the residential property via a graphical user interface, a home health evaluation that includes the safety score and the home health score for the residential property. The computing device may have additional, less, or alternate functionality, including that discussed elsewhere herein.

In yet another aspect, a computer-implemented method of evaluating aspects of health of a residential property is provided. The computer-implemented method may be performed by a computing device including at least one processor and/or associated transceiver. The method may include, via the at least one processor and/or associated transceiver: (i) receiving a first element of internal home health data captured by one or more smart devices installed within the residential property, the first element of internal home health data reflecting an aspect of operational quality of one or more assets of the residential property; (ii) determining a safety score for the residential property based at least in part on the first element of internal home health data, the safety score representing a measure of safety of the residential property; (iii) receiving a second element of internal home health data captured by the one or more smart devices; (iv) determining a home health score for the residential property based at least in part on one or more of the first element of internal home health data and the second element of internal home health data, the home health score representing a measure of health of the residential property; and/or (v) causing to be displayed, to a homeowner of the residential property via a graphical user interface, a home health evaluation that includes the safety score and the home health score for the residential property. The method may have additional, less, or alternate actions, including that discussed elsewhere herein.

In still another aspect, a non-transitory computer readable medium having computer-executable instructions embodied thereon for evaluating aspects of health of a residential property is provided. When executed by at least one processor and/or associated transceiver, the computer-executable instructions cause the at least one processor and/or associated transceiver to: (i) receive a first element of internal home health data captured by one or more smart devices installed within the residential property, the first element of internal home health data reflecting an aspect of operational quality of one or more assets of the residential property; (ii) determine a safety score for the residential property based at least in part on the first element of internal home health data, the safety score representing a measure of safety of the residential property; (iii) receive a second element of internal home health data captured by the one or more smart devices; (iv) determine a home health score for the residential property based at least in part on one or more of the first element of internal home health data and the second element of internal home health data, the home health score representing a measure of health of the residential property; and/or (v) cause to be displayed, to a homeowner of the residential property via a graphical user interface, a home health evaluation that includes the safety score and the home health score for the residential property. The computer readable medium may have instructions that direct additional, less, or alternate functionality, including that discussed elsewhere herein.

In another aspect, a computer system for evaluating aspects of health of a residential property is provided. The computer system includes one or more electricity monitoring devices installed within the residential property. The one or more electricity monitoring devices may be configured to collect power quality data for one or more of electrical devices operating within the residential property and electrical circuits within the residential property. The computer system may also include an internal home health controller installed within the residential property. The internal home health controller may be configured to receive internal home health data from the one or more electricity monitoring devices. The internal home health data may reflect an aspect of operational quality of one or more assets of the residential property. The computer system further may include a remote system server configured to communicate with the internal home health controller and one or more external data sources outside the residential property via an external network. The remote system server may include one or more processors and/or associated transceivers programmed to: (i) receive a first element of power quality data from the internal home health controller, the power quality data being captured by the one or more electricity monitoring devices; (ii) determine a safety score for the residential property based at least in part on the first element of power quality data, the safety score representing a measure of safety of the residential property; (iii) receive a first element of external data from the one or more external data sources, the first element of external data relating to power quality for a geographical region of the residential property; (iv) determine a home health score for the residential property based at least in part on one or more of the first element of power quality data provided by the one or more electrical monitoring devices and the first element of external data from the one or more external data sources, the home health score representing a measure of health of the residential property; and/or (v) cause to be displayed, to a homeowner of the residential property via a graphical user interface, a home health evaluation that includes the safety score and the home health score for the residential property. The computer system may have additional, less, or alternate functionality, including that discussed elsewhere herein.

In still another aspect, a computer-implemented method for evaluating aspects of health of a residential property is provided. The computer-implemented method may be implemented by one or more local or remote processors, sensors, servers, and/or transceivers, and includes: (i) receiving a first element of power quality data from an internal home health controller installed within the residential property, the power quality data being captured by one or more electricity monitoring devices installed within the residential property, the one or more electricity monitoring devices are configured to collect power quality data for one or more of electrical devices operating within the residential property and electrical circuits within the residential property; (ii) determining a safety score for the residential property based at least in part on the first element of power quality data, the safety score representing a measure of safety of the residential property; (iii) receiving a first element of external data from the one or more external data sources, the first element of external data relating to power quality for a geographical region of the residential property; (iv) determining a home health score for the residential property based at least in part on one or more of the first element of power quality data provided by the one or more electrical monitoring devices and the first element of external data from the one or more external data sources, the home health score representing a measure of health of the residential property; and/or (v) causing to be displayed, to a homeowner of the residential property via a graphical user interface, a home health evaluation that includes the safety score and the home health score for the residential property. The method may include additional, less, or alternate actions, including those discussed elsewhere herein.

In another aspect, a non-transitory computer readable medium having computer-executable instructions embodied thereon for evaluating aspects of health of a residential property is provided. When executed by at least one processor and/or associated transceiver, the computer-executable instructions cause the at least one processor and/or associated transceiver to: (i) receive a first element of power quality data from an internal home health controller installed within the residential property, the power quality data being captured by one or more electricity monitoring devices installed within the residential property, the one or more electricity monitoring devices are configured to collect power quality data for one or more of electrical devices operating within the residential property and electrical circuits within the residential property; (ii) determine a safety score for the residential property based at least in part on the first element of power quality data, the safety score representing a measure of safety of the residential property; (iii) receive a first element of external data from the one or more external data sources, the first element of external data relating to power quality for a geographical region of the residential property; (iv) determine a home health score for the residential property based at least in part on one or more of the first element of power quality data provided by the one or more electrical monitoring devices and the first element of external data from the one or more external data sources, the home health score representing a measure of health of the residential property; and/or (v) cause to be displayed, to a homeowner of the residential property via a graphical user interface, a home health evaluation that includes the safety score and the home health score for the residential property. The computer readable medium may have instructions that direct additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
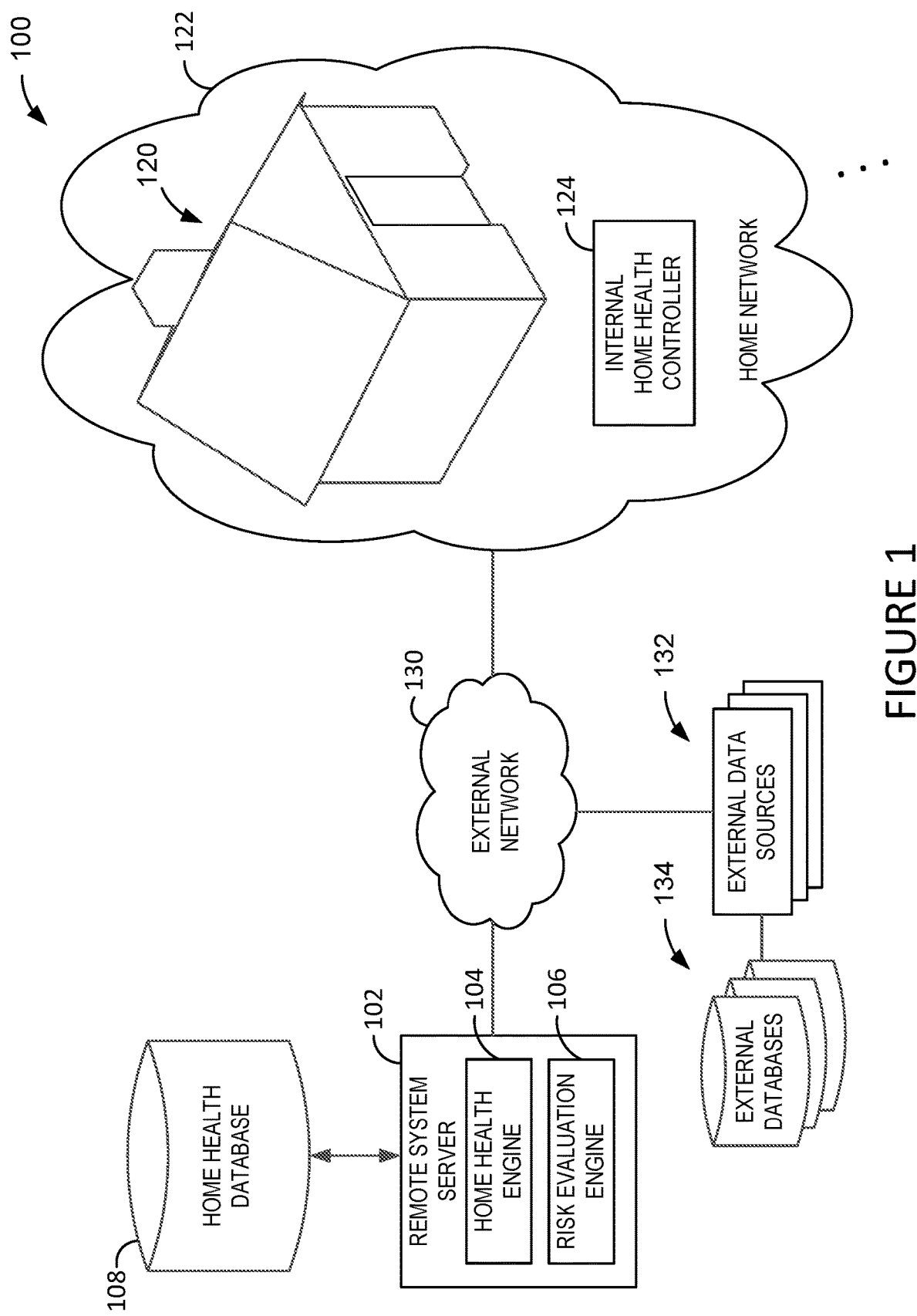
FIG. 1 illustrates an exemplary home health system ("HHS") that may be used for evaluating home health and risks associated with a residential house (a "home"), in accordance with the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for evaluating health of residential housing (e.g., a family "home" or individual's home). As used herein, residential housing or home may mean a house, a condominium, an apartment, or any other property that may include a structure that can be used for shelter. In one exemplary embodiment, a home health system collects home health data about individual homes of potential or current home insurance policy holders. Home health data may include various types of data that may impact home health or may reflect risks to the house, such as from acts of nature (e.g., weather, seismic activity, flooding, or the like) or from man-made risks or other inherent risks to a home (e.g., electrical fires from aging wiring, theft or vandalism of property, aging appliances or heating, ventilation and air conditioning (HVAC), or the like), or other home data that may positively or negatively impact risks to and insurability of the home.

The home health system may collect some home health data from external sources (e.g., publicly available data, such as historical weather-related information or power outage statistics for the area, emergency service response statistics for the area, or the like) or from internal sources (e.g., data gathered from sensors, appliances, or networked devices within the house). The homeowner (e.g., an insurance customer, who may be referred to herein interchangeably as an "insured," "insured party," "customer," "claimant," or "potential claimant") may opt into various internal source data collections to allow the home health system to provide, for example, alerting of various projected or current risks to the home, discounts for risk mitigating activities, and ongoing historical data collection for ongoing use. As such, subject homes may include an internal home health controller that is configured (e.g., on a home network) to communicate with various sensors, appliances, and other devices within the home and to relay home health data to a remote system server for various uses discussed herein.

In one exemplary embodiment, the home health system may include a home health engine that may capture home health data from internal sources and provide alerting to the homeowner, or perhaps emergency services (e.g., fire services, police services), when current or impending risks to the home are detected. For example, the home network may be configured with electrical circuit sensors that are configured to monitor electrical circuits within the home to detect various inconsistencies or symptoms of dangerous conditions, such as arcing caused by faulty or separating connections on the circuit. Such arcing conditions can lead to greater resistance and heat generated over time, which may eventually lead to a fire within the house. The home health engine may regularly evaluate such data and may provide, for example, evaluations of potential risks to the homeowner (e.g., articulating the source and nature of the risk within the home), recommendations to the homeowner for risk mitigation (e.g., detailing how the identified risks may be reduced), or alerting for contemporaneous events detected within the home (e.g., transmitting an alert to a mobile device or nest device of the homeowner upon detection of fire, power outage, nearby lightning strike, network outage). In some embodiments, the home health system may provide a home health score to the homeowner, which may be used to identify areas of improvement or risk reduction that may impact safety or insurability of the home. As such, the home health system helps identify and mitigate risks to the property of the homeowner and the health and safety of the occupants of the house.

In one exemplary embodiment, the home health system may include a risk evaluation engine that may evaluate home health data from external or internal sources to evaluate various risks associated with the home. The home health system may use numerous data points to evaluate risks to a residential property and may compute a composite risk score or various focused risk scores for the property.

Such risk scores may be used, for example by an insurance provider, to evaluate insurability of the property and its assets, to price insurance policy options for the property, or to provide policy discounts and verify compliance for risk mitigating changes, actions, or behaviors. For example, the risk evaluation engine may generate a power quality score for the property based upon factors such as, inter alia, the power consumption habits of the house, the number of large electrical devices, the number and duration of historical power outages incurred in the area, the number of power surges detected on circuits within the home, or the age of wiring within the home.

The risk evaluation engine may also generate a safety score for the property based upon factors such as, inter alia, a presence or number of ground fault circuit interrupter ("GFCI") outlets within the home, electrical storm frequency near the home, grounding or arcing issues on circuits within the home, or the presence and activity of a security system within the home. The risk evaluation engine may generate a home health score from the home based upon factors such as, inter alia, the age of appliances within the home, power consumption, various occupant behaviors or demographics, a number of actionable notifications generated by the system, and issue resolution responsiveness. Such scores may be used to evaluate risks, indicating more or less risk to the home and the assets within the home and, as such, may impact pricing of an insurance policy for the home.

While various examples provided herein describe application of the home health system to various aspects of insurance underwriting, the systems and methods described herein may also be used for performing other composite calculations.

Exemplary Home Health System

FIG. 1 illustrates a home health system ("HHS") 100 that may be used for evaluating home health and risks associated with a residential house (a "home") 120, in accordance with the present disclosure. In the exemplary embodiment, the HHS 100 includes remote system server 102 that is configured to execute a home health engine 104 and a risk evaluation engine 106. The remote system server 102 may include or otherwise be in communication with a home health database 108 that stores information about the house 120 that may be used to evaluate home health and risks, and may include information about real estate upon which the house 120 is located, assets contained within the house 120, and various data points that may influence the various factors of risk described herein. Collectively, this data is referred to herein as "home health data." Further, the terms "house," "home," and "residential property" may be used interchangeably herein to refer to the home 120 and its various property and assets.

In the exemplary embodiment, the remote system server 102 is in networked communication with an internal home health controller (or just "controller") 124 of the home 120 through an external network 130 (e.g., the Internet). The internal home health controller 124 may manage aspects of home health data collection, computations, and alerting as a part of the home health system 100. The internal home health controller 124 is connected to a home network 122 of the house 120 which allows communication with the remote system server 102 through an external network 130 (e.g., the Internet). For example, the house 120 may include a local area network ("LAN"), a wireless network (e.g., Wi-Fi network), or some combination thereof that connects to the external network 130 (e.g., via a subscription service to an Internet service provider, or the like). In some embodiments, the internal home health controller 124 may communicate via a wireless mobile network, such as a 3G, 4G, or 5G network.

The home network 122 may allow various devices within the home 120 to communicate over the home network 122, such as computing devices, smart sensors, smart appliances, or the like (e.g., Internet-of-Things ("IoT") type devices). Such devices may be referred to herein as "internal devices," in that they are internal to the home 120 or otherwise a part of the home network 122. Some internal devices (not separately shown in FIG. 1) may participate in the home health system 100 by, for example, providing home health data that may be used (e.g., by the remote system server 102) to evaluate home health, to generate risk scores, or other uses described herein.

In the exemplary embodiment, the home health system 100 may allow homeowners to opt into or out of various aspects of data collection from internal devices (e.g., by device type, by type of data collected, by data use). For example, the homeowner may be presented with an individual login to the system 100 which may include an opt-in screen that allows the homeowner to view data collection and usage policy and select whether they wish to allow such usage, thereby protecting privacy of the homeowner. Home health data generated by such internal devices may be referred to herein as "internal home health data," or just "internal data."

The remote system server 102, in the exemplary embodiment, may collect some home health data from one or more external data sources 132. The home health engine 104 or the risk evaluation engine 106 may, for example, collect data from publicly available sources or from private third-party sources about the particular subject home 120 or the area in which the home 120 is built (referred to herein as "the locality of the home"). For example, one external data source 132 may be the national weather service ("NWS"), a branch of the national oceanic and atmospheric administration ("NOAA"). The NWS collects, and makes publicly available, weather data for the United States of America and its outlying countries.

The home health system 100 may collect aspects of historical, current, or predictive weather data for a locality of the home 120 (e.g., storm, wind, lightning, flooding in the locality) and may use such data to evaluate aspects of home health and risk. Such data from external data sources 132 is referred to herein as "external home health data," or just "external data." Some external data sources 132 may maintain such external data in one or more external databases 134. Other examples of external data sources 132 and external data are provided below, as well as various uses for such external data.

In the exemplary embodiment, the remote system server 102 may be operated by an insurance provider that provides insurance coverage for the home 120 (e.g., via a home insurance policy) or that provides participation in the home health system 100 as a home protection service for the homeowner. The insurance provider may be any individual, group of individuals, company, corporation, or other type of entity that may issue insurance policies for customers, such as a homeowners, renters, or personal articles insurance policy associated with the home 120 or an insured. For example, after signing up for a home insurance coverage, the insurance provider may provide the internal home health controller 124 for installation in the home 120.

Although the present disclosure describes the systems and methods as being facilitated in part by the insurance provider, it should be appreciated that other non-insurance related entities may implement the systems and methods. For example, a general contractor may aggregate the insurance-risk data across many properties to determine which appliances or products provide the best protection against specific causes of loss, or deploy the appliances or products based upon where causes of loss are most likely to occur. Accordingly, it may not be necessary for the home 120 to have an associated insurance policy for the property owners to enjoy the benefits of the systems and methods.

The internal home health controller 124, as discussed in greater detail below, may be configured to monitor aspects of home health, collect internal data from sensors, appliances, or other devices within the home 120, connect to the home network 122, and communicate with the remote system server 102 for the various aspects of home health services and risk evaluation described herein. The internal home health controller 124 may be configured to connect to the home network 122 and communicate with other networked devices (or "smart devices") within the home 120. Such devices may be referred to herein as "source devices" or "connected devices," as devices that provide internal data to the home health system 100. In some embodiments, the remote system server 102 may communicate directly some or all of the source devices within the home 120. Various source devices are illustrated in further detail below with respect to FIG. 2.

Exemplary Internal Source Devices within the Home

Figure 2:
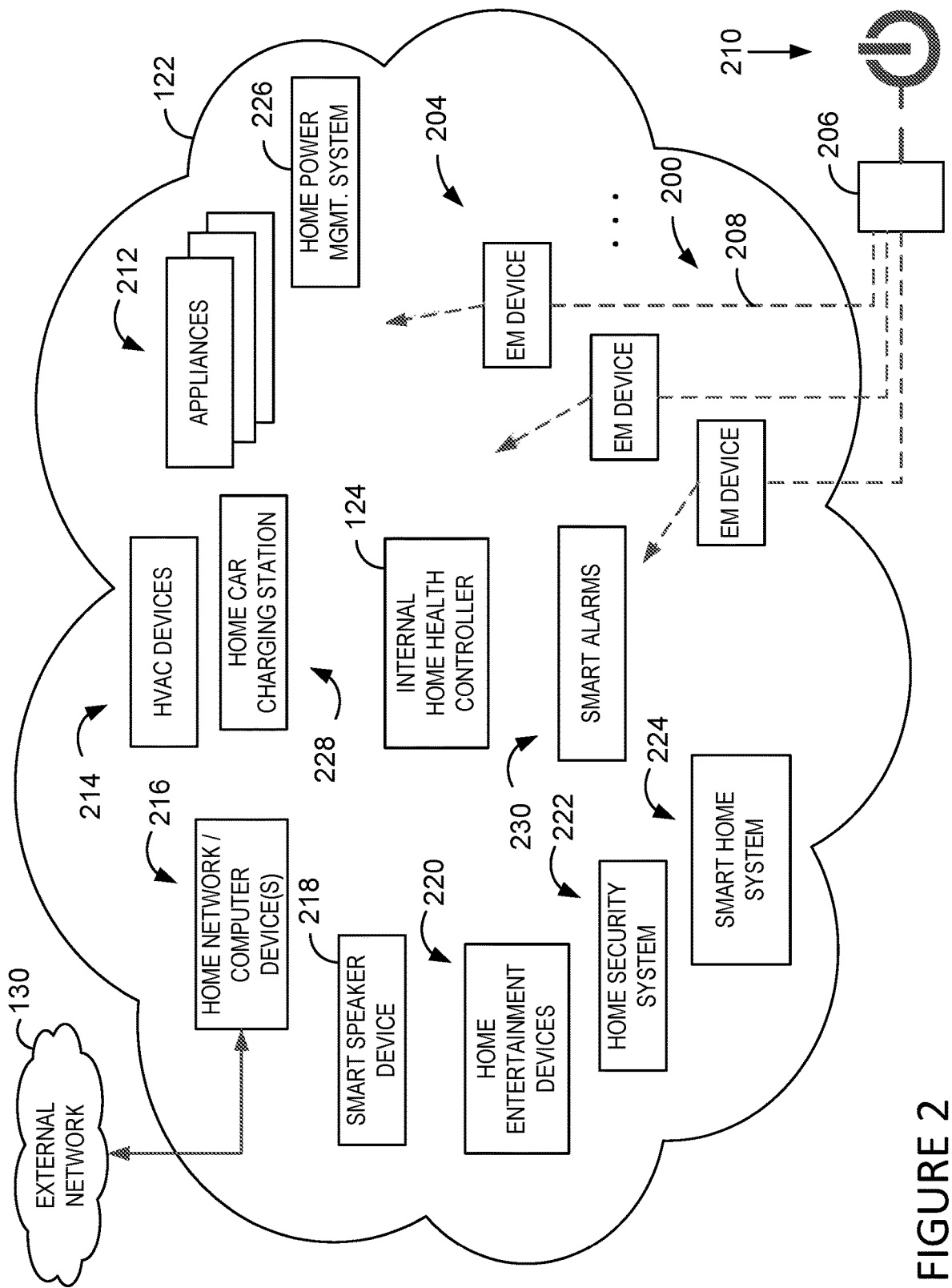
FIG. 2 illustrates exemplary source devices that may be used with the home health system shown in FIG. 1.

FIG. 2 illustrates exemplary source devices that may be used with the home health system 100 shown in FIG. 1. In the exemplary embodiment, the internal home health controller 124 is in communication with or otherwise monitors or collects data from a variety of source devices within the home network 122. The home 120, and the various source devices therein, may be powered by an electrical distribution system 200. Paths of electrical power flow are illustrated in FIG. 2 in broken line. The electrical distribution system 200 includes multiple electrical circuits 208, each of which may provide power to one or more of the source devices or other electrical devices within the home 120. Each of the example circuits 208 emanate from an electrical distribution panel 206 that receives power from a power source 210, such as a utility power company or an on-premise power source (e.g., gas generator, solar generator, wind generator). Each circuit 208 may include a circuit breaker for each circuit 208 in the electrical distribution panel 206. While not expressly shown, any of the various source devices may be connected to and powered by the electrical circuits 208.

In the exemplary embodiment, the home health system 100 may include one or more electricity monitoring ("EM") devices 204. EM devices 204 may be used to monitor electricity flowing to individual electric devices, such as smart devices or appliances, electronics, vehicles, or mobile devices, and may be configured to monitor or detect abnormal usage or trends. Abnormal electricity flow ("EF") to various devices may indicate that failure is imminent, maintenance or device replacement is needed, de-energization is recommended, or other corrective actions are prudent. For example, the EM devices 204 may be TING® smart sensors such as those made commercially available by Whisker Labs of Germantown, MD.

EF data collected by the EM devices 204 may include data indicative of electricity flow to or from various smart or other electronic devices, including the various devices shown here in FIG. 2. EF data may also include electricity or energy usage for each electronic component, device, outlet, circuit, or the like, within the home 120, such as data indicating the electricity each device or room is using. For example, energy usage of air conditioners, washers, dryers, dish washers, refrigerators, stoves, ovens, microwave ovens, televisions, lamps, outlets, computers, laptops, mobile devices, other electronic devices, may be determined by the EM device 204. EF data may be used to detect hazards or other abnormalities that may indicate a risk to the home 120 or its assets.

EM devices 204 may include sensors that are configured to monitor and collect EF data. EM devices 204 may be plugged into electrical outlets within the home (e.g., conventional 110-volt outlets) for at least powering the device 204, or may be electrically wired into a circuit 208 for powering the device 204. Further, some EM devices 204 may collect EF data directly from a circuit 208 (e.g., via wired connection to the circuit 208, referred to herein as "direct sensing") and some EM devices 204 may wirelessly collect EF data from circuits 208, appliances, or other electricity consuming devices (referred to herein as "wireless sensing"). Wireless sensing may include, for example, sensors within the EM device 204 that are configured to sense electromagnetic waves or an electrical signature of the electrical devices receiving power from the electrical distribution system 200. The EM devices 204 may directly or wirelessly detect each flow of electricity to or from each different electronic device by identifying each electronic device by its unique electronic or electrical signature (or "fingerprint"). The EM devices 204 may then generate electricity usage or flow data for each electronic device within the home, or connected to the electrical distribution system 200 (such as a hybrid or fully electric vehicle having its battery directly or wirelessly charged by the home's electrical system). In some embodiments, EM devices 204 may be positioned in vicinity of the electrical distribution panel 206 and may capture electrical activity about the home 120 by wirelessly detecting an electricity flow to devices that are coupled to the electrical distribution board 206.

In other embodiments, EM devices 204 may be positioned in vicinity of the electrical distribution panel 206, but not hardwired to the electrical distribution panel 206 or home electrical wiring system, and may capture electrical activity about the home 120 by wirelessly detecting an electricity flow to devices that are coupled to the electrical distribution board 206. In other embodiments, EM devices 204 may be plugged into electrical outlets positioned throughout a home.

During operation, as one or more of the electric devices receives electricity via the electrical distribution system 200, each device may be differentiated by an electrical signature that is unique to a respective device (such as by one or more EM devices 204 monitoring, detecting, and/or analyzing the electricity flowing to or being consumed by each respective electric device, and/or by monitoring EF data generated or collected by one or more EM devices 204).

In other words, transmission of electricity to a refrigerator, for example, may be differentiated from transmission of electricity to an electric stove (such as via one or more EM devices 204 and/or analyzing the EF data generated or collected by one or more EM devices 204). Furthermore, transmission of electricity to a television on one circuit 208 or outlet, for example, may be differentiated from transmission of electricity to another recipient electric device (e.g., a cable television box) via the same circuit 208 or electrical outlet. The home health system 100 may correlate electrical activity with a variety of electric devices on the electrical distribution system 200 based upon electrical signatures unique to each respective device. The home health system 100 may build a structural electrical profile for the home 120, which may include data indicative of operation of the various electric devices within or around the home 120 (e.g., over a period of time), such as by using EF data generated or collected by one or more EM devices 206 over a period of time.

In some embodiments, an EM device 204 may be affixed to or situated near the electrical distribution panel 206. Generally, the EM device 204 may utilize the unique, differentiable electrical signatures of the electric devices by directly or wirelessly monitoring electrical activity including transmission of electricity via the electrical distribution panel 206 to one or more of the electric devices. Monitoring of transmission of electricity to an electric device receiving the electricity may include, for example, monitoring (i) the time at which the electricity was transmitted, (ii) the duration for which the electricity was transmitted, and/or (iii) the magnitude of the electric current in the transmission.

Based upon the unique electrical signatures of the various electric devices of the home 120, the monitored electrical activity may be correlated with respective electric devices receiving the electricity transmitted via the electrical distribution system 200. Further, electrical activity associated with other components of the electrical distribution system 200 (e.g., the electrical distribution panel 206, the circuits 208, or the like) may be correlated with one or more electric devices to which the electrical activity also pertains. In some embodiments, the EM device(s) 204 may perform the correlation or other functions described herein, via one or more processors of the EM device(s) 204 that may execute instructions stored at one or more computer memories of the EM devices 204. In other embodiments, the EM devices 204 may collect the EF data, and the correlation and/or other functions described herein may be performed at another system (e.g., the internal home health controller 124 or the remote system server 102), which may receive data or signals indicative of monitored electricity or other data via one or more processors or through transfer via a physical medium (e.g., a USB drive). Correlation of the electrical activity with the respective electrical devices may produce data indicating, for example, the time, duration, and/or magnitude of electricity consumption by each of the electric devices during a period of electrical activity monitoring.

Based upon at least the correlated electrical activity, a structure electrical profile may be built and stored at the EM devices 204 or at some other system (e.g., the internal home health controller 124 or the home health database 108). The structure electrical profile may include, for each of the electric devices about the home 120, data indicative of operation of the respective electric device during at least the period at which the EM devices 204 monitored electrical activity about the home 120. Based upon the correlated electrical activity, the structure electrical profile may depict, for example, average electricity operation/usage, baseline electricity operation/usage, and/or expected electricity operation/usage/consumption. In effect, the structure electrical profile, based upon real electrical activity about the structure, may set forth what is "normal" operation and usage of electricity about the structure.

Thus, once the structure electrical profile is built, any electrical activity monitored via the internal home health controller 124 and the EM device(s) 204 may be analyzed to determine whether electrical activity is abnormal. In response to the abnormal electrical activity, among other possible factors, corrective actions mitigate damage, prevent damage, and/or remedy the cause of the abnormal electrical activity the situation may be determined and/or initiated. Some possible corrective actions are discussed herein.

EF data regarding an electric device may include, for example, historical data indicating the electric device's past operation patterns or trends. For example, historical data may indicate a time of day, day of the week, time of the month, etc., at which an electric device frequently uses electricity (e.g., a lighting fixture may not use electricity during late night hours of the day). As another example, historical data may include the electric device's total electricity consumption or usage rate over a period of time. Additionally or alternatively, historical data may include data indicating past events regarding the electric device (e.g., breakdowns, power losses, arc faults, etc.). Additionally or alternatively, operation data regarding an electric device may include an expected electricity consumption or baseline electricity consumption for the electric device. For example, in the case of a refrigerator, the refrigerator's electricity consumption during a first period of monitoring may be reliably used to approximate an expected electricity consumption at a later time.

Further, the structure electrical profile may include data pertaining to the structure as a whole. For example, the structure electrical profile may include data reflecting a total electricity or average usage rate over a period of time. As another example, the profile may include time-of-day, day-of-week, etc., data reflecting times at which the home 120 as a whole uses more or less electricity. Further, the profile may detail specific types, classes, or specifications of electric devices that behave differently or consume a different amount of electricity compared to other electric devices within the home 120. Further, the profile may detail specific risks determined to be relevant to one or more of the electric devices or to the home 120 as a whole, based upon the electrical activity of the electric devices.

Furthermore, the structure electrical profile may include a digital "map" of the home 120. A home map may indicate spatial locations of the electric devices, and/or spatial relationships between two or more of the electric devices. Such mapping may indicate, for example, a risk associated with the spatial placement of a stove, and/or a risk associated with placing a refrigerator adjacent to the stove. Additionally or alternatively, the home map may indicate which of the electric devices are connected to each electrical circuit 208 within the electrical distribution system 200 of the home 120. Such mapping may indicate, for example, a risk of overloading a particular circuit 208 based upon a number or intensity of electric devices connected to the circuit 208. As another example, the home map may be used to determine what electric devices may lose power if a particular circuit 208 were to be de-energized (e.g., due to risk or abnormal electrical activity associated with one electric device on the circuit).

In some embodiments, the home map may be configurable by a user (e.g., the homeowner of the home 120). The user may, for example, configure the map via an I/O module (e.g., screen, keypad, mouse, voice control, etc.) of the internal home health controller 124, or via an I/O module of another computing device, which may transmit the home map to the home health controller 124. Additionally or alternatively, the home map may be stored at one or more computer memories of another system (e.g., remote system server 102).

In some embodiments, the home network 122 may include a home power management system 226. The home power management system 226, or the controller 124 in conjunction with the EM devices 204, may collect power consumption data on the circuits 208 (e.g., via EM devices 204) or device electrical usage data of various electronic devices within the home 120. The home power management system 226 may, for example, collect usage data for lights or appliances within the home 120, giving an indication of how much electricity the home 120 uses or how frequently occupants are at home. In some embodiments, the home 120 may include one or more smart plugs (not separately shown) which may be managed by the power management system 226, the smart speaker device 218, the smart home system 224, or otherwise by the home health system 100 (e.g., for activating or deactivating devices plugged into the circuits 208 via the smart plugs, such as via 110-volt outlets).

The home power management system 226 may identify and provide details on what appliances or other consuming devices are within the home 120 (e.g., manufacturer make and model), thereby allowing the home management system 100 to identify some property on the premises (e.g., device identification and verification, device count), evaluate value of devices (e.g., replacement costs), or collect manufacturer-provided or consumer protection-provided details regarding the devices from external data sources 132 (e.g., susceptibility of the device to power surges, likelihood of fire caused by the device, mean time to failure of the device, types of device failures, power consumption profiles and tolerances of the device, or the like).

The home power management system 226 may collect power quality data for the home 120, such as occurrences and frequency of power outages or reductions in service (e.g., black-outs or brown-outs), loading at various times throughout the day or week, the size of service, occurrences of voltage values fluctuating beyond tolerance ranges (e.g., spikes), or the like. In some embodiments, the home power management system 226 may include one or more smart circuit breakers (e.g., on any or all of the circuits 208) or a smart panel (e.g., as the electrical distribution panel 206), such as those made commercially available by Schneider Electric (Paris, France), which may provide circuit-level data and operations such as, for example, current or historical circuit load data, circuit breaker status, or turning circuit breakers on or off. Such power data may be used to construct a power profile for the home 120. In some embodiments, the internal home controller 124 may perform any such power monitoring and data collection operations in lieu of, or in addition to, the home power management system 226.

In the exemplary embodiment, the home 120 may include one or more smart appliances 212 (e.g., appliances that can communicate via the home network 122). Smart appliances 212 may include, for example, dish washers, microwaves, stove tops, ovens, grills, clothes washers and dryers, water heater, water meter, water softener or purifier, smart lighting, smart window blinds or shutters, piping, interior or yard sprinklers, or the like. The internal home health controller 124 may be configured to communicate with such smart appliances 212 and may collect internal data from such appliances for the home health system 100.

For example, the appliances 212 may provide data such as device data (e.g., manufacturer, make, model, date of manufacturer, date of installation, software or firmware versions), usage data (e.g., daily usage time, power consumption), or log data (e.g., log events, alerts, component failure detections, maintenance history, or the like). Such appliance data may allow the home health system 100 to detect which appliances are present in the home 120 (broadly, as a part of an "asset inventory" of the house), their replacement value, age of each appliance, a maintenance history of each appliance, to detect when appliances or their components are failing.

The home health system 100 may use such data, for example, to construct the power profile for the home 120, to compute the safety score for the home 120, to compute in an insurance profile for the home (e.g., as factors of risk to lightning or other hazards), or to alert the homeowners when an appliance registers a failure.

In the exemplary embodiment, the home 120 may also include smart HVAC devices such as, for example, a heater (e.g., a gas or electric furnace), an air conditioner, an air purifier, an attic fan, a ceiling fan. Some or all such devices may be controlled by a thermostat device. Such devices are collectively referred to herein as HVAC devices 214, some of which may not be smart devices but may nonetheless be controlled in some aspects by the thermostat device.

The home health system 100 may collect HVAC data such as device data (e.g., manufacturer, make, model, date of manufacturer, date of installation), usage data (e.g., daily usage time, power consumption), or thermostat data (e.g., temperature settings, daily schedule profiles). The home health system 100 may use such data, for example, to construct the power profile for the home 120, to compute the safety score for the home 120 (e.g., determining how often the home 120 is typically occupied), to compute in an insurance profile for the home (e.g., as factors of risk to lightning or other hazards, likelihood of equipment failures), or to alert the homeowners when an HVAC device registers a failure.

The home 120, in the exemplary embodiment, may also include various computing devices such as, for example, desktop or laptop personal computers, tablet computers, servers, or networking devices (e.g., Wi-Fi routers, switches, hubs, firewalls, or the like), all of which are collectively represented here as home network/computer devices (or just "computer devices") 216. The networking devices may provide some or all of the home network 122 that is used to facilitate communication between the devices shown here. The internal home health controller 124 may be configured to capture computer device data from some or all of these computer devices 216 such as, for example, a number and type of computing devices (e.g., hardware manufacturer, make, model, and the like), hardware and software profile of computing devices, configuration data of computing devices (e.g., software versions, firmware versions), usage data, and log data (e.g., firewall logs, access logs, software patch logs, error logs). The home health system 100 may use such data to, for example, determine asset inventory and valuation, construct the power profile for the home 120 (e.g., average daily usage), alert the homeowners when devices need software or firmware upgrades (e.g., critical security alerts) or upon intrusion detection or other compromise of computer devices 216 (e.g., software hacks).

In the exemplary embodiment, the home 120 may include a smart speaker device(s) (or "nest device") 218 that may interact with occupants of the home 120 (e.g., via audible commands and responses, digital display, executing pre-configured actions). Some example smart speaker devices 218 include the Echo® devices (Amazon Inc., of Seattle, Washington) and the Google Nest® devices (Alphabet Inc., of Mountain View, California), to name but a few. The smart speaker device 218 may include a speaker for providing audio output, a microphone for receiving audio input (e.g., commands spoken by the occupants), and may include a display device for video output or a camera device for capturing video input. The smart speaker device 218 may be configured to interact with other smart devices, such as for controlling lighting within the home 120, the thermostat (e.g., changing thermostat settings), home security devices of a home security system 220 (e.g., locking and unlocking smart locks on doors, opening or closing garage doors, or the like), or entertainment devices of a home entertainment system 226 (e.g., enabling, disabling, or reconfiguring music or television devices).

The home health system 100 may, with owner configuration and permission, utilize inputs from the smart speaker device 218 to, for example, determine a number of unique occupants of the home 120 (e.g., via unique speech profile or video identification), determine the number of children in the home 120 (e.g., via audio or video analysis), determine when occupants of the home 120 are currently or historically present (e.g., via noise detection, video movement), determine when other devices are turned on or off, determine presence of pets (e.g., via unique audio sounds or video identification of the pets), or smoke or carbon monoxide alarm detection (e.g., via audible sound). Such raw data may be sanitized or distilled by the internal home health controller 124 into refined data before sending to the remote system server 120 in an effort to protect privacy of the home occupants while still providing home health evaluation and risk capabilities (e.g., sending results determined from the raw audio or video data and deleting the raw audio or video data). The home health system 100 may anonymize personal data, thereby allowing data to be stored or used without direct attribution of data to a particular homeowner.

In the exemplary embodiment, the home 120 may include various home entertainment devices 220 such as, for example, televisions, digital video recorders ("DVR"), radios, amplifiers, speakers, remotes, or console gaming systems, any or all of which may be smart devices in communication with the home network 122 and the controller 124. The controller 124 may collect home entertainment data from such devices and may use that data, for example, to construct the power profile for the home 120, to construct the asset inventory of the home 120, to compute the safety score for the home 120, to compute in an insurance profile for the home (e.g., as factors of risk to lightning or other hazards, likelihood of equipment failures).

The home 120, in the exemplary embodiment, may include a home security system 222. The home security system 222 may include security devices such as, for example, door or window sensors (e.g., to detect when doors or windows or open, when windows are broken), motion sensors (e.g., to detect when someone is present within range of the sensor), security cameras (e.g., for capturing audio/video of particular areas in or around the house 120, such as a doorbell camera), key pads (e.g., for enabling/disabling the security system), panic buttons (e.g., for alerting a security service or authorities of an emergency situation), security hubs (e.g., for integrating individual security devices into a security system, for centrally controlling such devices, for interacting with third parties), electric door locks, or smoke/fire/carbon monoxide detectors. Such "security devices" broadly represent devices that can detect potential contemporaneous risks to the home 120 or its occupants (e.g., intrusion, fire, health). The home security system 222 may be configured to communicate with a third-party security service or local authorities, and may transmit alerts to such parties when events are detected. The internal home health controller 124 may be configured to receive alert data from the home security system 222 and may transmit such alerts to the remote system server 102, create historical logs of security events, or transmit alert events directly to the homeowner (e.g., via SMS text message or the like) or to local authorities, fire protection, or emergency services. The home health system 100 may use such security alert events to, for example, determine how frequently security events occur (e.g., as a factor for risk), how often such events are warranted (e.g., authentic risks rather than false alarms), or the type and nature of such authentic risks or false alarms.

The home health system 100 may use raw data collected directly from any of these security devices. For example, the internal home health controller 124 may use raw data from the motion sensors to detect when the home 120 is occupied (e.g., to build a profile of occupancy times), may use raw data from the camera devices or door devices to detect when occupants enter or exit the home 120, may use the camera devices to determine a number of occupants of the home 120 or a number and type of pets in the home 120. The home health controller 124 may determine information about the home security system 222 installed within the home, such as a number and type of security sensors installed within the home 120, a type of home security system 222 installed in the home (e.g., third-party service provider, device manufacturers, types of security protection implemented within the home), or how often the homeowners leave the house 120 unoccupied without activating the home security system 222 (e.g., as a factor in risk calculations or home health scoring). The home health system 100 may rate the home security system 222 and associated devices and services to generate a home security protection rating (e.g., relative to other available security systems or hardware) and may use that rating as a factor in risk calculations or in preparing a risk mitigation proposal (e.g., for more or better devices or security systems).

In some embodiments, the home 120 may include a smart home system 224 (e.g., a home monitoring system) that allows the homeowner and occupants to control various devices within the home 120. For example, the smart home system 224 may be configured to control, inter alia, devices such as the smart appliances 212, HVAC devices 214, home entertainment devices 220, or home security system 222. In the exemplary embodiment, the internal home health controller 124 may be configured to interact directly with such devices as described herein ("direct access"), or may be configured to perform some interactions and data collections with such devices through the smart home system 224 ("proxy access"). For example, any or all of the data collections or operations described herein may be performed by the smart home system 224 based upon commands received from the internal home health controller 124, thereby allowing the home health system 100 to perform such operations through the smart home system 224 acting as a proxy for some such operations.

In the exemplary embodiment, the home 120 may include a home car charging station 228 that may be used to recharge electric vehicles (not separately shown). The home car charging station 228 may draw power from one or more of the circuits 208 of the electrical distribution system 200 and may include an on-premise power source (e.g., solar panels, wind generator, or the like) or a dedicated battery bank (e.g., for storing excess power from the local energy source). The home health system 100 may capture various charging station data from the home car charging station 228, from the circuits 208 used for the charging station 228, or from the local power source device(s).

For example, the controller 124 may collect device information from the devices (e.g., manufacturer, make, model), vehicle information (e.g., via wireless connection with the vehicle to collect manufacturer, make, model, year of manufacture, options, software versions, usage, miles driven, battery health information, vehicle health information), or power information (e.g., recharging statistics, power used, power generated, recharging history). Such information may be used, for example, to build the power profile, to determine when the vehicle(s) are on the premises, to determine asset inventory, or to determine power inefficiencies related to recharging (e.g., cost analysis of utility power use versus local power generation and storage relative to when the vehicle(s) are on the premises).

In the exemplary embodiment, the home 120 may include one or more smart alarms 230 that are configured to detect various conditions within the home 120 and may alert the homeowner or other occupants (e.g., via audible alarm, SMS text message, email, or the like). Smart alarms 230 may include, for example, smoke detectors, carbon monoxide detectors, carbon dioxide detectors, or indoor air quality ("IAQ") monitors or systems that include sensors configured to, for example, detect dangerous conditions such as fire or buildup of carbon monoxide, the presence of dangerous pollutants such as radon or various volatile organic compounds ("VOC"), or collect various air quality data such as temperature and humidity. Smart alarms 230 may include water leak detectors or flood alarms that may be configured to detect the presence of water at various areas in the home 120, such as near HVAC equipment, water tanks, sump pumps, below showers or bath tubs, around basement perimeters, behind or within basement walls, or the like. Such water detectors may identify leaks within plumbing or appliances within the home 120 or ingress of water into the home 120 (e.g., rain water, flooding, failing sump pump, foundation cracks, or the like). The home health system 100 may collect alarm data from the smart alarms 230 and may perform automatic alerting based upon sensor events registered at such smart alarms 230 (e.g., alerting emergency services, homeowner, or the like, in an effort to protect life and property, mitigate damage, or such) or initiate automatic actions (e.g., shutting off water flow within the home 120, or within a particular segment of plumbing, via activating a smart water shut off valve, not separately shown). The home health system 100 may identify the presence of such smart alarms 230 or shut off valves in the home 120 when configured to communicate with the smart alarms 230 and may automatically provide policy discounts when particular smart alarms 230 are detected as present or may include the presence or absence of such smart alarms 230 in the various aspects of home health scoring.

Exemplary External Data Sources

In the exemplary embodiment, and referring now to FIG. 1, the home health system 100 may collect various types of external data from external data sources 132 that may be used, for example, for home health evaluation, for risk scoring, for generating home health remediation recommendations, or other various uses described herein. Some external data sources 132 may provide publicly available data, where other external data sources 132 may be private, third-party sources. External data sources 132 may include an insurance provider that provides insurance policies to the homeowner and various data available or otherwise collected by that insurance provider. In some embodiments, the remote system server 102 may be operated by the insurance provider and the home health database may include data private to the insurance provider (e.g., customer data, policy information, or other proprietary information).

In the exemplary embodiment, one example external data source 132 is the NOAA or any of its various branches (e.g., the national weather service). The NOAA makes various weather data publicly available. As such, the home health system 100 may collect weather data from the NOAA. Such weather data may be refined to a particular geography, such as a state, county, city, or other geographic region. The home health system 100 may, for example, identify a geographic region of the home 120 and submit data queries to the NOAA for weather data specific to that geographic region. Such data queries may include requests for historical data such as average rainfall, storm occurrences, wind strengths, lightning strikes, temperatures, tornado events, or the like. Historical data may be used to, for example, evaluate future risks to the home 120 over time. Data queries may include requests for forecast data such as severe watches warnings, tornado watches or warnings, flooding watches or warnings, precipitation predictions, wind predictions, lightning event predictions, blizzard warnings, or the like. Forecast data may be used to, for example, generate and send weather alerts to the homeowner or occupants of the home 120 or determine how frequently the home 120 experiences various warnings or alerts over time.

In the exemplary embodiment, another example external data source 132 may be the U.S. Forest Service. The U.S. Forest Service maintains historical data related to forest fires and tracks active forest fires in the United States. As such, the home health system 100 may collect forest fire data from the U.S. Forest Service. Such forest fire data may similarly be refined to a particular geography, such as a state, county, city, or other geographic region. The home health system 100 may, for example, collect historical forest fire data for the geographic region of the home 120, or may collect current forest fire data at or near the location of the home 120 (e.g., within a pre-defined distance from the home, within a distance from a projected path of the forest fire). The home health system 100 may use historical forest fire data to, for example, evaluate future risk of forest fires to the home 120. The home health system 100 may use current forest fire data to, for example, generate and send forest fire alerts to the homeowner or occupants of the home 120, or as factors in home health scoring.

In the exemplary embodiment, another example external data source 132 may be municipal power utilities. The home health system 100 may access current or historical power network data provided by power utility companies in various localities, such as power generation performance statistics (e.g., generation and load statistics), power transmission and distribution statistics or power outage information (e.g., across the network, local to a distribution segment that services the home 120, consistencies of voltages, power sags, power surges, brown-outs or black-outs and associated frequencies or lengths of outages, or the like), lightning strike data affecting the power network, or electrical consumption data for the home 120 (e.g., current or historical power usage, local power generation provided back to the network). The home health system 100 may use current power network data to, for example, generate and send alerts to the homeowner during power outages (e.g., as SMS text messages or emails that can be viewed on mobile computing devices), or as factors in home health scoring.

In the exemplary embodiment, another example external data source 132 may be third-party home data systems such as Multiple Listings Service ("MLS"), Zillow (www.zillow.com), or other Internet-accessible sources for property data. The home health system 100 may access such home data systems to collect construction details about the home 120 such as, for example, the age of the home, how many bedrooms and bathrooms the home 120 has, the type of any HVAC, the square footage of the home 120, the size of the property, market price of the home, whether the home 120 is constructed of wood, brick, concrete, or the like, the type and size of any garage, the quality of materials used to construct the home 120, whether the home 120 has a basement, the type, age, or condition of plumbing or wiring inside and outside the home 120, whether the home 120 has a pool and safety fence around the pool, the type of roofing, the floor plan, the architecture of the home 120 (e.g., ranch, two story, split foyer), the type of flooring, the type of exterior (e.g., wood, brick, siding), type of local power generation on the property (e.g., solar, wind, generator), number of fire places, type of fencing or gutters, whether the home 120 has a pool, sheds, patios, porches, or other exterior structures, whether the home 120 has outside doors having steps, type of ducting and insulation within the home 120, type of landscaping around the home 120, or mobility or accessibility options within the home 120.

Some home statistics data may include geographic data about the home 120 such as, for example, school district information (e.g., public school system, school ratings), utility providers available to at the location (e.g., electric, gas, sewer, waste, recycling, phone, Internet, television, fire, police, hospital, or other city services), proximity data to various services and amenities (e.g., distances from schools, parks, grocery, gas, library, or sources of entertainment), hazard data for the area (e.g., crime statistics, natural disaster statistics, ratings for emergency services), Some home statistics data may include historical data, such as price history (e.g., sales history, listings history), public tax history, insurance claims history, home warranty information, home inspection information, lease information (e.g., whether and how often the home 120 has been partially or fully rented or leased), or the like. Some home statistics data may include home energy data such as, for example, whether the home 120 is energy certified, type and size of power generation, home appliance or lighting energy certification data, or the like.

In the exemplary embodiment, another example external data source 132 may be an insurance provider or other service provider that has an economic or consumer relationship with the homeowner. The home health system 100 may access the service provider systems to collect demographic details about the home 120 and its occupants, such as, for example, names or ages of the occupants, education levels or occupations of the occupants, whether any of the occupants smoke, a family emergency plan, community engagement of the occupants, or whether a business is operated out of the home 120. The service provider system may collect home maintenance data about the home 120 such as, for example, maintenance logs of operations performed on the home 120 (e.g., service calls, property damage and fixes, routine device maintenance, cleanings, bug or pest service, lawn or garden service, roofing replacement, or the like), equipment installations and removals, device warranty information, or home improvements (e.g., new deck, pool, room(s), interior or exterior painting or weather proofing, solar installation, water reclamation systems installation, room remodeling, or the like). The service provider system may collect home configuration data about the home 120 such as, for example, whether GFCI outlets or LED lights are installed in the home 120, whether power strips supporting multiple devices are in use, whether the home 120 has exercise equipment, types of grills or fryers installed in the home 120, whether the home 120 includes particular safety equipment (e.g., smoke or carbon monoxide detectors, fire extinguishers, deadbolts on exterior doors, water sensors, sump pump, or the like), paint colors used on various walls of the home 120.

In some embodiments, the service provider may be the operator of the remote system server 102 and the homeowner may provide such data via an input interface (e.g., online questionnaire, user interface, service application, or the like, during participation in the home health system described herein). Collection and use of such data may be opted into by the homeowner on behalf of the occupants. In some embodiments, the home health system 100 may query the homeowner for any data elements described herein and not otherwise automatically accessed by the system 100.

In the exemplary embodiment, the home health system 100 may access aerial data of the home 120, such as satellite-, aerial-, or drone-captured overhead images of the home 120 and surrounding property. Such aerial data may be used to determine various externally visible features of home data (e.g., via digital image processing, machine learning, or human analysis). For example, the home health system 100 may use aerial data to determine structural elements of the home 120 or surrounding property, such as whether the home 120 has a swimming pool, a fence, or a deck, how many garages the home 120 has, or the like. The home health system 100 may use aerial data to determine whether the home 120 has trees nearby (e.g., which may cause damage to the home 120) or whether the home 120 is located on a cul-de-sac or a busy road. Such aerial data may be provided by a third party or public external data source 132 (e.g., United States Geological Survey ("USGS"), National Aeronautics and Space Administration ("NASA"), NOAA, Google®, or the like) or may be privately collected (e.g., via aerial or drone photography of the home 120 by the insurance provider, realtor, or the like). Such aerial data may include global positioning system ("GPS") location data for the home 120.

The home health system 100 may train a model of satellite images of homes 120 with labeled data of the homes 120 indicating, for example, whether the homes 120 have pools, decks, nearby trees, or other such features. As such, the trained model may be configured to automatically evaluate an unlabeled home (e.g., the home 120 in FIG. 1) to determine whether such features are present or otherwise categorize the home 120 with respect to those features.

In some embodiments, the home health system 100 may access mapping data around the home 120 to determine various home health features. The home health system 100 may utilize a web mapping service (e.g., Google® Maps or the like) as an external data source 132. For example, the home health system 100 may access the web mapping service via an application programming interface ("API") that allows the home health system 100 to submit, for example, the postal address of the home 120 or a GPS coordinate of the home 120 and query the web mapping service to provide features such as distances to nearby services (e.g., distance to nearest hospital, fire department, police station, schools, places of worship, parks, grocery stores, to various types of entertainment or other amenities, or the like). Mapping data may be used to determine whether the home 120 is situated on a busy or isolated road. The home health system 100 may generate a play score for the home 120 using the mapping data, where the play score evaluates proximity of the home 120 to various types of entertainment or exercise venues, such as proximity to hiking trails, bike paths, sports fields, professional sports venues, restaurants, theaters, or the like).

The mapping data may include ground-level imagery provided by the web mapping service that may be used by the home health system 100 to evaluate various externally visible features of home data (e.g., via digital image processing, machine learning, or human analysis). For example, the home health system 100 may use ground-level imagery to determine structural features of the home 120 such as a number of stories of the home, type of windows installed in the home, a roof type or type of exterior of the home, or how many garages the home has. The home health system 100 may train a model of ground-level images of homes 120 with labeled data of the homes 120 indicating, for example, how many stories or garages the homes 120 have, what type of exterior or roof type the homes 120 have, or other such features. As such, the trained model may be configured to automatically evaluate an unlabeled home (e.g., the home 120 in FIG. 1) to determine whether such features are present or otherwise categorize the home 120 with respect to those features.

Exemplary Internal Home Health Controller

Figure 3:
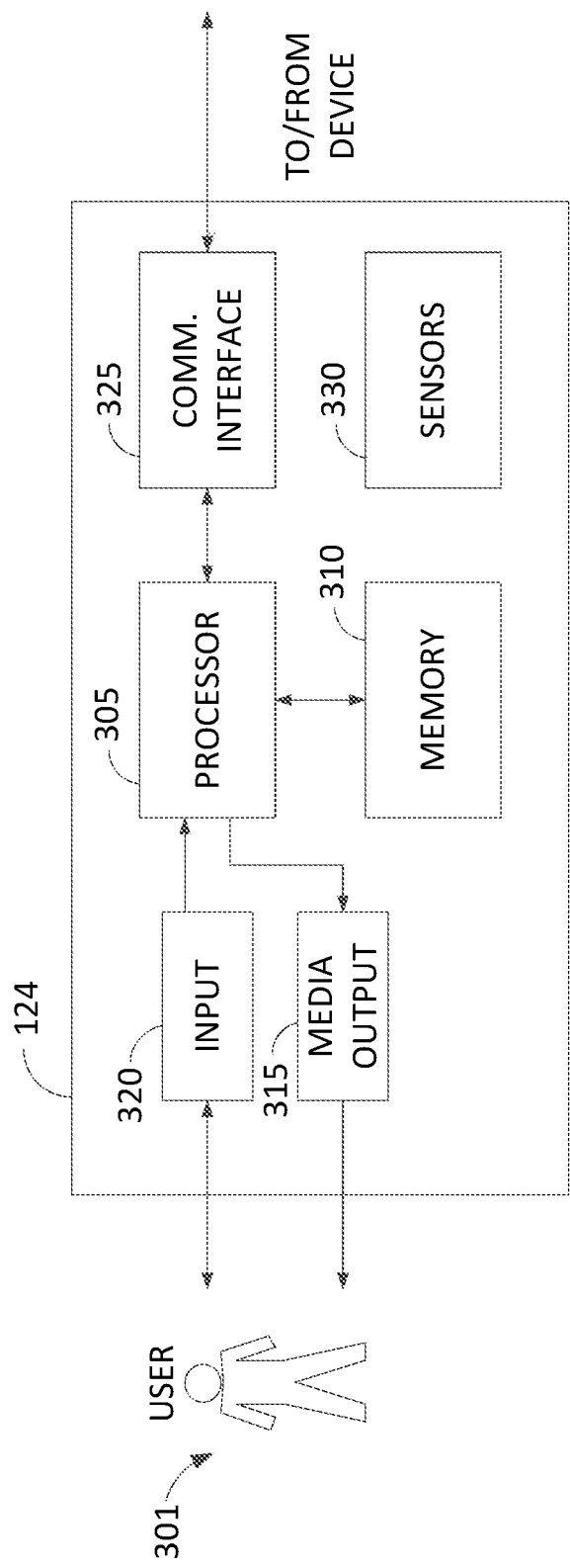
FIG. 3 depicts an exemplary configuration of the internal home health controller, in accordance with one embodiment of the present disclosure.

FIG. 3 depicts an exemplary configuration of the internal home health controller 124, in accordance with one embodiment of the present disclosure. In the exemplary embodiment, the internal home health controller 124 may be operated by a homeowner or other occupant of the home 120, or may be remotely administered by a service administrator (collectively depicted here as user 301). The internal home health controller 124 may include a processor 305 for executing instructions. In some embodiments, executable instructions may be stored in a memory area 310. Processor 305 may include one or more processing units (e.g., in a multi-core configuration). Memory area 310 may be any device allowing information such as executable instructions and/or transaction data to be stored and retrieved. Memory area 310 may include one or more computer readable media.

The internal home health controller 124 may also include at least one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 may be configured to present a graphical user interface (e.g., a web browser and/or a client application) to user 301. A graphical user interface may include, for example, an interface for viewing instructions or user prompts. In some embodiments, user computer device 302 may include an input device 320 for receiving input from user 301. User 301 may use input device 320 to, without limitation, provide information either through speech or typing.

Input device 320 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 315 and input device 320.

The internal home health controller 124 may also include a communication interface 325, communicatively coupled to devices such as the remote system server 102 (shown in FIG. 1) or any of the in-home devices shown in FIG. 2. Communication interface 325 may include, for example, a wired or wireless network adapter and/or a wireless data transceiver for use with a mobile telecommunications network.

Stored in memory area 310 are, for example, computer readable instructions for providing a user interface to user 301 via media output component 315 and, optionally, receiving and processing input from input device 320. A user interface may include, among other possibilities, a web browser and/or a client application. A client application may allow user 301 to configure data collection operations, view alerts generated by the home health system 100, or view risk mitigation recommendations generated by the home health system 100. For example, instructions may be stored by a cloud service, and the output of the execution of the instructions sent to the media output component 315.

Exemplary Remove System Server

Figure 4:
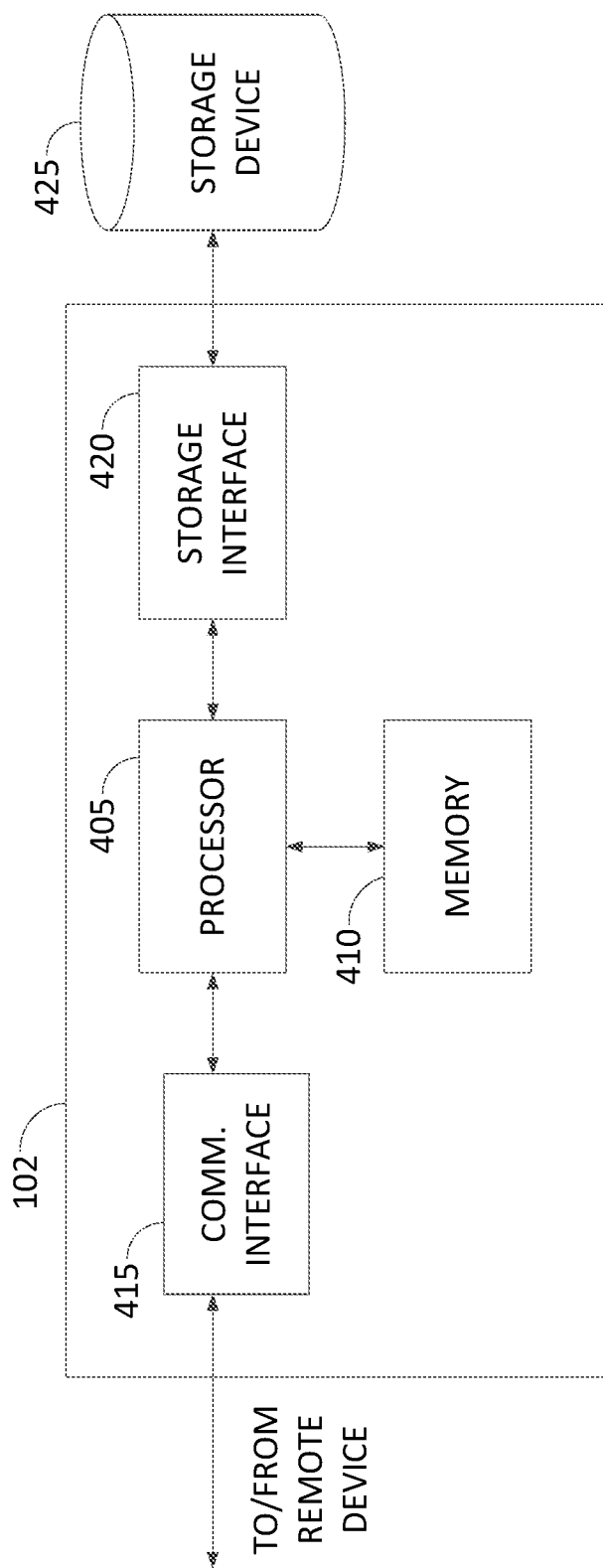
FIG. 4 depicts an exemplary configuration of the remote system server, in accordance with one embodiment of the present disclosure.

FIG. 4 depicts an exemplary configuration of the remote system server 102, in accordance with one embodiment of the present disclosure. In the exemplary embodiment, the remote system server 102 may also include a processor 405 for executing instructions. Instructions may be stored in a memory area 410. Processor 405 may include one or more processing units (e.g., in a multi-core configuration).

Processor 405 may be operatively coupled to a communication interface 415 such that the remote system server 102 is capable of communicating with a remote device such as the internal home health controller 124 (shown in FIGS. 1 and 2), the external data sources 132 (shown in FIG. 1), and any of the various in-home devices shown in FIG. 2. For example, communication interface 415 may receive internal data from the internal home health controller 124 via the external network 130.

Processor 405 may also be operatively coupled to a storage device 425. Storage device 425 may be any computer-operated hardware suitable for storing and/or retrieving data, such as, but not limited to, internal data from the home network 122 or external data from external data sources 132. In some embodiments, storage device 425 may be integrated in the remote system server 102. For example, the remote system server 102 may include one or more hard disk drives as storage device 425.

In other embodiments, storage device 425 may be external to the remote system server 102 and may be accessed by a plurality of server computer devices. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 425 via a storage interface 420. Storage interface 420 may be any component capable of providing processor 405 with access to storage device 425. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 425.

Processor 405 may execute computer-executable instructions for implementing aspects of the disclosure. In some embodiments, the processor 405 may be transformed into a special purpose microprocessor by executing computer-executable instructions or by otherwise being programmed.

Home Health Scoring and Reporting

Figure 5:
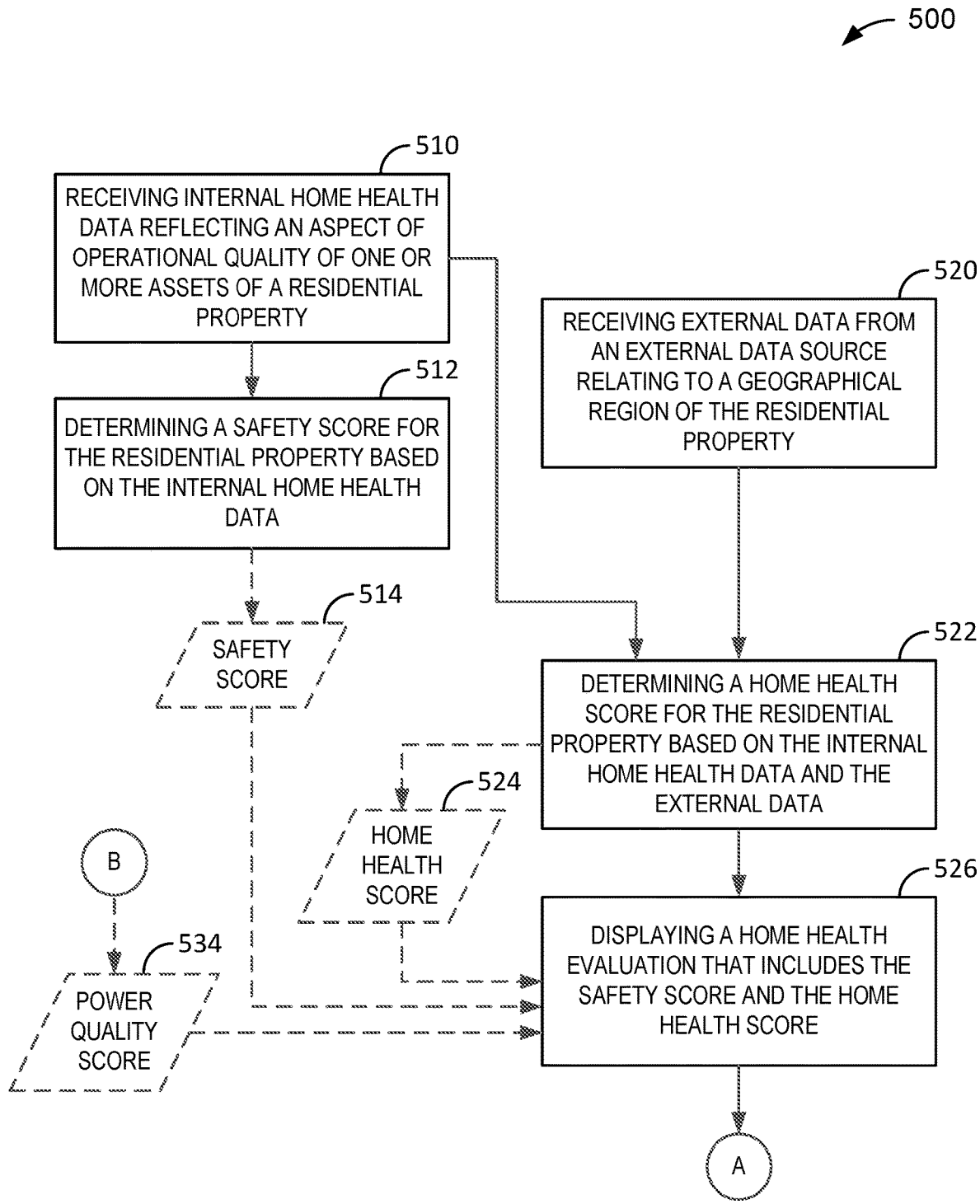
FIGS. 5, 6, and 7 illustrate an exemplary computer-implemented method that may be used to provide aspects of home health scoring, reporting, and alerting described herein.
Figure 6:
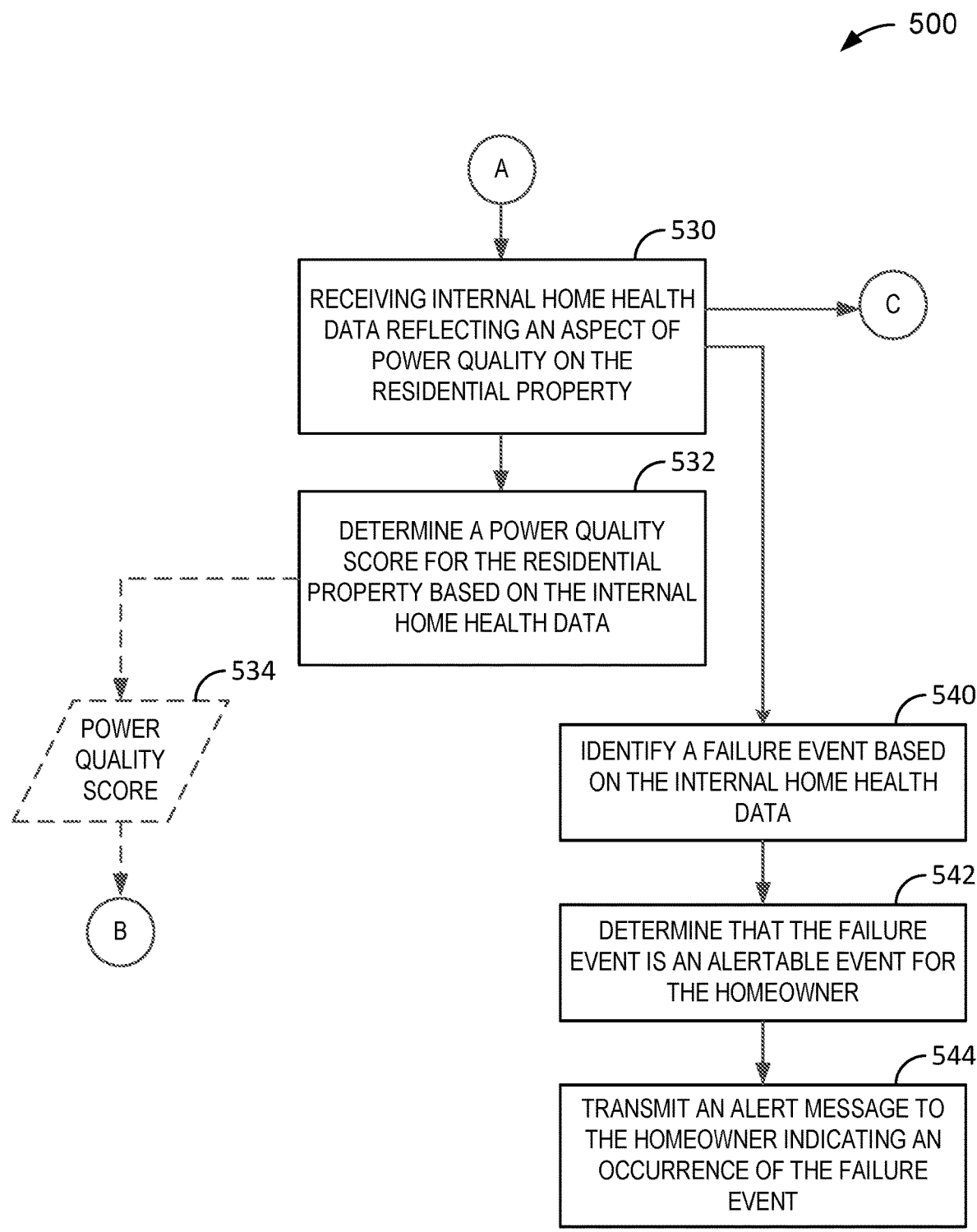
Figure 7:
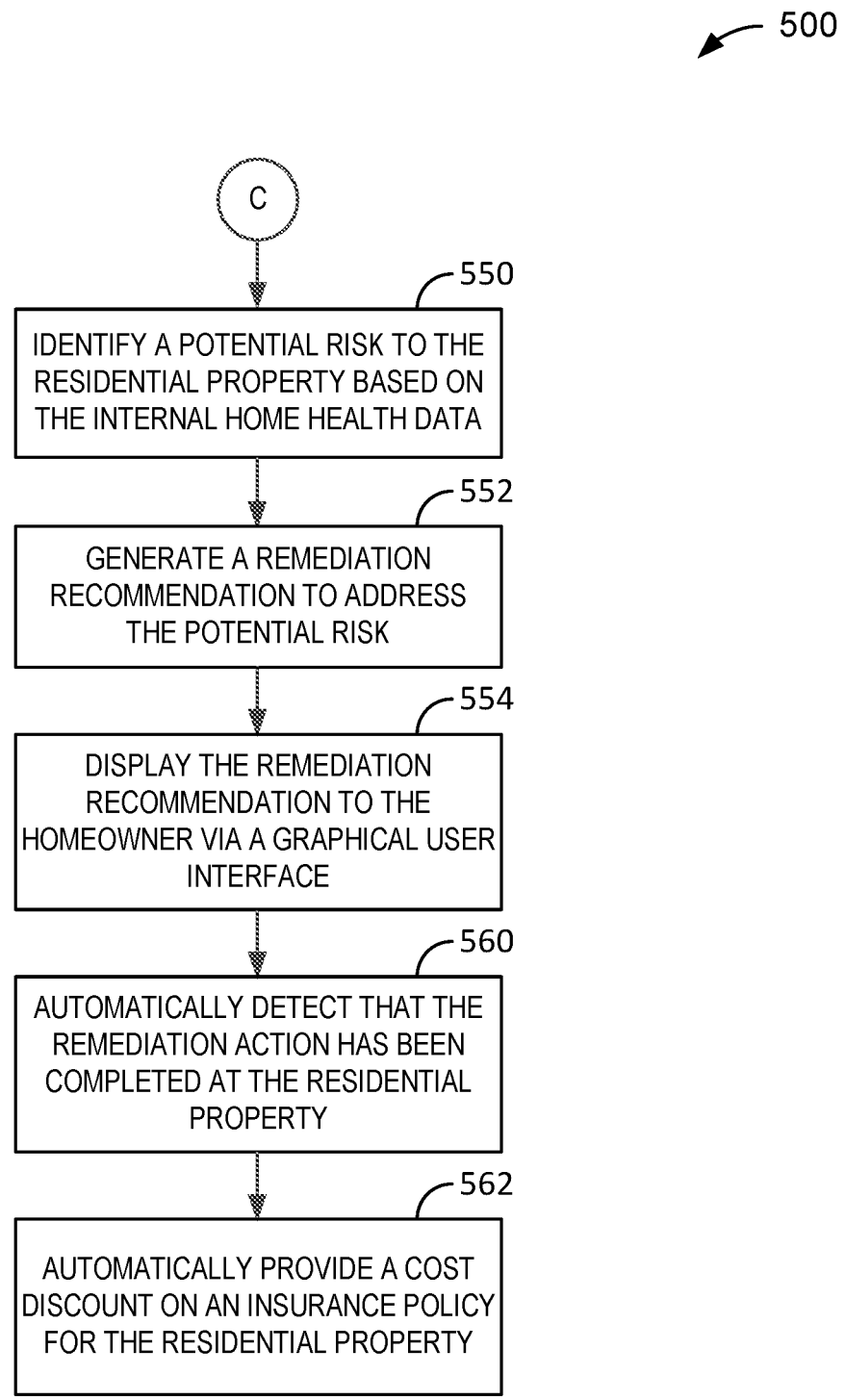

FIGS. 5, 6, and 7 illustrate an example computer-implemented method 500 that may be used to provide aspects of home health scoring, reporting, and alerting described herein. In the exemplary embodiment, the method 500 may be performed by the internal home health controller 124, the remote system server 102 (e.g., the home health engine 104, the risk evaluation engine 106), or both, in conjunction with internal home health data received from devices within the home 120 (e.g., as shown in FIG. 2) or with external data received from external data sources 132 or external databases 134 shown in FIG. 1. While the method 500 shown in FIGS. 5-7 illustrates various functions being performed in an example sequence, it will be apparent to one of ordinary skill in the art that portions of the method 500 may be performed separately or in a different order than depicted here.

During operation, the home health system 100 may use internal data and external data to evaluate the home 120. In the exemplary embodiment, the remote server system 102 may collect such data and perform a home health evaluation for the homeowner. For example, the home health engine 104 may evaluate electrical data related to the home 120 to generate a power quality score for the home 120, various safety data to generate a safety score for the home 120, or various internal and external data to generate a home health score.

While the examples provided herein describe aspects of home health evaluation being performed by the remote server system 102, the internal home health controller 124 may perform similar home health evaluation (e.g., by collecting external data about the home 120 from the remote server system 102). In other words, the home health engine 104 may execute on the internal home health controller 124, thereby isolating aspects of internal data to within the home 120 (e.g., for privacy). Further, it should be understood that, while data elements are categorized below for various uses, such data elements may be suitable for multiple categories.

In the exemplary embodiment, the home health engine 104 may evaluate various elements of internal and external data about the home 120 to compute a safety score for the home 120. At operation 510, the home health engine 104 receives internal home health data reflecting an aspect of operational quality of one or more assets of a residential property (e.g., the home 120). Some factors that may be used to determine the safety score may include aspects related to security device installation and use within the home 120 (e.g., number or type of security devices installed, type of home security system 222 installed, how often the security system 222 is armed, frequency that the security system 222 is armed while the home 120 is occupied or unoccupied, average response times for emergency services).

Some factors that may be used to determine the safety score may include aspects related to weather (e.g., frequency of tornados, electrical storms, high winds, blizzards, hurricanes, or flooding, number and duration of power outages, number of Internet outages). The home health engine 104 may use aspects of electrical configuration or faults at the home 120 as factors for the safety score (e.g., history of power surges or lightning strikes within the home 120, presence, absence, and tripping history of GFCI outlets within the home 120, grounding or arcing issues within the home 120, whether circuit sensors 208 are installed within the home 120, a number of devices plugged in, whether lights or appliances are left on when the home 120 is unoccupied, history of appliance malfunction, likelihood of appliance or electrical device failure).

In some embodiments, the home health engine 104 may use aspects of owner behaviors to influence the safety score (e.g., number of occupants within the home 120, time the home 120 is typically occupied versus unoccupied, responsiveness to notification of remediation alerts or implementing recommended remediations). Such factors may contribute to the evaluation of the safety of the home 120 and the safety score for the home 120. Any such resultant data may be shared with the homeowner, either in aggregate or as individual itemized factors. At operation 512, the home health engine 104 determines a safety score 514 for the residential property based upon the internal home health data.

In the exemplary embodiment, the home health engine 104 may evaluate various elements of internal and external data about the home 120 to compute a home health score 524 for the home 120. At operation 520, the home health engine 104 receives external data from an external data source. In this example, the external data relates to a geographical region in which the residential property exists, but other types of external data are possible. At operation 522, the home health engine 104 determines a home health sore for the residential property using internal home health data and the external data.

In some embodiments, some factors that may be used to determine the home health score 524 may include aspects related to electrical power use within the home 120 (e.g., efficiency of appliances or other devices, power consumption, consistency of voltage, how often major appliances are used, average length of power outages, verification that power sensors 208 are configured and operational, number of smart devices within the home 120, whether there are installed timers for lights, whether the home is energy certified, whether appliances within the home are energy efficient, whether the home is constructed with energy efficient materials, whether the home 120 includes local power generation). Other factors that may be used to determine the home health score 524 may include aspects of appliance health and use (e.g., age of appliances, how often major appliances are used, types of appliances on the premises, whether and how long appliances are under warranty, appliance failure or maintenance history, whether appliances are gas or electric, whether the house 120 includes a sump pump, water softener, or water purifier, type and age of HVAC devices). In some embodiments, the home health engine 104 may use various weather data in determining the home health score 524 (e.g., number and type of weather events experienced by the home 120).

Additional factors that may be used to determine the home health score 524 may include behavior-related data (e.g., number of notifications requiring action, actions taken versus no actions taken, average response time for actionable alerts or remediation recommendations, proof of issue resolution, education level of occupants, aspects of data allowed to be shared with home health system 100, whether the internal home health controller 124 is installed, whether the home 120 has a warranty, maintenance or use history of the home warranty, whether homeowner subscribes to home maintenance programs, maintenance logs for the home, last home inspection date, whether the home 120 participates in an online housing rental marketplace such as AirBnB®, whether the home 120 is occupied by owners or renters, whether or how often the home 120 is occupied or unoccupied, how clean the home 120 is maintained, whether the gutters are cleaned and maintained, whether a fence is installed around the property, whether security cameras are in use, whether fire extinguishers, smoke alarms, or carbon monoxide detectors are installed in the home 120, whether occupants smoke, whether landscaping around the home 120 is maintained to mitigate fire risks, whether a business is operated out of the home, how frequently the home security system 222 is engaged when the home 120 is occupied or unoccupied).

Some additional factors that may be used to determine the home health score 524 may include occupant profile data (e.g., whether pets or other animals are present on the property, how many occupants live in the home 120, how many children live in the home 120, whether occupants are caretakers of parents living in the home, the number of people that can access the home 120, the occupations of occupants, the age of occupants, whether the home 120 has exercise equipment or the homeowners maintain a gym membership, how social or active the occupants are in the community).

The home health system 100 may use various geography data to determine the home health score 524 of the home 120 (e.g., ratings of local emergency services, whether the home 120 is located on a high traffic road, in a cul de sac, or on a through street, neighborhood safety score or crime rate, local weather conditions, community maintenance of streets, sidewalks, or green spaces, whether and what type of amenities are nearby, a proximity to recreational activities such as hiking, trails, events, and restaurants, whether the home 120 is located in an area prone to flooding, earthquakes, wild fires, or other such hazards, ratings of nearby schools).

The home health system 100 may use various home construction or maintenance data to determine the home health score 524 of the home 120 (e.g., type of roof, condition or age of the roof, whether the home 120 has fire places and chimneys, age of the home 120, type of windows installed in the home 120, size of the home 120, number of stories in the home 120, whether the home 120 has a generator with automatic startup installed, whether the home construction includes brick or concrete, the type and size of any garage, the quality of materials used to construct the home 120, whether the home 120 has a basement, the age or condition of plumbing inside and outside the home 120, whether the home 120 has a pool and safety fence around the pool, type of wireless network connectivity available to the home 120, whether the home 120 is maintained by bug or pest control, whether the home 120 has outside doors having steps, whether the home 120 has a deck, the type and condition of interior flooring within the home 120, type and condition of ducting and insulation within the home 120, type of landscaping around the home 120, whether the home 120 includes hurricane straps, the age of materials used to construct the home 120, mobility or accessibility options within the home 120, number of bedrooms and bathrooms in the home 120, number and type of security devices installed within the home).

In the exemplary embodiment, the home health system 100 may provide a home health "report card" (or "home health evaluation") to the homeowners of the home 120 (e.g., digitally, in print). At operation 526, the home health engine 104 displays a home health evaluation that includes the safety score 514 and the home health score 524. The home health report card may include an overall health score for the home 120, may categorize aspects of home health and provide sub-scores for each category, or may itemize various aspects of home health data collected and the relative impact on the home health score 524 for individual factors.

The home health system 100 may provide a graphical user interface through which the homeowners may view the home health report card (e.g., a web browser interface, a mobile device app, an interface on a display device of the internal home health controller, or the like). The home health report card may include the power quality score, the safety score, the home health score, or breakdowns of any such analyses. As such, the home health system 100 provides an analytical, comprehensive look at aspects of home health and safety for the homeowner.

In one exemplary embodiment, the home health engine 104 may evaluate electrical data about the home 120 to compute a power quality score 534 for the home 120. At operation 530, the home health engine 104 receives internal home health data reflecting an aspect of power quality on the residential property. Some factors that may be used to determine the power quality score 534 may include aspects related to the electrical utility provider for the home 120 (e.g., quality reputation, historical performance, power quality in a neighborhood or other geographic region). Other factors that may be used to determine the power quality score 534 may include aspects related to weather near the home 120 (e.g., history of lightning strikes or electrical storms, history of power outages due to weather, temperature history of the geographic region). Some other factors that may be used to determine the power quality score 534 may include aspects related to home construction or configuration (e.g., age of wiring, size of service to the home, number of electrical devices on the premises, load requirements of electrical devices, whether light emitting diode (LED) lights are installed, whether a generator is present on the premises, whether there are power strips installed with multiple devices in one outlet).

The home health engine 104 may use aspects of historical electrical consumption or performance at the home 120 as factors for the power quality score 534 (e.g., energy peak time usage, duration of light usage, power consumption habits, history of power black-outs, brown-outs, sags or surges, average length of outages, or appliance start-up or cycle times). The home health engine 104 may also use aspects of historical or current faults or alerts within the home 120 as factors for the power quality score 534 (e.g., fire detection alerts, noise level, specific outlet issues or circuit issues, Internet outages, grounding issues). Such factors may contribute to the evaluation of the power quality for the home 120 and the power quality score 534 for the home 120. Any such resultant data may be shared with the homeowner, either in aggregate or as individual itemized factors.

At operation 532, the home health engine 104 determines the power quality score for the residential property based upon the internal home health data. In some embodiments, the home health engine 104 may additionally or alternatively determine the power quality score 534 based upon external data. The power quality score 534 may additionally be included in the home health evaluation at operation 526.

In some embodiments, the home health engine 104 may identify a failure event based upon the internal home health data at operation 540. The home health engine 104 may determine that the failure event is an alertable event for the homeowner at operation 542 and may transmit an alert message to the homeowner indicating an occurrence of the failure event at operation 544.

In some embodiments, the home health engine 104 may identify a potential risk to the residential property based upon internal home health data or external data at operation 550. The home health engine 104 may generate a remediation recommendation to address the potential risk at operation 552 and may display the remediation recommendation to the homeowner (e.g., via a graphical user interface, via the home health evaluation, or the like) at operation 554. In some embodiments, the home health engine 104 may automatically detect when the remediation action has been completed at the residential property at operation 560 and may automatically provide a cost discount on an insurance policy that covers the residential property based upon the detected risk remediation at operation 562.

Risk Detection, Alerting, Mitigation, and Risk Scoring

In the exemplary embodiment, the home health system 100, when implemented with the home 120 and its various devices and sensors, may provide aspects of risk detection, alerting, and risk mitigation for the homeowners. More specifically, the internal home health controller 124 may be configured to detect current hazards or potential future risks based upon internal data collected from devices within the home 120 and report those current or potential risks to the homeowner or to authorities or emergency services.

For example, the controller 124 may be configured to detect arcing or other electrical hazards currently occurring or having recently occurred on the circuits 208 (e.g., via outputs from the EM devices 204), detect the presence of smoke or carbon monoxide within the home 120 (e.g., via smart smoke detectors or smart carbon monoxide detectors), or detect home security incidents at the home 120 (e.g., via the home security system 222). Such events may be categorized as high risk events and, as such, may be transmitted for immediate alerting of the homeowners.

Other such events may be categorized as medium or low risk events. For example, the home health system 100 may detect operational errors in appliances or other smart devices within the home, the tripping of a circuit breaker (e.g., via smart circuit breakers or smart panels), or higher than average power utilization on a particular circuit 208 (e.g., via the home power management system 226). The home health system 100 may be configured to immediately alert the homeowner of such events or may be configured to provide a more indirect alert of the events (e.g., reporting of such events through an email, a periodic risk report, or the like).

Upon detection of such high risk events, the controller 124 may transmit event data to the remote system server 104 for owner alerting or may directly transmit an owner alert automatically (e.g., as an SMS text message or the like). In some embodiments, the controller 124 may include a speaker that may be used to play an audible alert for nearby occupants of the home 120 (e.g., an alarm or other warning), or the controller 124 may be configured to transmit an alert to the smart speaker device 218 for presentation to the occupants of the home 120. The controller 124 may be configured to transmit alerts to authorities or emergency services for particular types of high risk events.

In the exemplary embodiment, the home health system 100 may be configured to identify mitigating actions that can be taken by the homeowners to improve home health or reduce risk to the home 120. For example, upon detection of periodic arcing on a particular circuit 208, the home health system 100 may generate a risk mitigation recommendation to have an electrician inspect the failing circuit for the source of the arcing and fix the issue. Such risk mitigation recommendations may help the homeowner remediate current or potential problems, thereby potentially avoiding property losses or reducing health risks. In some scenarios, the home health system 100 may be configured to offer discounts on a home insurance policy when certain types of risk mitigation recommendations are performed and completed by the homeowner. The home health system 100 may also be configured to detect and verify whether the risk mitigation recommendations are completed.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as conversation data of spoken conversations to be analyzed, mobile device data, and/or additional speech data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the conversation, statement, utterance, spoken word, typed word, geolocation data, and/or other data.

Technical Advantages

The aspects described herein may be implemented as part of one or more computer components such as a client device and/or one or more back-end components, such as the internal home health controller 124 or the remote system server 102, for example. Furthermore, the aspects described herein may be implemented as part of a computer network architecture and/or a cognitive computing architecture that facilitates communications between various other devices, components, and/or users. Thus, the aspects described herein address and solve issues of a technical nature that are necessarily rooted in computer technology.

For instance, aspects include collecting internal data from electronic devices or sensors ("smart devices") within the home or controlling such devices or sensors to perform various tasks related to home health, home safety, risk detection, and risk mitigation. Such data collection and interaction between devices allows the home health system to evaluate aspects of home health and safety for homeowners and provides greater detail to insurance providers, thereby allowing risks to be more accurately evaluated. In doing so, the aspects overcome issues associated with the programming and execution of such device interactions. Without the improvements suggested herein, additional devices, processing, and memory usage would be required to perform such operations.

Additional technical advantages include, but are not limited to: i) integration of data collection from in-home devices; ii) automatic detection of risks present in the home; iii) consolidation of internal data captured from within the home with external data about the home; iv) creation of actionable risk mitigation actions and automatic verification when such actions are performed; and/or (v) automatic alerting of risk events identified within the home. Additional technical advantages are described in other sections of the specification.

Furthermore, the embodiments described herein improve upon existing technologies, and improve the functionality of computers, by dynamically evaluating home health, safety, and risk using sensor and device data collected from within the home. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to complex processing and ease of use, for example.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In another embodiment, a computer system for evaluating aspects of health of a residential property is provided herein. The computer system may include one or more smart devices installed within the residential property. The computer system may include an internal home health controller installed within the residential property. The internal home health controller may be capable of receiving internal home health data from the one or more smart devices via a home network. The internal home health data reflects an aspect of operational quality of one or more assets of the residential property. A remote system server may be capable of communicating with the internal home health controller and one or more external data sources outside the residential property via an external network. The remote system server may include one or more processors programmed to receive a first element of internal home health data from the internal home health controller. The one or more processors may be programmed to determine a safety score for the residential property based at least in part on the first element of internal home health data. The safety score represents a measure of safety of the residential property. The one or more processors may also be programmed to receive a first element of external data from the one or more external data sources, wherein the first element of external data relates to a geographical region of the residential property. The one or more processors may be programmed to determine a home health score for the residential property based at least in part on one or more of the first element of internal home health data provided by the one or more smart devices and the first element of external data from the one or more external data sources. The home health score represents a measure of health of the residential property. The one or more processors may also be programmed to cause to be displayed, to a homeowner of the residential property via a graphical user interface, a home health evaluation that includes the safety score and the home health score for the residential property.

The one or more processors of the computer system may be further programmed to receive a second element of internal home health data from the internal home health controller. The one or more processors may be further programmed to determine a power quality score for the residential property based at least in part on the second element of internal home health data. The home health evaluation displayed to the homeowner may further include the power quality score for the residential property.

The one or more smart devices of the computer system may include a circuit sensor capable of capturing performance metrics on an electrical circuit of the residential property. The second element of internal home health data includes power aberrations on the electrical circuit. Determining the power quality score includes factoring the power aberrations as a negative factor to the power quality score.

The one or more processors of the computer system may be further programmed to identify a failure event based upon the second element of internal home health data. The one or more processors may be further programmed to determine that the failure event is an alertable event for the homeowner based upon pre-configured settings identifying what types of events are alertable. The one or more processors may be further programmed to transmit an alert message to the homeowner indicating an occurrence of the failure event.

The one or more processors of the computer system may be further programmed to identify a potential risk to the residential property based at least in part on the second element of internal home health data. The one or more processors may be further programmed to generate a recommendation for a remediation action to address the potential risk. The one or more processors may be further programmed to cause to be displayed, to the homeowner of the residential property via the graphical user interface, the recommendation for the remediation action.

The one or more processors of the computer system may be further programmed to automatically detect that the remediation action has been completed at the residential property. The one or more processors may also be programmed to automatically provide a cost discount on an insurance policy for the residential property.

The one or more processor of the computer system may be programmed to determine a risk score for the residential property based at least in part on one or more of the first element of internal home health data provided by the one or more smart devices and the first element of external data from the one or more external data sources. The risk score represents a measure of risk associated with insuring aspects of the residential property. The one or more processors may be further programmed to compute a price of an insurance policy for the residential property based at least in part on the determined risk score.

In yet another embodiment, a computing device for evaluating aspects of health of a residential property is provided herein. The computing device may include one or more processors that may be programmed to receive a first element of internal home health data captured by one or more smart devices installed within the residential property. The first element of internal home health data reflects an aspect of operational quality of one or more assets of the residential property. The one or more processors may be programmed to determine a safety score for the residential property based at least in part on the first element of internal home health data. The safety score represents a measure of safety of the residential property. The one or more processors may be programmed to receive a second element of internal home health data captured by the one or more smart devices. The one or more processors may also be programmed to determine a home health score for the residential property based at least in part on one or more of the first element of internal home health data and the second element of internal home health data. The home health score represents a measure of health of the residential property. The one or more processors may also be programmed to cause to be displayed, to a homeowner of the residential property via a graphical user interface, a home health evaluation that includes the safety score and the home health score for the residential property.

The one or more processors of the computing device may be further programmed to receive a second element of internal home health data captured by the one or more smart devices. The one or more processors may be programmed to determine a power quality score for the residential property based at least in part on the second element of internal home health data. The home health evaluation displayed to the homeowner further includes the power quality score for the residential property.

The one or more smart devices of the computing device may include a circuit sensor capable of capturing performance metrics on an electrical circuit of the residential property. The second element of internal home health data may include power aberrations on the electrical circuit. Determining the power quality score may include factoring the power aberrations as a negative factor to the power quality score.

The one or more processors of the computing device may be further programmed to identify a failure event based upon the second element of internal home health data. The one or more processors may be further programmed to determine that the failure event is an alertable event for the homeowner based upon pre-configured settings identifying what types of events are alertable. The one or more processors may be further programmed to transmit an alert message to the homeowner indicating an occurrence of the failure event.

The one or more processors of the computing device may be further programmed to identify a potential risk to the residential property based at least in part on the second element of internal home health data. The one or more processors may be programmed to generate a recommendation for a remediation action to address the potential risk. The one or more processors may be further programmed to cause to be displayed, to the homeowner of the residential property via the graphical user interface, the recommendation for the remediation action.

The one or more processors of the computing device may be further programmed to automatically detect that the remediation action has been completed at the residential property. The one or more processors may be further programmed to automatically provide a cost discount on an insurance policy for the residential property.

The one or more processors of the computing device may be further programmed to determine a risk score for the residential property based at least in part on one or more of the first and second elements of internal home health data provided by the one or more smart devices. The risk score represents a measure of risk associated with insuring aspects of the residential property. The one or more processors may be further programmed to compute a price of an insurance policy for the residential property based at least in part on the determined risk score.

In yet another embodiment, a computer-implemented method of evaluating aspects of health of a residential property is provided herein. The computer-implemented method is performed by a computing device that includes at least one processor. The method includes receiving a first element of internal home health data captured by one or more smart devices installed within the residential property. The first element of internal home health data reflects an aspect of operational quality of one or more assets of the residential property. The method includes determining a safety score for the residential property based at least in part on the first element of internal home health data. The safety score represents a measure of safety of the residential property. The method also includes receiving a second element of internal home health data captured by the one or more smart devices. The method includes determining a home health score for the residential property based at least in part on one or more of the first element of internal home health data and the second element of internal home health data. The home health score represents a measure of health of the residential property. The method may also include causing to be displayed, to a homeowner of the residential property via a graphical user interface, a home health evaluation that includes the safety score and the home health score for the residential property.

The method may further include receiving a second element of internal home health data captured by the one or more smart devices. The method may further include determining a power quality score for the residential property based at least in part on the second element of internal home health data. The home health evaluation displayed to the homeowner further includes the power quality score for the residential property.

The one or more smart devices of the method includes a circuit sensor capable of capturing performance metrics on an electrical circuit of the residential property. The second element of internal home health data may include power aberrations on the electrical circuit. Determining the power quality score includes factoring the power aberrations as a negative factor to the power quality score.

The method may further include identifying a failure event based upon the second element of internal home health data. The method may further include determining that the failure event is an alertable event for the homeowner based upon pre-configured settings identifying what types of events are alertable and transmitting an alert message to the homeowner indicating an occurrence of the failure event.

The method may also include identifying a potential risk to the residential property based at least in part on the second element of internal home health data. The method may include generating a recommendation for a remediation action to address the potential risk and causing to be displayed, to the homeowner of the residential property via the graphical user interface, the recommendation for the remediation action.

The method may also include automatically detecting that the remediation action has been completed at the residential property and automatically providing a cost discount on an insurance policy for the residential property.

The method may also include determining a risk score for the residential property based at least in part on one or more of the first and second elements of internal home health data provided by the one or more smart devices. The risk score represents a measure of risk associated with insuring aspects of the residential property. The method may also include computing a price of an insurance policy for the residential property based at least in part on the determined risk score.

In another embodiment, a non-transitory computer readable medium having computer-executable instructions embodied thereon for evaluating aspects of health of a residential property is provided herein. When executed by at least one processor, the computer-executable instructions cause the at least one processor to receive a first element of internal home health data captured by one or more smart devices installed within the residential property. The first element of internal home health data reflecting an aspect of operational quality of one or more assets of the residential property. The at least one processor may also determine a safety score for the residential property based at least in part on the first element of internal home health data. The safety score represents a measure of safety of the residential property. The at least one processor may also receive a second element of internal home health data captured by the one or more smart devices. The at least one processor may also determine a home health score for the residential property based at least in part on one or more of the first element of internal home health data and the second element of internal home health data. The home health score represents a measure of health of the residential property. The at least one processor may further cause to be displayed, to a homeowner of the residential property via a graphical user interface, a home health evaluation that includes the safety score and the home health score for the residential property.

The at least one processor for processing the non-transitory computer readable medium may also be capable of receiving a second element of internal home health data captured by the one or more smart devices. The at least one processor may also be capable of determining a power quality score for the residential property based at least in part on the second element of internal home health data. The home health evaluation displayed to the homeowner further includes the power quality score for the residential property.

The one or more smart devices used with the non-transitory computer readable medium may also include a circuit sensor capable of capturing performance metrics on an electrical circuit of the residential property. The second element of internal home health data includes power aberrations on the electrical circuit. Determining the power quality score may include factoring the power aberrations as a negative factor to the power quality score.

The at least one processor for processing the non-transitory computer readable medium may also be capable of identifying a failure event based upon the second element of internal home health data. The at least one processor may be capable of determining that the failure event is an alertable event for the homeowner based upon pre-configured settings identifying what types of events are alertable. The at least one processor may be capable of transmitting an alert message to the homeowner indicating an occurrence of the failure event.

The at least one processor for processing the non-transitory computer readable medium may also be capable of identifying a potential risk to the residential property based at least in part on the second element of internal home health data. The at least one processor may be capable of generating a recommendation for a remediation action to address the potential risk. The at least one processor may be capable of causing to be displayed, to the homeowner of the residential property via the graphical user interface, the recommendation for the remediation action.

The at least one processor for processing the non-transitory computer readable medium may also be capable of automatically detecting that the remediation action has been completed at the residential property. The at least one processor may be capable of automatically provide a cost discount on an insurance policy for the residential property.

The at least one processor for processing the non-transitory computer readable medium may also be capable of determining a risk score for the residential property based at least in part on one or more of the first and second elements of internal home health data provided by the one or more smart devices. The risk score represents a measure of risk associated with insuring aspects of the residential property. The at least one processor may be capable of computing a price of an insurance policy for the residential property based at least in part on the determined risk score.

In yet another embodiment, a non-transitory computer readable medium having computer-executable instructions embodied thereon for evaluating aspects of health of a residential property is provided herein. When executed by at least one processor, the computer-executable instructions cause the at least one processor to receive a first element of power quality data from an internal home health controller installed within the residential property. The power quality data may be captured by one or more electricity monitoring devices installed within the residential property. The one or more electricity monitoring devices may be capable of collecting power quality data for one or more of electrical devices operating within the residential property and electrical circuits within the residential property. The at least one processor determines a safety score for the residential property based at least in part on the first element of power quality data, the safety score representing a measure of safety of the residential property. The computer-executable instructions cause the at least one processor to receive a first element of external data from the one or more external data sources. The first element of external data relates to power quality for a geographical region of the residential property. The at least one processor determines a home health score for the residential property based at least in part on one or more of the first element of power quality data provided by the one or more electrical monitoring devices and the first element of external data from the one or more external data sources. The home health score represents a measure of health of the residential property. The at least one processor causes to be displayed, to a homeowner of the residential property via a graphical user interface, a home health evaluation that includes the safety score and the home health score for the residential property.

The non-transitory computer readable medium may further be associated with a first electricity monitoring device of the one or more electricity monitoring devices that includes at least one sensor that directly connects with an electrical circuit within the residential property to collect the power quality data.

The first electricity monitoring device may be capable of detecting electrical signatures of one or more devices connected to the electrical circuit.

The first electricity monitoring device may be capable of detecting arcing on the electrical circuit and determining the safety score includes introducing a risk factor based upon the presence of the detected arcing.

The non-transitory computer readable medium may further be associated with a first electricity monitoring device of the one or more electricity monitoring devices that is positioned in vicinity of an electrical distribution board of the residential property and includes at least one sensor that wirelessly senses the power quality data based upon electromagnetic waves emitted by an electrical device operating within the residential property.

The non-transitory computer readable medium may further be associated with a first electricity monitoring device of the one or more electricity monitoring devices that is plugged into an electrical outlet within the residential property for at least powering the one or more electricity monitoring devices.

The non-transitory computer readable medium may provide for plugging the first electricity monitoring device into the electrical outlet and additionally allowing a sensor of the first electricity monitoring device to directly connect to an electrical circuit of the residential property.

The non-transitory computer readable medium may further provide for the one or more electricity monitoring devices being capable of detecting lightning strikes affecting the residential property.

The at least one processor of the non-transitory computer readable medium may be further capable of identifying electrical signatures for a plurality of electrical devices operating within the residential property.

The at least one processor of the non-transitory computer readable medium may be further capable of distinguishing individual electrical devices operating within the residential property based upon a unique electrical signature for each electrical device.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer system for evaluating aspects of health of a residential property, the computer system comprising:
   one or more electricity monitoring devices installed within the residential property, the one or more electricity monitoring devices are configured to collect power quality data for one or more of electrical devices operating within the residential property and electrical circuits within the residential property;
   an internal home health controller installed within the residential property, the internal home health controller is configured to receive internal home health data from the one or more electricity monitoring devices, the internal home health data reflecting an aspect of operational quality of one or more assets of the residential property; and
   a remote system server configured to communicate with the internal home health controller and one or more external data sources outside the residential property via an external network, the remote system server comprising one or more processors programmed to:
      receive a first element of power quality data from the internal home health controller, the power quality data being captured by the one or more electricity monitoring devices;
      determine a safety score for the residential property based at least in part on the first element of power quality data, the safety score representing a measure of safety of the residential property;
      receive a first element of external data from the one or more external data sources, the first element of external data relating to power quality for a geographical region of the residential property;
      determine a home health score for the residential property based at least in part on one or more of the first element of power quality data provided by the one or more electrical monitoring devices and the first element of external data from the one or more external data sources, the home health score representing a measure of health of the residential property; and
      cause to be displayed, to a homeowner of the residential property via a graphical user interface, a home health evaluation that includes the safety score and the home health score for the residential property.

2. The computer system of claim 1, wherein a first electricity monitoring device of the one or more electricity monitoring devices is configured with at least one sensor that directly connects with an electrical circuit within the residential property to collect the power quality data.

3. The computer system of claim 2, wherein the first electricity monitoring device is configured to detect electrical signatures of one or more devices connected to the electrical circuit.

4. The computer system of claim 2, wherein the first electricity monitoring device is configured to detect arcing on the electrical circuit, wherein determining the safety score includes introducing a risk factor based upon the presence of the detected arcing.

5. The computer system of claim 1, wherein a first electricity monitoring device of the one or more electricity monitoring devices is positioned in vicinity of an electrical distribution board of the residential property and is configured with at least one sensor that wirelessly senses the power quality data based upon electromagnetic waves emitted by an electrical device operating within the residential property.

6. The computer system of claim 1, wherein a first electricity monitoring device of the one or more electricity monitoring devices is plugged into an electrical outlet within the residential property for at least powering the one or more electricity monitoring devices.

7. The computer system of claim 6, wherein plugging the first electricity monitoring device into the electrical outlet additionally allows a sensor of the first electricity monitoring device to directly connect to an electrical circuit of the residential property.

8. The computer system of claim 1, wherein the one or more electricity monitoring devices are configured to detect lightning strikes affecting the residential property.

9. The computer system of claim 1, wherein one or more of the internal home health controller and the one or more electricity monitoring devices are configured to identify electrical signatures for a plurality of electrical devices operating within the residential property.

10. The computer system of claim 9, wherein one or more of the internal home health controller and the one or more electricity monitoring devices are further configured to distinguish individual electrical devices operating within the residential property based upon a unique electrical signature for each electrical device.

11. A method for evaluating aspects of health of a residential property, the method comprising, via one or more processors and/or associated transceivers:
   receiving a first element of power quality data from an internal home health controller installed within the residential property, the power quality data being captured by one or more electricity monitoring devices installed within the residential property, the one or more electricity monitoring devices are configured to collect power quality data for one or more of electrical devices operating within the residential property and electrical circuits within the residential property;
   determining a safety score for the residential property based at least in part on the first element of power quality data, the safety score representing a measure of safety of the residential property;
   receiving a first element of external data from the one or more external data sources, the first element of external data relating to power quality for a geographical region of the residential property;

determining a home health score for the residential property based at least in part on one or more of the first element of power quality data provided by the one or more electrical monitoring devices and the first element of external data from the one or more external data sources, the home health score representing a measure of health of the residential property; and causing to be displayed, to a homeowner of the residential property via a graphical user interface, a home health evaluation that includes the safety score and the home health score for the residential property.

12. The method of claim 11, wherein a first electricity monitoring device of the one or more electricity monitoring devices is configured with at least one sensor that directly connects with an electrical circuit within the residential property to collect the power quality data.

13. The method of claim 12, wherein the first electricity monitoring device is configured to detect electrical signatures of one or more devices connected to the electrical circuit.

14. The method of claim 12, wherein the first electricity monitoring device is configured to detect arcing on the electrical circuit, wherein determining the safety score includes introducing a risk factor based upon the presence of the detected arcing.

15. The method of claim 11, wherein a first electricity monitoring device of the one or more electricity monitoring devices is positioned in vicinity of an electrical distribution board of the residential property and is configured with at least one sensor that wirelessly senses the power quality data based upon electromagnetic waves emitted by an electrical device operating within the residential property.

16. The method of claim 11, wherein a first electricity monitoring device of the one or more electricity monitoring devices is plugged into an electrical outlet within the residential property for at least powering the one or more electricity monitoring devices.

17. The method of claim 16, wherein plugging the first electricity monitoring device into the electrical outlet additionally allows a sensor of the first electricity monitoring device to directly connect to an electrical circuit of the residential property.

18. The method of claim 11, wherein the one or more electricity monitoring devices are configured to detect lightning strikes affecting the residential property.

19. The method of claim 11 further comprising identifying electrical signatures for a plurality of electrical devices operating within the residential property.

20. A non-transitory computer readable medium having computer-executable instructions embodied thereon for evaluating aspects of health of a residential property, wherein when executed by at least one processor, the computer-executable instructions cause the at least one processor to:

receive a first element of power quality data from an internal home health controller installed within the residential property, the power quality data being captured by one or more electricity monitoring devices installed within the residential property, the one or more electricity monitoring devices are configured to collect power quality data for one or more of electrical devices operating within the residential property and electrical circuits within the residential property;

determine a safety score for the residential property based at least in part on the first element of power quality data, the safety score representing a measure of safety of the residential property;

receive a first element of external data from the one or more external data sources, the first element of external data relating to power quality for a geographical region of the residential property;

determine a home health score for the residential property based at least in part on one or more of the first element of power quality data provided by the one or more electrical monitoring devices and the first element of external data from the one or more external data sources, the home health score representing a measure of health of the residential property; and cause to be displayed, to a homeowner of the residential property via a graphical user interface, a home health evaluation that includes the safety score and the home health score for the residential property.

* * * * *